(12) United States Patent
Jung et al.

(10) Patent No.: US 11,012,552 B2
(45) Date of Patent: *May 18, 2021

(54) WIRELESS DEVICE WITH AN AGGREGATE USER INTERFACE FOR CONTROLLING OTHER DEVICES

(71) Applicant: UBER TECHNOLOGIES, INC., San Francisco, CA (US)

(72) Inventors: Edward K. Y. Jung, San Francisco, CA (US); Royce A. Levien, San Francisco, CA (US); Robert W. Lord, San Francisco, CA (US); Mark A. Malamud, San Francisco, CA (US); John D. Rinaldo, Jr., San Francisco, CA (US); Lowell L. Wood, Jr., San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/865,310

(22) Filed: May 2, 2020

(65) Prior Publication Data
US 2020/0274961 A1   Aug. 27, 2020

Related U.S. Application Data

(63) Continuation of application No. 15/429,860, filed on Feb. 10, 2017, now Pat. No. 10,681,199, which is a
(Continued)

(51) Int. Cl.
*H04M 1/72412* (2021.01)
*H04M 1/72415* (2021.01)
*H04M 1/72469* (2021.01)

(52) U.S. Cl.
CPC ... *H04M 1/72412* (2021.01); *H04M 1/72415* (2021.01); *H04M 1/72469* (2021.01)

(58) Field of Classification Search
CPC .......... H04M 1/7253; H04M 1/72583; H04M 1/72533
(Continued)

(56) References Cited

U.S. PATENT DOCUMENTS

| 4,007,469 A | 2/1977 | Land et al. |
| 4,922,443 A | 5/1990 | Coetsier et al. |

(Continued)

FOREIGN PATENT DOCUMENTS

| EP | 2 708 850 A1 | 3/2014 |
| GB | 2 501 075 A | 10/2013 |

(Continued)

OTHER PUBLICATIONS

Secondary User Authentication Based on Mobile Devices Location by Min-Hsao Chen; Chung-Han Chen Published in: 2010 IEEE Fifth International Conference on Networking, Architecture, and Storage Jul. 2010 (Year: 2010).*
(Continued)

*Primary Examiner* — William D Cumming
(74) *Attorney, Agent, or Firm* — Mahamedi IP Law LLP

(57) ABSTRACT

An apparatus, device, methods, computer program product, and system are described that make a determination that a wireless device is in proximity to at least one secondary wireless device, and determine an aggregate user interface on the wireless device based on the determination.

20 Claims, 36 Drawing Sheets

Related U.S. Application Data continuation of application No. 13/718,443, filed on Dec. 18, 2012, now Pat. No. 9,621,701, which is a continuation-in-part of application No. 12/798,261, filed on Mar. 31, 2010, now Pat. No. 8,358,976, which is a continuation-in-part of application No. 11/389,669, filed on Mar. 24, 2006, now Pat. No. 7,725,077.

(58) Field of Classification Search
USPC .................................. 455/41.2; 340/539.13
See application file for complete search history.

(56) References Cited

U.S. PATENT DOCUMENTS

| | | |
|---|---|---|
| 5,023,934 A | 6/1991 | Wheeless |
| 5,146,557 A | 9/1992 | Yamrom et al. |
| 5,179,653 A | 1/1993 | Fuller |
| 5,222,127 A | 6/1993 | Fukui |
| 5,247,575 A | 9/1993 | Sprague et al. |
| 5,282,061 A | 1/1994 | Farrell |
| 5,287,102 A | 2/1994 | McKiel, Jr. |
| 5,287,448 A | 2/1994 | Nicol et al. |
| 5,303,393 A | 4/1994 | Noreen et al. |
| 5,311,434 A | 5/1994 | Tamai |
| 5,388,251 A | 2/1995 | Makino et al. |
| 5,404,295 A | 4/1995 | Katz et al. |
| 5,410,326 A | 4/1995 | Goldstein |
| 5,442,759 A | 8/1995 | Chiang et al. |
| 5,452,222 A | 9/1995 | Gray et al. |
| 5,475,835 A | 12/1995 | Hickey |
| 5,524,140 A | 6/1996 | Klausner et al. |
| 5,561,705 A | 10/1996 | Allard et al. |
| 5,568,536 A | 10/1996 | Tiller et al. |
| 5,572,576 A | 11/1996 | Klausner et al. |
| 5,612,669 A | 3/1997 | Allen et al. |
| 5,648,897 A | 7/1997 | Johnson et al. |
| 5,654,688 A | 8/1997 | Allen et al. |
| 5,663,704 A | 9/1997 | Allen et al. |
| 5,729,191 A | 3/1998 | Allen et al. |
| 5,802,467 A | 9/1998 | Salazar et al. |
| 5,802,492 A | 9/1998 | DeLorme et al. |
| 5,805,672 A | 9/1998 | Barkat et al. |
| 5,812,977 A | 9/1998 | Douglas |
| 5,818,329 A | 10/1998 | Allen |
| 5,825,355 A | 10/1998 | Palmer et al. |
| 5,877,757 A | 3/1999 | Baldwin et al. |
| 5,887,171 A | 3/1999 | Tada et al. |
| 5,890,905 A | 4/1999 | Bergman |
| 5,898,400 A | 4/1999 | Jones et al. |
| 5,910,800 A | 6/1999 | Shields et al. |
| 5,920,697 A | 7/1999 | Masters et al. |
| 5,923,325 A | 7/1999 | Barber et al. |
| 5,933,139 A | 8/1999 | Feigner et al. |
| 5,936,611 A | 8/1999 | Yoshida |
| 5,938,721 A | 8/1999 | Dussell et al. |
| 5,940,007 A | 8/1999 | Brinkmeyer et al. |
| 5,965,858 A | 10/1999 | Suzuki et al. |
| 5,982,277 A | 11/1999 | Flick |
| 5,985,858 A | 11/1999 | Miyata et al. |
| 5,991,739 A | 11/1999 | Cupps et al. |
| 6,005,299 A | 12/1999 | Hengst |
| 6,005,613 A | 12/1999 | Endsley et al. |
| 6,021,403 A | 2/2000 | Horvitz et al. |
| 6,068,485 A | 5/2000 | Linebarger et al. |
| 6,083,104 A | 7/2000 | Choi |
| 6,107,938 A | 8/2000 | Du et al. |
| 6,112,181 A | 8/2000 | Shear et al. |
| 6,130,606 A | 10/2000 | Flick |
| 6,160,926 A | 12/2000 | Dow et al. |
| 6,167,255 A | 12/2000 | Kennedy, III et al. |
| 6,169,902 B1 | 1/2001 | Kawamoto |
| 6,182,006 B1 | 1/2001 | Meek |
| 6,184,780 B1 | 2/2001 | Allen et al. |
| 6,230,170 B1 | 5/2001 | Zellweger et al. |
| 6,253,058 B1 | 6/2001 | Murasaki et al. |
| 6,256,378 B1 | 7/2001 | Iggulden et al. |
| 6,259,362 B1 | 7/2001 | Lin |
| 6,259,409 B1 | 7/2001 | Fulton et al. |
| 6,271,835 B1 | 8/2001 | Hoeksma |
| 6,308,120 B1 | 10/2001 | Good |
| 6,321,158 B1 | 11/2001 | DeLorme et al. |
| 6,344,793 B1 | 2/2002 | Geck et al. |
| 6,366,198 B1 | 4/2002 | Allen et al. |
| 6,377,825 B1 | 4/2002 | Kennedy et al. |
| 6,385,541 B1 | 5/2002 | Blumberg et al. |
| 6,462,660 B1 | 10/2002 | Cannon et al. |
| 6,463,343 B1 | 10/2002 | Emens et al. |
| 6,466,899 B1 | 10/2002 | Yano et al. |
| 6,480,098 B2 | 11/2002 | Flick |
| 6,490,493 B1 | 12/2002 | Dharnipragada |
| 6,526,335 B1 | 2/2003 | Treyz et al. |
| 6,577,304 B1 | 3/2003 | Yablonski et al. |
| 6,542,163 B2 | 4/2003 | Gorbet et al. |
| 6,542,814 B2 | 4/2003 | Polidi et al. |
| 6,556,899 B1 | 4/2003 | Harvey et al. |
| 6,584,496 B1 | 6/2003 | Ludtke |
| 6,608,650 B1 | 8/2003 | Torres et al. |
| 6,611,739 B1 | 8/2003 | Harvey et al. |
| 6,628,233 B2 | 9/2003 | Knockeart et al. |
| 6,639,550 B2 | 10/2003 | Knockeart et al. |
| 6,647,328 B2 | 11/2003 | Walker |
| 6,650,902 B1 | 11/2003 | Richton |
| 6,651,053 B1 | 11/2003 | Rothschild |
| 6,664,924 B2 | 12/2003 | Knockeart et al. |
| 6,680,694 B1 | 1/2004 | Knockeart et al. |
| 6,681,174 B1 | 1/2004 | Harvey et al. |
| 6,707,421 B1 | 3/2004 | Drury et al. |
| 6,711,474 B1 | 3/2004 | Treyz et al. |
| 6,727,830 B2 | 4/2004 | Lui et al. |
| 6,784,832 B2 | 8/2004 | Knockeart et al. |
| 6,788,313 B1 | 9/2004 | Heil |
| 6,795,011 B1 | 9/2004 | Berthoud et al. |
| 6,799,205 B2 | 9/2004 | Ludtke |
| 6,812,888 B2 | 11/2004 | Drury et al. |
| 6,816,881 B1 | 11/2004 | Mohindra et al. |
| 6,819,986 B2 | 11/2004 | Hong et al. |
| 6,823,188 B1 | 11/2004 | Stern |
| 6,829,668 B2 | 12/2004 | Keskar et al. |
| 6,832,092 B1 | 12/2004 | Suarez et al. |
| 6,845,486 B2 | 1/2005 | Yamada et al. |
| 6,873,840 B1 | 3/2005 | Von Alten |
| 6,874,037 B1 | 3/2005 | Abram et al. |
| 6,879,828 B2 | 4/2005 | Virtanen et al. |
| 6,882,712 B1 | 4/2005 | Iggulden et al. |
| 6,892,936 B2 | 5/2005 | Riggert et al. |
| 6,904,565 B1 | 6/2005 | Lentz |
| 6,909,398 B2 | 6/2005 | Knockeart et al. |
| 6,919,792 B1 | 7/2005 | Battini et al. |
| 6,920,612 B2 | 7/2005 | Makinen |
| 6,967,576 B2 | 11/2005 | Hayes et al. |
| 6,968,272 B2 | 11/2005 | Knockeart et al. |
| 6,970,783 B2 | 11/2005 | Knockeart et al. |
| 6,980,092 B2 | 12/2005 | Turnbull et al. |
| 7,023,379 B2 | 4/2006 | Turnbull |
| 7,036,076 B2 | 4/2006 | Anwar |
| 7,043,691 B1 | 5/2006 | Kwon et al. |
| 7,055,737 B1 | 6/2006 | Tobin et al. |
| 7,065,348 B1 | 6/2006 | Aoki |
| 7,068,163 B2 | 6/2006 | Sari et al. |
| 7,082,365 B2 | 7/2006 | Sheha et al. |
| 7,103,556 B2 | 9/2006 | Del Rey et al. |
| 7,107,081 B1 | 9/2006 | Fujisaki |
| 7,129,927 B2 | 10/2006 | Mattsson |
| 7,135,962 B2 | 11/2006 | Durbin et al. |
| 7,142,096 B2 | 11/2006 | Eisenman |
| 7,155,674 B2 | 12/2006 | Breen et al. |
| 7,158,006 B2 | 1/2007 | Lee et al. |
| 7,200,801 B2 | 4/2007 | Agassi et al. |
| 7,202,783 B2 | 4/2007 | Want et al. |
| 7,212,827 B1 | 5/2007 | Veschl |
| 7,212,976 B2 | 5/2007 | Scheer |
| 7,224,262 B2 | 5/2007 | Simon et al. |
| 7,231,496 B2 | 6/2007 | Curtis |

(56) References Cited

U.S. PATENT DOCUMENTS

| | | |
|---|---|---|
| 7,240,067 B2 | 7/2007 | Timmons |
| 7,245,258 B2 | 7/2007 | Velhal et al. |
| 7,248,937 B1 | 7/2007 | Brown et al. |
| 7,254,779 B1 | 8/2007 | Rezvani et al. |
| 7,259,357 B2 | 8/2007 | Walker |
| 7,277,884 B2 | 10/2007 | Vadai et al. |
| 7,286,857 B1 | 10/2007 | Walker et al. |
| 7,293,034 B2 | 11/2007 | Paya et al. |
| 7,300,287 B2 | 11/2007 | Dowdell et al. |
| 7,312,712 B1 | 12/2007 | Worrall |
| 7,324,966 B2 | 1/2008 | Scheer |
| 7,327,226 B2 | 2/2008 | Turnbull et al. |
| 7,332,998 B2 | 2/2008 | Beehler et al. |
| 7,346,015 B2 | 3/2008 | Shipman |
| 7,376,912 B2 | 5/2008 | Hurewitz et al. |
| 7,446,655 B2 | 11/2008 | Jha et al. |
| 7,457,628 B2 | 11/2008 | Blumberg et al. |
| 7,490,763 B2 | 2/2009 | Keohane et al. |
| 7,548,697 B2 | 6/2009 | Hudson et al. |
| 7,643,913 B2 | 1/2010 | Taki et al. |
| 7,664,736 B2 | 2/2010 | Jung et al. |
| 7,684,321 B2 | 3/2010 | Muirhead et al. |
| 7,694,881 B2 | 4/2010 | Jung et al. |
| 7,715,795 B2 | 5/2010 | Pirzada et al. |
| 7,725,077 B2 * | 5/2010 | Jung .............. H04M 1/72583 455/41.2 |
| 7,798,401 B2 | 9/2010 | Jung et al. |
| 7,840,427 B2 | 11/2010 | O'Sullivan |
| 7,876,706 B2 | 1/2011 | Ekl et al. |
| 7,899,468 B2 | 3/2011 | Lohtia et al. |
| 7,900,153 B2 | 3/2011 | Damodaran et al. |
| 7,904,352 B2 | 3/2011 | Carruthers |
| 7,922,086 B2 * | 4/2011 | Jung ............... H04M 1/7253 235/440 |
| 7,957,871 B1 | 6/2011 | Echeruo |
| 8,009,121 B1 | 8/2011 | Stuart et al. |
| 8,046,004 B2 | 10/2011 | Tsuchiya |
| 8,126,400 B2 * | 2/2012 | Jung ............... H04M 1/7253 455/41.2 |
| 8,170,899 B2 | 5/2012 | Chorley et al. |
| 8,180,293 B2 | 5/2012 | Jung et al. |
| 8,271,876 B2 | 9/2012 | Brugler et al. |
| 8,282,003 B2 | 10/2012 | Jung et al. |
| 8,284,034 B2 | 10/2012 | Stewart et al. |
| 8,358,976 B2 * | 1/2013 | Jung ............... H04M 1/7253 455/41.2 |
| 8,406,791 B1 | 3/2013 | Daily et al. |
| 8,504,090 B2 | 8/2013 | Klein et al. |
| 8,538,331 B2 | 9/2013 | Jung et al. |
| 8,626,366 B2 | 1/2014 | Noffsinger et al. |
| 8,660,498 B2 | 2/2014 | Gurney et al. |
| 8,688,532 B2 | 4/2014 | Khunger et al. |
| 8,712,857 B1 | 4/2014 | Adornato et al. |
| 8,762,839 B2 | 6/2014 | Jung et al. |
| 8,775,070 B1 | 7/2014 | Bhatia |
| 8,831,677 B2 | 9/2014 | Villa-Real |
| 8,918,284 B2 | 12/2014 | Tokashiki |
| 9,038,899 B2 | 5/2015 | Jung et al. |
| 9,307,577 B2 | 4/2016 | Jung et al. |
| 9,483,744 B2 | 11/2016 | Lord et al. |
| 9,488,484 B2 | 11/2016 | Lord et al. |
| 9,552,559 B2 | 1/2017 | Lord et al. |
| 9,569,740 B2 | 2/2017 | Lord et al. |
| 9,594,791 B2 | 3/2017 | Bell et al. |
| 9,599,481 B2 | 3/2017 | Lord et al. |
| 9,600,158 B2 | 3/2017 | Temkin et al. |
| 9,621,701 B2 * | 4/2017 | Jung .............. H04M 1/72533 |
| 9,671,239 B2 | 6/2017 | Lord et al. |
| 9,689,694 B2 | 6/2017 | Lord et al. |
| 9,715,667 B2 | 7/2017 | Lord et al. |
| 9,736,652 B2 | 8/2017 | Su et al. |
| 9,767,423 B2 | 9/2017 | Lord et al. |
| 9,875,116 B2 | 1/2018 | Khalid et al. |
| 9,886,671 B2 | 2/2018 | Lord et al. |
| 9,939,279 B2 | 4/2018 | Pan et al. |
| 9,946,978 B2 | 4/2018 | Francis |
| 9,959,512 B2 | 5/2018 | Camp et al. |
| 9,977,702 B2 | 5/2018 | Bell et al. |
| 10,255,301 B2 | 4/2019 | Bell et al. |
| 10,516,774 B2 * | 12/2019 | Landry .............. H04L 41/0803 |
| 10,681,199 B2 * | 6/2020 | Jung .............. H04M 1/72583 |
| 2001/0025558 A1 | 10/2001 | Ishida |
| 2001/0049277 A1 | 12/2001 | Meyer et al. |
| 2001/0050611 A1 | 12/2001 | Achterholt |
| 2001/0052858 A1 | 12/2001 | Vincent et al. |
| 2001/0055976 A1 | 12/2001 | Crouch et al. |
| 2002/0002552 A1 | 1/2002 | Schultz et al. |
| 2002/0004703 A1 | 1/2002 | Gaspard |
| 2002/0007225 A1 | 1/2002 | Costello et al. |
| 2002/0019881 A1 | 2/2002 | Bokhari et al. |
| 2002/0021288 A1 | 2/2002 | Schug |
| 2002/0022961 A1 | 2/2002 | Sepanaho |
| 2002/0023144 A1 | 2/2002 | Linyard et al. |
| 2002/0032497 A1 | 3/2002 | Jorgenson et al. |
| 2002/0032510 A1 | 3/2002 | Turnbull et al. |
| 2002/0038348 A1 | 3/2002 | Malone et al. |
| 2002/0038384 A1 | 3/2002 | Khan et al. |
| 2002/0062280 A1 | 5/2002 | Zachariassen et al. |
| 2002/0069030 A1 | 6/2002 | Xydis |
| 2002/0072347 A1 | 6/2002 | Dunko et al. |
| 2002/0075243 A1 | 6/2002 | Newton |
| 2002/0083025 A1 | 6/2002 | Robarts et al. |
| 2002/0084893 A1 | 7/2002 | Eisenman |
| 2002/0087279 A1 | 7/2002 | Hall |
| 2002/0105550 A1 | 8/2002 | Biebesheimer et al. |
| 2002/0105582 A1 | 8/2002 | Ikeda |
| 2002/0107610 A1 | 8/2002 | Kaehler et al. |
| 2002/0120459 A1 | 8/2002 | Dick et al. |
| 2002/0123880 A1 | 9/2002 | Brown |
| 2002/0130765 A1 | 9/2002 | Flick |
| 2002/0133545 A1 | 9/2002 | Fano et al. |
| 2002/0137505 A1 | 9/2002 | Eiche et al. |
| 2002/0152173 A1 | 10/2002 | Rudd |
| 2002/0164997 A1 | 11/2002 | Parry et al. |
| 2002/0186144 A1 | 12/2002 | Meunier |
| 2003/0016238 A1 | 1/2003 | Sullivan et al. |
| 2003/0018428 A1 | 1/2003 | Knockeart et al. |
| 2003/0018742 A1 | 1/2003 | Imago |
| 2003/0020759 A1 | 1/2003 | Cancilla et al. |
| 2003/0022701 A1 | 1/2003 | Gupta |
| 2003/0024975 A1 | 2/2003 | Rajasekharan |
| 2003/0032426 A1 | 2/2003 | Gilbert et al. |
| 2003/0034998 A1 | 2/2003 | Kodosky et al. |
| 2003/0035075 A1 | 2/2003 | Butler et al. |
| 2003/0040944 A1 | 2/2003 | Hileman |
| 2003/0043178 A1 | 3/2003 | Gusler et al. |
| 2003/0048288 A1 | 3/2003 | Drif et al. |
| 2003/0055542 A1 | 3/2003 | Knockeart et al. |
| 2003/0055553 A1 | 3/2003 | Knockeart et al. |
| 2003/0055555 A1 | 3/2003 | Knockeart et al. |
| 2003/0058266 A1 | 3/2003 | Dunlap et al. |
| 2003/0058267 A1 | 3/2003 | Warren |
| 2003/0064805 A1 | 4/2003 | Wells |
| 2003/0067541 A1 | 4/2003 | Joao |
| 2003/0069673 A1 | 4/2003 | Hong et al. |
| 2003/0098876 A1 | 5/2003 | Makinen |
| 2003/0100964 A1 | 5/2003 | Kluge et al. |
| 2003/0101178 A1 | 5/2003 | Miyata et al. |
| 2003/0110035 A1 | 6/2003 | Thong et al. |
| 2003/0123446 A1 | 7/2003 | Muirhead et al. |
| 2003/0125057 A1 | 7/2003 | Pesola |
| 2003/0125963 A1 | 7/2003 | Haken |
| 2003/0132854 A1 | 7/2003 | Swan et al. |
| 2003/0160824 A1 | 8/2003 | Szumla |
| 2003/0186734 A1 | 10/2003 | LeMay et al. |
| 2003/0191820 A1 | 10/2003 | Ludtke |
| 2003/0192947 A1 | 10/2003 | Toedtli |
| 2003/0193404 A1 | 10/2003 | Joao |
| 2003/0206102 A1 | 11/2003 | Joao |
| 2003/0218629 A1 | 11/2003 | Terashima et al. |
| 2003/0222897 A1 | 12/2003 | Moore et al. |
| 2003/0227392 A1 | 12/2003 | Ebert et al. |
| 2004/0034651 A1 | 2/2004 | Gupta et al. |
| 2004/0049324 A1 | 3/2004 | Walker |

(56) References Cited

U.S. PATENT DOCUMENTS

| | | |
|---|---|---|
| 2004/0049336 A1 | 3/2004 | Knockeart et al. |
| 2004/0049337 A1 | 3/2004 | Knockeart et al. |
| 2004/0056797 A1 | 3/2004 | Knockeart et al. |
| 2004/0064245 A1 | 4/2004 | Knockeart et al. |
| 2004/0064248 A1 | 4/2004 | Holze et al. |
| 2004/0066330 A1 | 4/2004 | Knockeart et al. |
| 2004/0067773 A1 | 4/2004 | Rachabathuni et al. |
| 2004/0076444 A1 | 4/2004 | Badovinac et al. |
| 2004/0078721 A1 | 4/2004 | Williams |
| 2004/0088228 A1 | 5/2004 | Mercer et al. |
| 2004/0088696 A1 | 5/2004 | Kawano et al. |
| 2004/0090451 A1 | 5/2004 | Lay et al. |
| 2004/0093102 A1 | 5/2004 | Liiri et al. |
| 2004/0095480 A1 | 5/2004 | Battles et al. |
| 2004/0103153 A1 | 5/2004 | Chang et al. |
| 2004/0104842 A1 | 6/2004 | Drury et al. |
| 2004/0107043 A1 | 6/2004 | de Silva |
| 2004/0107144 A1 | 6/2004 | Short |
| 2004/0111273 A1 | 6/2004 | Sakagami et al. |
| 2004/0117131 A1 | 6/2004 | Peters et al. |
| 2004/0117634 A1 | 6/2004 | Letterer et al. |
| 2004/0121764 A1 | 6/2004 | Rivero |
| 2004/0128613 A1 | 7/2004 | Sinisi |
| 2004/0136574 A1 | 7/2004 | Kozakaya et al. |
| 2004/0139180 A1 | 7/2004 | White et al. |
| 2004/0162896 A1 | 8/2004 | Cen et al. |
| 2004/0174434 A1 | 9/2004 | Walker et al. |
| 2004/0179545 A1 | 9/2004 | Erola et al. |
| 2004/0183676 A1 | 9/2004 | Eisenman |
| 2004/0185863 A1 | 9/2004 | Ogami |
| 2004/0196179 A1 | 10/2004 | Turnbull |
| 2004/0201633 A1 | 10/2004 | Barsness et al. |
| 2004/0201867 A1 | 10/2004 | Katano |
| 2004/0203381 A1 | 10/2004 | Cahn et al. |
| 2004/0204129 A1 | 10/2004 | Payne et al. |
| 2004/0205191 A1 | 10/2004 | Smith et al. |
| 2004/0242224 A1 | 12/2004 | Janik et al. |
| 2004/0260407 A1 | 12/2004 | Wimsatt |
| 2004/0260470 A1 | 12/2004 | Rast |
| 2005/0006478 A1 | 1/2005 | Patel |
| 2005/0021225 A1 | 1/2005 | Kantarjiev et al. |
| 2005/0055287 A1 | 3/2005 | Schmidtberg et al. |
| 2005/0060436 A1 | 3/2005 | Kienhoefer |
| 2005/0064814 A1 | 3/2005 | Matsuo et al. |
| 2005/0073388 A1 | 4/2005 | Lee et al. |
| 2005/0076302 A1 | 4/2005 | Okamoto |
| 2005/0080879 A1 | 4/2005 | Kim et al. |
| 2005/0080902 A1 | 4/2005 | Parupudi et al. |
| 2005/0081152 A1 | 4/2005 | Commarford et al. |
| 2005/0088280 A1 | 4/2005 | Beehler et al. |
| 2005/0108044 A1 | 5/2005 | Koster |
| 2005/0136903 A1 | 6/2005 | Kashima et al. |
| 2005/0154985 A1 | 7/2005 | Burkhart et al. |
| 2005/0160270 A1 | 7/2005 | Goldberg et al. |
| 2005/0168071 A1 | 8/2005 | Durbin et al. |
| 2005/0203752 A1 | 9/2005 | Shinada |
| 2005/0219223 A1 | 10/2005 | Kotzin et al. |
| 2005/0228869 A1 | 10/2005 | Imago |
| 2005/0262062 A1 | 11/2005 | Xia |
| 2005/0268234 A1 | 12/2005 | Rossi, Jr. et al. |
| 2006/0026304 A1 | 2/2006 | Price |
| 2006/0028428 A1 | 2/2006 | Dai et al. |
| 2006/0031517 A1 | 2/2006 | Gossweiler et al. |
| 2006/0055805 A1 | 3/2006 | Stockton et al. |
| 2006/0061458 A1 | 3/2006 | Simon et al. |
| 2006/0073815 A1 | 4/2006 | Pines et al. |
| 2006/0076398 A1 | 4/2006 | Jung et al. |
| 2006/0080188 A1 | 4/2006 | Jung et al. |
| 2006/0081695 A1 | 4/2006 | Jung et al. |
| 2006/0085177 A1 | 4/2006 | Toyama et al. |
| 2006/0086781 A1 | 4/2006 | Jung et al. |
| 2006/0090132 A1 | 4/2006 | Jung et al. |
| 2006/0092033 A1 | 5/2006 | Hoff et al. |
| 2006/0097855 A1 | 5/2006 | Turnbull et al. |
| 2006/0100912 A1 | 5/2006 | Kumar et al. |
| 2006/0115802 A1 | 6/2006 | Reynolds |
| 2006/0116979 A1 | 6/2006 | Jung et al. |
| 2006/0117001 A1 | 6/2006 | Jung et al. |
| 2006/0157550 A1 | 7/2006 | Jung et al. |
| 2006/0164239 A1 | 7/2006 | Loda |
| 2006/0170687 A1 | 8/2006 | Nakamura et al. |
| 2006/0173816 A1 | 8/2006 | Jung et al. |
| 2006/0190428 A1 | 8/2006 | Jung et al. |
| 2006/0206817 A1 | 9/2006 | Jung et al. |
| 2006/0214813 A1 | 9/2006 | Witkowski et al. |
| 2006/0224961 A1 | 10/2006 | Omi et al. |
| 2006/0226949 A1 | 10/2006 | Reene |
| 2006/0232377 A1 | 10/2006 | Witkowski |
| 2006/0261931 A1 | 11/2006 | Cheng |
| 2007/0005233 A1 | 1/2007 | Pinkus et al. |
| 2007/0008189 A1 | 1/2007 | Amari et al. |
| 2007/0027595 A1 | 2/2007 | Nou |
| 2007/0027903 A1 | 2/2007 | Evans et al. |
| 2007/0032225 A1 | 2/2007 | Konicek et al. |
| 2007/0033414 A1 | 2/2007 | Dunko |
| 2007/0038529 A1 | 2/2007 | Jung et al. |
| 2007/0040013 A1 | 2/2007 | Jung et al. |
| 2007/0064644 A1 | 3/2007 | Dowling et al. |
| 2007/0149216 A1 | 6/2007 | Misikangas |
| 2007/0152798 A1 | 7/2007 | Witkowski |
| 2007/0176736 A1 | 8/2007 | Chuey et al. |
| 2007/0197172 A1 | 8/2007 | Witkowski et al. |
| 2007/0201381 A1 | 8/2007 | Ekl et al. |
| 2007/0201382 A1 | 8/2007 | Ekl et al. |
| 2007/0204021 A1 | 8/2007 | Ekl et al. |
| 2007/0224937 A1* | 9/2007 | Jung .................. H04M 1/7253 455/41.2 |
| 2007/0224938 A1 | 9/2007 | Jung et al. |
| 2007/0270159 A1 | 11/2007 | Lohtia et al. |
| 2008/0027590 A1 | 1/2008 | Phillips et al. |
| 2008/0061967 A1 | 3/2008 | Corrado |
| 2008/0063400 A1 | 3/2008 | Hudson et al. |
| 2008/0065274 A1 | 3/2008 | Taki et al. |
| 2008/0068205 A1 | 3/2008 | Witkowski |
| 2008/0086241 A1 | 4/2008 | Phillips et al. |
| 2008/0090513 A1 | 4/2008 | Collins et al. |
| 2008/0091309 A1 | 4/2008 | Walker |
| 2008/0103640 A1 | 5/2008 | Watanabe et al. |
| 2008/0103655 A1 | 5/2008 | Turnbull et al. |
| 2008/0129440 A1 | 6/2008 | Beehler et al. |
| 2008/0143686 A1 | 6/2008 | Yeh et al. |
| 2008/0164972 A1 | 7/2008 | Taki et al. |
| 2008/0183376 A1 | 7/2008 | Knockeart et al. |
| 2008/0195428 A1 | 8/2008 | O'Sullivan |
| 2008/0229198 A1 | 9/2008 | Jung et al. |
| 2008/0248751 A1 | 10/2008 | Pirzada et al. |
| 2008/0266254 A1 | 10/2008 | Robbins et al. |
| 2008/0309451 A1 | 12/2008 | Zellweger et al. |
| 2009/0005963 A1 | 1/2009 | Jarvinen |
| 2009/0011759 A1 | 1/2009 | Alperovich et al. |
| 2009/0037033 A1 | 2/2009 | Phillips et al. |
| 2009/0207021 A1 | 8/2009 | Naccache |
| 2009/0216600 A1 | 8/2009 | Hill |
| 2009/0248587 A1 | 10/2009 | Van Buskirk |
| 2009/0280829 A1 | 11/2009 | Feuerstein |
| 2010/0005153 A1 | 1/2010 | Tsao |
| 2010/0146390 A1 | 6/2010 | Jung et al. |
| 2010/0207812 A1 | 8/2010 | Demirdjian et al. |
| 2010/0218095 A1 | 8/2010 | Jung et al. |
| 2010/0223162 A1 | 9/2010 | Jung et al. |
| 2010/0253507 A1* | 10/2010 | Jung .................. H04M 1/72583 340/539.13 |
| 2010/0255785 A1* | 10/2010 | Jung .................. H04M 1/72533 455/41.2 |
| 2010/0280748 A1 | 11/2010 | Mundinger et al. |
| 2010/0280853 A1 | 11/2010 | Petralia et al. |
| 2010/0280884 A1 | 11/2010 | Levine et al. |
| 2010/0309011 A1 | 12/2010 | Jung et al. |
| 2010/0323715 A1 | 12/2010 | Winters |
| 2010/0332131 A1 | 12/2010 | Horvitz et al. |
| 2011/0059693 A1 | 3/2011 | O'Sullivan |
| 2011/0145089 A1 | 6/2011 | Khunger et al. |
| 2011/0224893 A1 | 9/2011 | Scofield et al. |
| 2011/0237287 A1 | 9/2011 | Klein et al. |

(56) References Cited

U.S. PATENT DOCUMENTS

| | | |
|---|---|---|
| 2011/0246059 A1 | 10/2011 | Tokashiki |
| 2011/0257883 A1 | 10/2011 | Kuznetsov |
| 2011/0288762 A1 | 11/2011 | Kuznetsov |
| 2012/0041675 A1 | 2/2012 | Juliver et al. |
| 2012/0109721 A1 | 5/2012 | Cebon et al. |
| 2012/0112696 A1 | 5/2012 | Ikeda et al. |
| 2012/0182144 A1 | 7/2012 | Richardson et al. |
| 2012/0253654 A1 | 10/2012 | Sun et al. |
| 2012/0303745 A1 | 11/2012 | Lo et al. |
| 2013/0054139 A1 | 2/2013 | Bodin et al. |
| 2013/0095757 A1 | 4/2013 | Abdelsamie et al. |
| 2013/0131909 A1 | 5/2013 | Cooper et al. |
| 2013/0158861 A1 | 6/2013 | Lerenc |
| 2013/0158869 A1 | 6/2013 | Lerenc |
| 2013/0212233 A1* | 8/2013 | Landry ............... H04M 1/7253 709/220 |
| 2013/0226365 A1 | 8/2013 | Brozovich |
| 2013/0237156 A1* | 9/2013 | Jung ................ H04M 1/72583 455/41.2 |
| 2013/0237273 A1 | 9/2013 | Klein et al. |
| 2013/0244713 A1 | 9/2013 | Klein et al. |
| 2013/0244714 A1 | 9/2013 | Klein et al. |
| 2013/0310101 A1 | 11/2013 | Klein et al. |
| 2013/0344859 A1 | 12/2013 | Abramson et al. |
| 2014/0012498 A1 | 1/2014 | Gustafson et al. |
| 2014/0094998 A1 | 4/2014 | Cooper et al. |
| 2014/0171013 A1 | 6/2014 | Varoglu et al. |
| 2014/0173511 A1 | 6/2014 | Lehmann et al. |
| 2014/0282166 A1 | 9/2014 | Temkin et al. |
| 2014/0342670 A1 | 11/2014 | Kang et al. |
| 2014/0355428 A1 | 12/2014 | Smith et al. |
| 2015/0006005 A1 | 1/2015 | Yu et al. |
| 2015/0006072 A1 | 1/2015 | Goldberg et al. |
| 2015/0019132 A1 | 1/2015 | Gusikhin et al. |
| 2015/0025932 A1 | 1/2015 | Ross et al. |
| 2015/0081362 A1 | 3/2015 | Chadwick et al. |
| 2015/0094093 A1 | 4/2015 | Pierce et al. |
| 2015/0141043 A1 | 5/2015 | Abramson et al. |
| 2015/0149937 A1 | 5/2015 | Khalid et al. |
| 2015/0161564 A1 | 6/2015 | Sweeney et al. |
| 2015/0278759 A1 | 10/2015 | Harris et al. |
| 2015/0294431 A1 | 10/2015 | Fiorucci et al. |
| 2015/0312404 A1 | 10/2015 | Abramson et al. |
| 2015/0317100 A1 | 11/2015 | Shimohata et al. |
| 2015/0319574 A1 | 11/2015 | Wachter et al. |
| 2015/0323333 A1 | 11/2015 | Lord et al. |
| 2015/0323336 A1 | 11/2015 | Lord et al. |
| 2015/0324717 A1 | 11/2015 | Lord et al. |
| 2015/0324729 A1 | 11/2015 | Lord et al. |
| 2015/0324735 A1 | 11/2015 | Lord et al. |
| 2015/0324944 A1 | 11/2015 | Lord et al. |
| 2015/0324945 A1 | 11/2015 | Lord et al. |
| 2015/0325128 A1 | 11/2015 | Lord et al. |
| 2016/0034845 A1 | 2/2016 | Hiyama et al. |
| 2016/0202079 A1 | 7/2016 | Konig et al. |
| 2017/0223164 A1* | 8/2017 | Jung ................ H04M 1/72533 |
| 2020/0274961 A1* | 8/2020 | Jung ................ H04M 1/72583 |

FOREIGN PATENT DOCUMENTS

| | | | |
|---|---|---|---|
| JP | 6-224832 A | | 8/1994 |
| JP | 2002-123349 A | | 4/2002 |
| JP | 2003-030207 A | | 1/2003 |
| JP | 2003-084954 A | | 3/2003 |
| JP | 2003-114897 A | | 4/2003 |
| JP | 2003-128253 A | | 5/2003 |
| JP | 2003-228451 A | | 8/2003 |
| JP | 2012-215921 A | | 11/2012 |
| KR | 10-2007-0049336 A | | 5/2007 |
| KR | 10-2010-0053717 A | | 5/2010 |
| KR | 20100106628 A | * | 10/2010 |
| KR | 10-2013-0040430 A | | 4/2013 |
| KR | 10-2013-0051265 A | | 5/2013 |
| KR | 10-2014-0041665 A | | 4/2014 |

OTHER PUBLICATIONS

Excerpt from The Cambridge Dictionary Online: dated 2009; printed on Oct. 23, 2009; pp. 1-2; Cambridge University Press; located at: http://dictionary.cambridge.org/define.asp?key=62453&dict=CALD.

Heywood, "Drew Heywood's Windows 2000 Network Services"; dated Feb. 28, 2001; printed on Mar. 13, 2008; pp. 1-17; Publisher: Sams; located at: http://proquest.safaribooksonline.com/print?smlid=0672317419/ch011ev1sec4.

Alexander et al., "IBM Business Consulting Services—Applying Auto-ID to Reduce Losses Associated with Shrink"; Auto-ID Center Massachusetts Institute of Technology; dated Nov. 1, 2002, Feb. 1, 2003, Jun. 2002 and Nov. 2002; pp. 1-56; printed on Feb. 3, 2005; Auto-ID-Center, IBM-AUTOID-BC-003; located at: http://quintessenz.org/rfid.docs/www.autoidcenter.org/publishedresearch/ibm-autoid-bc-003.pdf.

ProfitLogic, "Capabilities"; pp. 1-2; printed on Feb. 3, 2005; located at: http://www.profitlogic.com/capabilities.htm.

Emigh, "IBM Unleashes New RFID Middlewear"; eWeek Enterprise News & Reviews, Health Care Technology Experts; dated Dec. 16, 2004 and 2005; pp. 1-2; located at: http://www.eweek.com/print_article2/0,2533,a=141068,00.asp.

"EPC RFID-based Inventory Management Solution Delivers Faster, Better Goods Logistics"; solution Architects; dated 2003; pp. 1-15; printed on Jan. 10, 2005; located at: www.intel.com/business/bss/solutions/blueprints/pdf/30034101.pdf.

"Get real time warehouse management with Cadence WMS"; Cadre Cadence Warehouse Management System Software; p. 1; printed on Jan. 10, 2005; located at: http://www.cadretech.com/warehouse.mgmt.html.

"IBM RFID solution for asset tracking and inventory management"; pp. 1-3; printed on Feb. 3, 2005; located at: http://www-1.ibm.com/industries/wireless/doc/content/solution/1025230104.html.

"IBM RFID solution for asset tracking and inventory management"; pp. 1-3; printed on Feb. 3, 2005; located at: http://www-1.ibm.com/industries/wireless/doc/content/solution/1025230204.html.

Kuchinskas, "IBM in Major RFID Expansion"; Jupiterimages; dated Sep. 27, 2004; pp. 1-2; printed on Feb. 3, 2005; located at http://www.internetnews.com/wireless/print.php/3412991.

Kuchinskas, "IBM Takes on Flood of RFID Data"; Jupiterimages; dated Jul. 19, 2004; pp. 1-3; printed on Feb. 3, 2005; located at http://www.internetnews.com/ent-news/print.php/3382621.

"Nordstrom: Inventory Management Transformation"; Accenture.com; dated 1995-2005; pp. 1-2; printed on Feb. 3, 2005; located at: http://www.accenture.com/xd/xd.asp?it=enweb&xd=industries%5Cproducts%5Cretail%5Ccase%5Creta,Nordstrom.xml.

ProfitLogic, "Solutions"; pp. 1-2; printed on Feb. 3, 2005; located at: http://www.profitlogic.com/solutions.htm.

"The EPCglobal Network™; Overview of Design, Benefits, & Security"; EPCglobal Inc.; dated Sep. 24, 2004; pp. 1-11; printed on Feb. 3, 2005; located at: http://www.epcglobalinc.org/news/position papers.html.

photo.net, "How to prevent condensation in camera/lens? What cause it?", https://www.photo.net/discuss/threads/how-to-prevent-condensation-in-camera-lens-what-cause-it.77624/; dated Nov. 2, 2003, printout pp. 1-2.

"Electronic Device", Wikipedia; dated 2003-2015; printed on Jun. 8, 2015; pp. 1-2; located at: http://www.thefreedictionary.com/electronic+device.

"Input Device", Wikipedia; dated Jun. 6, 2015; printed on Jun. 8, 2015; pp. 1-4; located at: http://en.wikipedia.org/wiki/Input_device.

"Applications: eCash On the Move at Volkswagen," iButton Applications, Dallas Semiconductor MAXIM, dated 2006; pp. 1-2; printed on Feb. 27, 2006; located at http://www.maxim-ic.com/products/ibutton/applications/index.cfm?Action=DD&id=21; Maxim Integrated Products.

"Applications: Mass Transit in Istanbul, Turkey," and "Parking in Argentina," iButton Applications, Dallas Semiconductor MAXIM; dated 2006, pp. 1-3, printed on Feb. 27, 2006; located at: http://www.maxim-ic.com/products/ibutton/applications/index.cfm?Action=DD&id=8; Maxim Integrated Products.

(56) References Cited

OTHER PUBLICATIONS

"Cellport Announces First Universal, Hands-Free Cell Phone System for Cars," Intelligent Transportation Society of America; dated Jul. 16, 2001, pp. 1-2, printed on Feb. 24, 2006; located at: http://www.itsa.org/itsnews.nsf/key/5FAA?OpenDocument.

"City of Caen, France, to demonstrate simplicity of Near Field Communication (NFC) technology," dated Oct. 18, 2005; pp. 1-3, printed on Mar. 20, 2006; located at: http://www.semiconductors.philips.com/news/content/file_1193.html; Koninklijke Philips Electronics N.V.

"Ecma welcomes ISO/IEC adoption of NFC Standard for short range wireless communication," Ecma International; dated Dec. 8, 2003; pp. 1-3; printed on Feb. 24, 2006; located at: http://www.ecma-international.org/news/Ecma-340-NFCIP-1.htm.

Kiser, "Newall Electronics Introduces Wearable DRO Technology," Industrial Product News Online; pp. 1-2; printed on Feb. 24, 2006; located at: http://www.ipnews.com/archives/dro/jan02/newall%5Felect.htm.

Lewis, "Put on your human-machine interface," Design News; dated Aug. 20, 2001 and 1997-2006; pp. 1-4; printed on Feb. 24, 2006; located at: http//designnews.com/article/CA150040.html; Reed Business Information.

"Near Field Communication: Encyclopedia," What You Need to Know About; dated 2006; pp. 1-3; printed on Mar. 3, 2006; located at: http://experts.about.com/e/n/ne/Near_Field_Communications.htm; About, Inc.

"Near Field Communication," Wikipedia; dated Feb. 17, 2006; pp. 1-2; printed on Feb. 24, 2006; located at: http://en.wikipedia.org/wiki/Near_Field_Communication.

"Near field communication set for full-scale trial," dated Oct. 20, 2005, pp. 1-3; printed on Mar. 20, 2006; located at: http://www.electronicstalk.com/news/phi/phi328.html; Pro-Talk Ltd, UK.

"Philips, Samsung and Telefonica Moviles Espana Demonstrate Simplicity of Near Field Communication Technology at 3GSM World Congress; 200 Attendees Can Enjoy Easy Payment and Convenient Access at Fira de Barcelona Convention Center," dated Feb. 7, 2006, pp. 1-4; printed on Mar. 20, 2006; located at: http://home.Businesswire.com/portal/site/google/index.jsp?ndmView=news_view&newsId=20060207005492&newsLang=en; Business Wire.

"Secure Website Logon and Transactions," iButton Applications; dated 2004; pp. 1-2; printed on Mar. 3, 2006; located at: http://72.14.207.104/search?q=cache;4JM396tN_ToJ:db.maxim-ic.com/ibutton/applications/index.cfm; Maxim/Dallas Semiconductor Corp.

Swedberg, "Developing RFID-Enabled Phones," RFID Journal; dated Jul. 9, 2004 and 2002-2006; pp. 1-3; printed on Mar. 20, 2006; located at: http://www.rfidjournal.com/article/articleview/2020/1/1/; RFID Journal, LLC.

Thomson, "Industry giants tout touch computing," Computing, dated Mar. 19, 2004 and 1995-2006; pp. 1-2; printed on Feb. 24, 2006; located at: http://www.computing.co.uk/vnunet/news/2124597/industry-giants-tout-touch-computing; vnu business publications.

Oswald, "blinkx Looks to Make Search Automatic," BetaNews; dated Mar. 7, 2006 and 1998-2006, pp. 1-6; printed on Mar. 22, 2006; BetaNews, Inc.; located at: http://www.betanews.com/article/blinkx_Looks_to_Make_Search_Automatic/1141754474.

"Welcome," NFC-Forum; dated 2005; pp. 1-2; printed on May 31, 2006; located at: http://www.nfc-forum.org/home; NFC Forum.

Amey et al, "Real-Time Ridesharing—The Opportunities and Challenges of Utilizing Mobile Phone Technology to Improve Rideshare Services," Paper submitted to the 2011 Transportation Research Board Annual Meeting, Aug. 1, 2010, pp. 1-17.

Gue et al., "Real-time, Scalable Route Planning Using a Stream-Processing Infrastructure," 13th International IEEE Conference on Intelligent Transportation Systems, Sep. 19-22, 2010, pp. 986-991.

Morenz et al., "An Estimation-based Automatic Vehicle Location System for Public Transport Vehicles," Proceedings of the 11th International IEEE, Conference on Intelligent Transportation Systems, Oct. 12-15, 2008, pp. 850-856.

Vaughn-Nichols, "Will Mobile Computing's Future Be Location, Location, Location?," Computer, 42(2):14-17, Mar. 2009, IEEE Expolore.

Japanese State Intellectual Property Office, Notice of Rejection; App. No. 2007-53 8180 (Based on PCT Patent Application No. PCT/US0S/038495); dated May 31, 2011 (received by our Agent on May 31, 2011); pp. 1-2 (machine translation).

Chinese State Intellectual Property Office, Decision of Final Rejection, App. No. 2005/800444393 (Based on PCT Patent Application No. PCT/US2005/038495); dated Oct. 13, 2010 (received by our Agent on Oct. 20, 2010); pp. 1-13.

European Patent Office, Supplementary European Search Report, Pursuant to Rule 62 EPC; App. No. EP 05824191;dated Sep. 15, 2010 (received by our Agent on Sep. 24, 2010); pp. 1-5.

* cited by examiner

WIRELESS DEVICE WITH AN AGGREGATE USER INTERFACE FOR CONTROLLING OTHER DEVICES

CROSS-REFERENCE TO RELATED APPLICATIONS

The present application is related to and claims the benefit of the earliest available effective filing daiefs) from the following listed applications (e.g., claims earliest available priority dates for other than provisional potent applications or claims benefits under 35 USC § 119(c) for provisional patent applications, for any and all parent, grandparent, great-grandparent, etc. applications of the Related Application(s)). All subject matter of the following listed applications and any and all parent, grandparent, great-grandparent, etc. applications of the following applications are incorporated herein by reference to the extent such subject matter is not inconsistent herewith.

For purposes of the USPTO extra-statutory requirements, the present application constitutes a continuation of U.S. patent application Ser. No. 15/429,860, ("the '860 application") filed Feb. 10, 2017, which is a continuation of U.S. patent application Ser. No. 13/718,443, entitled Wireless Device With an Aggregate User Interface for Controlling Other Devices naming Edward K. Y. Jung, Rovce A Levien, Robert W. Lord. Mark A Malamud, John D. Rinaldo, Jr., and Lowell L. Wood, Jr. as inventors, filed Dec. 18, 2012, now U.S. Pat. No. 9,621,701.

The '860 application is also a continuation-in-part of U.S. patent application Ser. No. 12/389,669, entitled Wireless Device With an Aggregate User Interface for Controlling Other Devices naming Edward K. Y Jung, Royce A Levien, Robert W Lord, Mark A Malamud, John D. Rinaldo, Jr., and Lowell L Wood, Jr. as inventors, filed Mar. 24, 2006 now U.S. Pat. No. 7,725,077.

The '860 application is also a continuation-in-part of U.S. patent application Ser. No. 12/798,261, entitled Wireless Device With an Aggregate User Interface for Controlling Other Devices naming Edward K Y Jung, Royce A Levien, Robert W. Lord, Mark A Malamud, John D. Rinaldo Jr., and Lowell L. Wood, Jr. as inventors, filed Mar. 31, 2010, now U.S. Pat. No. 8,358,976.

The United States Patent Office (USPTO) has published a notice to the effect that the USPTO's computer programs retire that patent applicants reference both a aerial number and indicate whether an application is a continuation or continuation-in-part. Stephen G Kunin, Benefit of Prior-Filed Application, USPTO Official Gazette Mar. 18, 2003. Provided above a specific reference to the application(s) from which priority is being claimed as recited by statute. The statute is unambiguous in its specific reference language and does not require either a serial number or any characterization, such as "continuation" or "continuation-in-part," for claiming priority to U.S. patent applications. Notwithstanding the foregoing, due to the USPTO's computer programs having certain data entry requirements, the present application is designated as set forth above, but such designations are not to be construed in any way as any type of commentary and/or admission as to whether or not the present application contains any new matter in addition to the matter of its parent application(s).

FIELD OF THE INVENTION

The disclosed subject matter relates generally to wireless devices. Specifically, the disclosed subject matter relates to apparatus, devices, methods, and computer products and systems that determine an aggregate interface based on proximity.

BACKGROUND

Wireless devices are often used to control secondary wireless devices. Secondary wireless devices to be controlled may include home audio and video related devices such as televisions of satellite receivers, office equipment such as printers or personal computers, vehicle related devices, banking and financial related devices, or any number of secondary wireless devices that may establish a wireless network connection or link with another device. Typically, a wireless device can only control a specific secondary device and a user must ensure that the secondary device is within range of the wireless device. Further, any interface of the wireless device is typically limited to, and independent of the proximity of the single secondary wireless device to be controlled. Accordingly, there is a need for improved systems and methods of detecting the proximity of a wireless device to one or more secondary wireless devices, and determining an aggregate interface on the wireless device.

SUMMARY

An embodiment provides a method. In one implementation, the method includes but is not limited to making a determination that a wireless device is in proximity to at least one secondary wireless device and determining an aggregate user interface on the wireless device based on the determination. In addition to the foregoing, other method aspects are described in the claims, drawings, and text forming a part of the present disclosure.

An embodiment provides a computer program product. In one implementation, the computer program product includes but is not limited to a signal-bearing medium bearing at least one of one or more instructions for making a determination that a wireless device is in proximity to at least one secondary wireless device, and the signal bearing medium bearing at least one of one or more instructions for determining an aggregate user interface on the wireless device based on the determination. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to make a determination that a wireless device is in proximity to at least one secondary wireless device and determine an aggregate user interface on the wireless device based on the determination. In addition to the foregoing, other system aspects are described in the claims, drawings, and text forming a part of the present disclosure.

An embodiment provides a device. In one implementation, the device includes but is not limited to a wireless device configured to determine when it is in proximity to at least one secondary wireless device, and the wireless device includes an aggregate user interface configured to be determined on the wireless device. In addition to the foregoing, other device aspects are described in the claims, drawings, and text forming a part of the present disclosure.

BRIEF DESCRIPTION OF THE DRAWINGS

The use of the same symbols in different drawings typically indicates similar or identical items.

DETAILED DESCRIPTION

Figure 1:
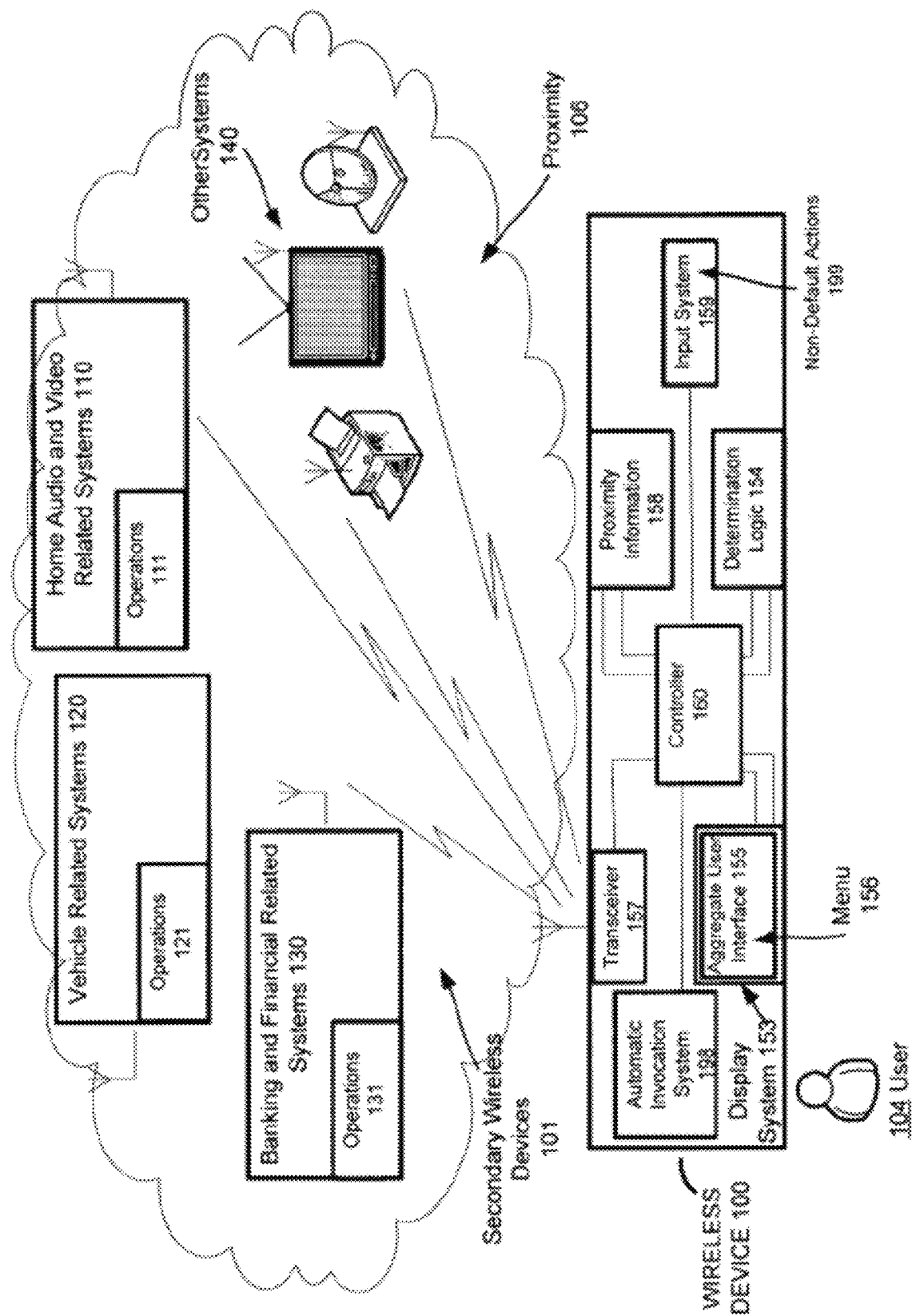
FIG. 1 illustrates an example wireless device with an aggregate user interface in which embodiments may be implemented, perhaps in a device.

FIG. 1 illustrates an example wireless device 100 in which embodiments may be implemented. A wireless device 100 may include a display system 153 for displaying a variety of information, such as an aggregate user interface 155, which may include a menu 156. Wireless device 100 may also include a controller 160 for providing overall control of wireless device 100, a (wireless) transceiver 157 to transmit (send) and receive signals, determination logic 154 for making various determinations, and automatic invocation system 198 for automatically invoking operations with minimal or, in some cases, no user interaction for example. Controller 160 may be, for example, a programmed controller or microprocessor, and may include hardware, software, and/or a combination of hardware and software, for example. Controller 160 may include, for example, a processor, memory, input and output, and other hardware, software, and/or firmware generally associated with a general purpose computing device. An input system 159 may include a keyboard, keypad, pointing device (e.g., mouse, pointing stick), biometric identifier, button, toggle switch, or other input device that, for example, may be used by a user to input information to wireless device 100. Input System 159 may include non-default actions 199 which may be, for example, button or key presses, or the like that may be used to indicate that a non-default action should be invoked.

Wireless device 100 may also include or store proximity information 158 relating to one or more secondary wireless devices 101. Proximity information 158 may provide, for example, information relating to a location or closeness or proximity of one or more secondary wireless devices to the wireless device 100. For example, proximity information 158 may identify a location of each secondary wireless device, identify a distance (e.g., from device 100) to a secondary wireless device, or may provide a list of which devices are in proximity (e.g., near or within a predetermined distance) to wireless device 100, and/or may identify which secondary wireless device(s) are closest to wireless device 100, identify a secondary wireless device that has been touched by wireless device 100, etc.

Wireless device 100 may be in proximity to or near one or more secondary wireless devices 101. Secondary wireless devices 101 may include, for example, home audio and video related systems 110, vehicle related systems 120, banking and financial related systems 130, and other systems 140. Other systems 140 may include a variety of other example wireless devices, such as a printer, television, and satellite receiver, shown here, as well as other devices such as a camera, personal computer, photo frame, personal digital assistant (PDA), or any number of secondary wireless devices that may establish a wireless network connection or link with another device, Each of the secondary wireless devices 101 may include a controller, a wireless transceiver, automatic invocation systems, determination or other logic, etc., as shown for wireless device 100. Each of the secondary wireless devices 101 may include one or more operations 111, 121, and 131, which may be performed on or with respect to such secondary wireless devices 101, and such operations are not shown with respect to other systems 140, but they are included in those systems as well.

Secondary wireless devices 101 shown in FIG. 1 provide several example types of devices but it is not an exhaustive list, and may also include any device or part of a device with a wireless capability (e.g., including a vehicle or car itself, or a part of the vehicle, for example). Similarly, secondary wireless devices, which may be used to determine an aggregate user interface 133 on the wireless device 100 (and is in turn being operated by it) may not itself be "wireless" or "wireless capable", but may work through an intermediary device (not shown) in order to communicate wirelessly with wireless device 100.

The wireless device 100 may be controlled by a user 104, for instance, to control one or more secondary wireless devices 101, which are in proximity 106 to wireless device 100 or nearby wireless device 100. According to an example embodiment, proximity 106 may refer to an area that is near or in proximity to wireless device 100. Thus, the various secondary wireless devices 101 may be in proximity or near wireless device 100.

In operation, the wireless device 100 may be used, for example, to control one or more secondary wireless devices 101 using a variety of different techniques. When a secondary wireless device is within proximity 106 or near wireless device 100, wireless device 100 may establish a wireless link or wireless network connection with the secondary wireless device, e.g., via (wireless) transceiver 157. For example, by establishing a wireless link and communicating information with a secondary wireless device, wireless device 100 may determine or make a determination that the secondary wireless device is in proximity to wireless device 100. Alternatively, wireless device 100 may determine that a secondary wireless device is in proximity to wireless device 100 based on a touching or contact between the device 100 and the secondary wireless device 101 (e.g., wireless device 100 touches a "hot spot" or designated area of the secondary wireless device). Similarly, a secondary wireless device 101 may determine that it is in proximity or near to wireless device 100, e.g., either through a wireless communication link that is established with or contact to wireless device 100, for example.

According to an example embodiment, one of secondary wireless devices 101 and the wireless device 100 may establish a wireless connection or wireless link and may exchange data when the two devices are near each other or within a maximum distance, e.g., when the secondary wireless device is within proximity 106 or near wireless device 100. For example, when a user carrying wireless device 100 (or other device) moves toward the area generally indicated as proximity 106 in FIG. 1, he begins to make closure with (or move nearer to) the proximity 106. At this point the wireless device 100, the secondary wireless devices 101, or a combination of both may make a determination that the wireless device 100 is in proximity to one or more of the secondary wireless devices 101.

Once a secondary wireless device 101 is in proximity to (e.g., near or touching) wireless device 100, a wireless connection or link may be established, for instance using transceiver 157 and similar transceivers on the secondary wireless devices. A variety of information may then be exchanged between the devices, and one or more actions or operations may be performed on the wireless device 100, e.g., either as default actions (via automatic invocation system 198), or as non-default actions 199 upon a user selection, for instance.

According to an example embodiment, wireless device 100 may determine an aggregate user interface 155, e.g., based on a determination that one or more secondary wireless devices 101 are in proximity or near wireless device 100 or based on a determination that one or more of the secondary wireless devices 101 have operations that are of particular use to the user 104, or both, as examples. In an example embodiment, the aggregate user interface 155 may be provided or displayed on display system 153 of wireless device 100, for example.

The aggregate user interface 155 may, for example, be a user interface that may provide an aggregate or cumulative interface providing one or more information elements related to one or more devices. For example, the aggregate user interface may include a list of operations associated with one or more devices that may be in proximity to device 100, or a menu 156 of elements or operations for each of a plurality of wireless devices in proximity. The aggregate user interface 155 may change or be updated based on changing environment, e.g., a new set of operations displayed as new wireless devices came into proximity, etc. The aggregate user interface 155 may be continually updated by sorting a list of secondary wireless devices 101 in proximity 106, e.g., ordered by distance and changing the output to display system 153. That updating of the aggregate user interface 155 may be performed, for example, in part using determination logic 154 and controller 160, along with proximity information 158 associated with each secondary wireless device. However, aggregate user interface 155 may also be centrally determined, or determined by an "observer" component (not shown) removed from the wireless device 100, or alternatively on one or more of the secondary wireless devices 101.

A number of examples will now be provided, and these are only illustrative and the embodiments are not limited thereto. In one example, the user 104 may carry wireless device 100 and move toward a camera in the area generally indicated as proximity 106 (being in proximity to various secondary wireless devices 101), the camera having a particular photo or image displayed thereon. In an example, if the user 104 is holding a wireless device 100 comprising a cellular phone with a particular contact selected, automatic invocation system 198 of the camera may send or wirelessly transmit the photo to the cellular phone, where the photo may be stored with or associated with the contact on the cellular phone. For example, this may be done automatically e.g., without direct interaction from the user 104 other than to move toward one of the secondary wireless devices 101 in the above-described state.

In another example, the user 104 with a PDA type wireless device 100 may move toward a printer in other systems 140, in the area generally indicated as proximity 106 (thus, the two devices are in proximity). The printer may detect the PDA wireless device and determine that the devices are in proximity (e.g., wireless detection or contact) and may print a document displayed on the PDA Alternatively, or in addition, a user 104 may use the input system 159 to provide additional input, e.g., by tapping on input system 159, or selecting a key, or by reorienting the wireless device (e.g., PDA in this example) to present a print dialog on the PDA or select a specific action to be performed.

When an MP3 player style wireless device 100 is brought into proximity 106 with a PC in secondary wireless devices 101, a menu 156 may be presented on the MP3 player with options, for example, to sync, begin playing the current song on the PC, transfer the user interface of the MP3 player (in its current state) to the PC. After a brief pause (if none of these is explicitly selected) automatic invocation system 198 may cause the MP3 player to stop playing and have the PC take over playing the current song.

Tapping, gesturing, or reorienting a camera style wireless device 100 when it is in proximity 106 to a digital photo frame in secondary wireless devices 101 may cause automatic invocation system 198 to put a suitably transformed, current viewfinder image to the photo frame. Double tapping, represented by non-default actions 199, may be used to put the entire contents of the camera, a slideshow, and/or a menu 156 of transition effects choices on the camera style wireless device 100.

Another example may occur when the user 104 is carrying wireless device 100 and moves toward the area generally indicated as proximity 106. Automatic invocation system 198 may cause the display system 153 to present a menu 156 of operations supported by one or more of the secondary wireless devices 101 that are in proximity 106. The menu 156 may be used to operate the secondary wireless devices 10. For example, each of the secondary wireless devices 101 are indicated as having operations 111, 121, aid 131 that may be performed on them. The menu 156 may be a list of these operations and selecting one of them sends a command to the secondary wireless devices 101 and uses one of the secondary wireless devices 101 to otherwise execute the command.

Another example occurs when the user 104 is carrying wireless device 100 and moves toward the area generally indicated as proximity 106. The wireless device 100 automatically connects to a DVD player in home audio and video related systems 110 and then to a CD player in home audio and video related systems 110 and then to a game system, such as an XBOX or PLAYSTATION console, which may be used to determine and/or provide an aggregate user interface 155 presenting a collected user interface for all the devices in home audio and video related systems 110. The aggregate user interface 155 may then be used to operate all of the devices in home audio and video related systems 110, for example, a menu 156 may be provided with a "Play" operation 111 with a submenu "Play Music, Play DVD" each of which has submenus, (i.e., On game system, On CD player) This aggregate user interface 155 and/or menu 156 may also vanish or disappear from display system 153 after a fixed time unless the user 104 asks to keep it, for example.

Another example occurs when the user 104 is carrying wireless device 100 and moves toward the area generally indicated as proximity 106 and establishes a wireless link to or contacts vehicle related systems 120. Automatic invocation system 198 may be used to unlock the car by default, e.g., after device comes into proximity with the vehicle related system 120 (e.g., either through contact with vehicle related system 120 or by establishing a wireless link or communication with vehicle related system 120). Alternatively, pressing a button, for example, in non-default actions 199 may present a menu 156 with choices (unlock, adjust seats, unlock all, start engine, run lights on, and open windows, for example) on device 100 with respect to the vehicle system 120 that is now in proximity 106 to wireless device 100. Walking away from the car in vehicle related systems 120 may cause the wireless device 100 to leave proximity 106 which can similarly invoke an action automatically via automatic invocation system 198, for example locking the car (or otherwise performing a default set of "leaving" actions that user 104 has set on wireless device 100). This set of leaving actions may occur, e.g., either in response to a user selection on input system 159, or may occur automatically when wireless device 100 determines that it is no longer in proximity 106 to the vehicle related systems 120 (e.g., device 100 is no longer contacting vehicle related systems 120 or wireless detection that device 100 is no longer near or in proximity to vehicle related systems 120, such as detecting that a wireless link has been disconnected, or no longer associated with vehicle related systems 120).

The above system may be caused to couple with banking and financial related systems 130, for example in the case of a vehicle rental activity by a user. The wireless device 100 may be set by default to not only use vehicle related systems 120 to unlock the car and start the motor, for example, but it might also charge the user's credit card the fee required to rent the vehicle as well. Such user data needed to complete the transaction may be stored in the wireless device 100 or it may be known by secondary wireless devices 101 as well.

If the wireless device 100 is in proximity 106 to a TV at other systems 140, automatic invocation system 198 may be used to turn on to the show that user 104 has scheduled in his calendar for this time. If no default action is available (i.e., the user 104 has no calendar entry), the viewing history or preferences of the user 104 may be used to select a channel. If viewing history and/or preferences cannot be used, the system may turn on the TV as usual. Alternatively, if user 104 has a web browser application executing on the wireless device 100 and the web browser is pointed to a URL corresponding to a news networks, for example, the TV may be tuned to the news network as well.

In another example, the user 104 moves toward proximity 106 with a plurality of secondary wireless devices 101. If, for example, the user 104 uses the non default actions 199 of input system 159 to activate an "available actions" button, a list of the secondary wireless devices 101 present their operations to wireless device 100 at display system 153.

Secondary wireless devices 101 may also indicate what direction user 104 needs to walk to approach a particular device, using at least proximity information 158. As the user 104 gets closer to some and farther from others of the secondary wireless devices 101 and their operations 111, 121, and 131 reorder themselves on the aggregate user interface 155, e.g., closest devices at the top, until the user 104 gets very close at which point the options for only one (the closest) of the secondary wireless devices 101 is presented on the aggregate user interface 155 on display system 153. Thus, the aggregate user interface 155 may be continually updated using at least determination logic 154 and proximity information 158 in wireless device 100. Finally, a user 104 of the device 100 may cause to invoke a default or non-default action (for instance by gesturing, tilting the wireless device, or otherwise indicating a default or non-default action should occur depending on the operations available).

In another example, the wireless device 100 may make a determination about the locations of the secondary wireless devices 101. The locations may be communicated, e.g., from the secondary wireless devices 101, to a central device (not shown) that may compute proximities and transmit to the wireless device 100, or also to one or more of the secondary wireless devices 101. One or more of the secondary wireless devices 101 may also use the location of the wireless device 100 to transmit its proximity 106 or location to it. In this example, the secondary wireless devices 101 might not transmit proximity 106 or location information at all, but instead decide for itself what commands, it wants to transmit to the wireless device 100. Alternatively, some secondary wireless devices 101 might, in addition to transmitting enough location information for the wireless device 100 to determine proximity 106, also transmit specific information (such as subsets of options or commands) based on the determination of proximity 106 from the secondary wireless devices 101.

Figure 2:
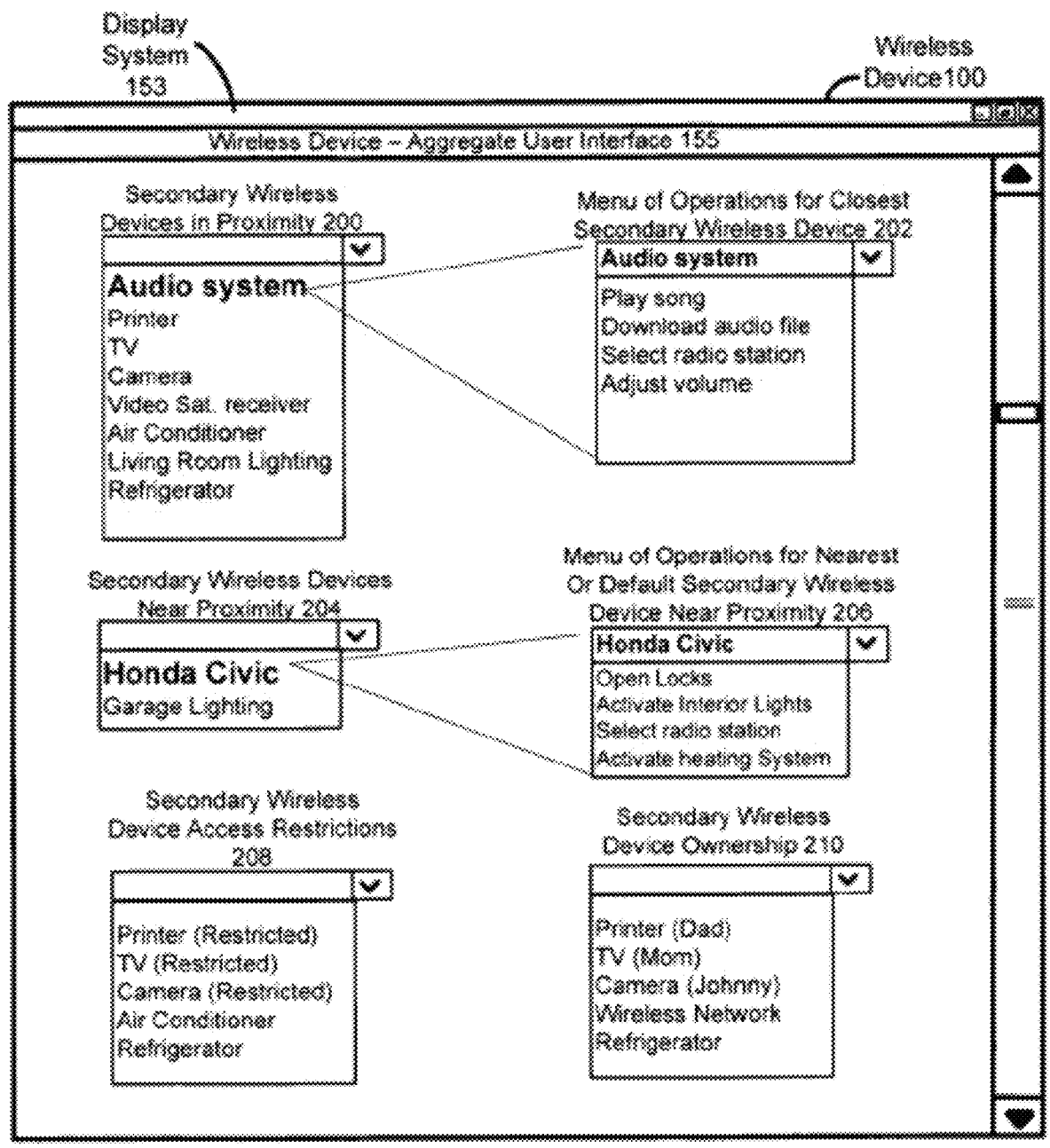
FIG. 2 illustrates certain alternative embodiments of the wireless device with an aggregate user interface of FIG. 1.

FIG. 2 illustrates certain alternative embodiments of the wireless device 100 of FIG. 1. FIG. 2 includes a wireless device 100, a display system 153, an aggregate user interface 155, and a plurality of menus 200, 202, 204, 206, 208, and 210. Menus 200-210 may correspond, for instance to menu 156 of FIG. 1.

Menu 200 comprises a list of secondary wireless devices that are in proximity with wireless device 100. In this example that includes an audio system, a printer, a TV, a camera, a video satellite receiver, an air conditioner, the living room lighting, and a refrigerator. In this example, the audio system is the closest secondary wireless device, so its operations are shown in menu 202, which include in this example, "play song", "download audio file", "select radio station", and "adjust volume".

Menus 204 and 206 are also shown on aggregate user interface 155. Menu 204 includes the secondary wireless devices 101 that are near but not yet in proximity 106 with a user's wireless device 100 (in this example the user is walking toward a garage). As the user 104 walks, the garage lighting and the user's vehicle are nearly in proximity 106, and represent secondary wireless devices 101 that will soon probably be available and within proximity 106. The garage lighting and vehicle are listed in menu 204. The closest, default, or secondary wireless device 101 deemed most important is listed in menu 206, which is the user's vehicle. The user's behavior patterns may have indicated to the wireless device 100 that the vehicle is most important, or the user may have specified that information explicitly to wireless device 100, or alternatively menu 206 may be based solely on proximity 106, by listing the closest secondary wireless device 101 as in menu 202.

Menu 210 gives an example of a list that may form part of the aggregate user interface 155, showing the access restrictions for devices that are in proximity 106. In this case, the printer, TV, and camera are restricted, while the air conditioner and refrigerator are available for use. Menu 210 shows secondary wireless device ownership. In menu 210, Dad owns the printer and Mom owns the TV. The camera is owned by Johnny, and the wireless network and refrigerator have unspecified ownership and/or are deemed to be owned by anyone capable of establishing a connection with and using a wireless device 100.

Figure 3:
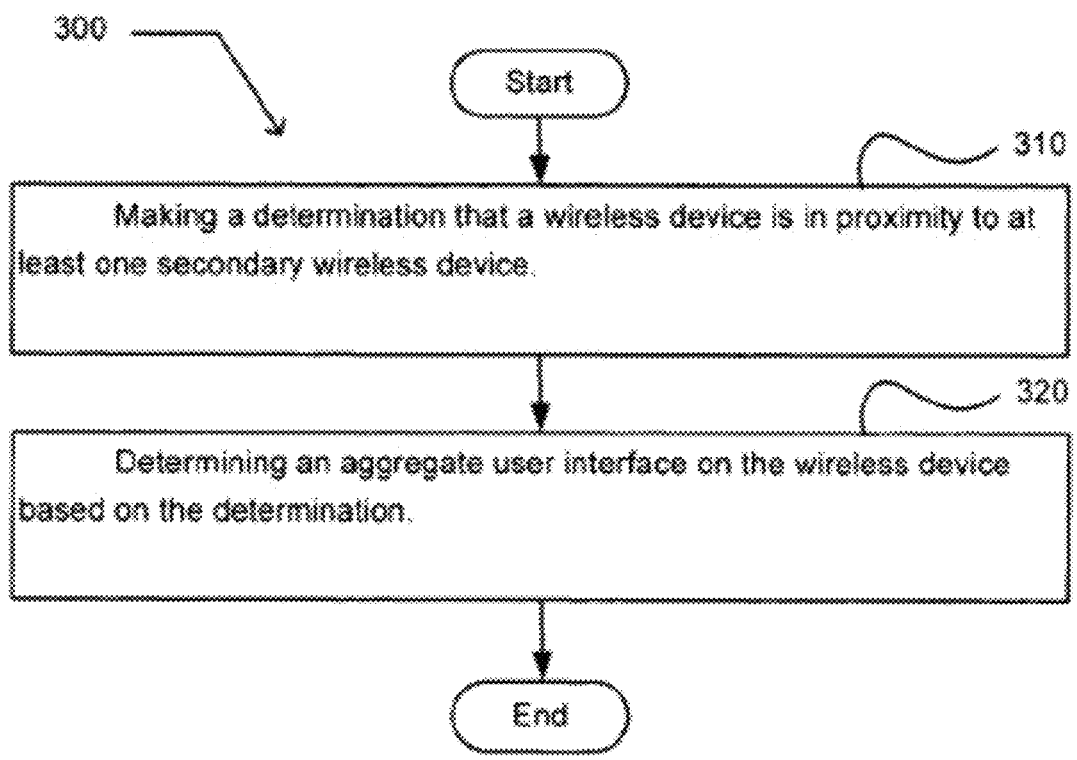
FIG. 3 illustrates an operational flow representing example operations related to a wireless device with an aggregate user interface for controlling other devices.

FIG. 3 illustrates an operational flow 300 representing example operations related to the wireless device with an aggregate user interface for controlling other devices. In FIG. 3 and in following figures that include various examples of operational flows, discussion and explanation may be provided with respect to the above-described examples of FIGS. 1-2, and/or with respect to other examples and contexts. However, it should be understood that the operational flows may be executed in a number of other environments and contexts, and/or in modified versions of FIGS. 1-2. Also, although the various operational flows are presented in the sequences illustrated, it should be understood that the various operations may be performed in other orders than those which are illustrated, or may be performed concurrently.

After a start operation, the operational flow 300 moves to a making operation 310 where a determination is made that a wireless device is in proximity to at least one secondary wireless device. For example, as shown in FIG. 1, controller 160 of wireless device 100 may make a determination that one or more secondary wireless devices 101 are in proximity 106 to wireless device 100 by detecting a touching or contact between the two wireless devices. Alternatively, wireless device 100 may make a determination that it is in proximity 106 or near a secondary wireless device 101 by wirelessly detecting the secondary wireless device 101 and/or establishing a wireless link or connection with the secondary wireless device 101, for example.

In another example embodiment, determination logic 154 of device 100 may make a determination that device 100 is in proximity to a secondary wireless device 101, e.g., based on device contact or based on a wireless link that may be established via transceiver 157 to the secondary wireless device 101. Based on this determination, proximity information 158 may be updated to indicate that this secondary device is in proximity 106, e.g., identifying the device, its location or distance, etc. Alternatively, a wireless link may be established or contact detected, which may cause proximity information 158 to be updated. Determination logic 154 may then make a determination that the secondary wireless device 101 is not in proximity 106 to wireless device 100 based on this proximity information 158, for example, and/or in combination with additional information from controller 160.

Then, in a determining operation 320, an aggregate user interface on the wireless device is determined based on the determination. For example, one or more information elements may be provided on display system 153, e.g., based on the at least one secondary wireless device 101 that is in proximity 106 to the wireless device 100. The aggregate user interface 155 may be displayed on display system 153, e.g., including a menu of operations that may be performed for one or more of the secondary wireless devices 101. In addition, display system 153 may include an aggregate user interface 155 that may be formed in a variety of different ways, such as shown and described in the examples of FIG. 1, including using a menu 156. Proximity information 158 may be used with determination logic 154 to combine a plurality of operations 111, 121, and 131 that are available on the secondary wireless devices 101 and combine or aggregate them into a single menu or a plurality of menus as an aggregate user interface 155 on display system 153 of the wireless device 100, for example.

An operation(s) may be performed related either to a local or remote storage of the digital data, or to another type of transmission of the digital data. As discussed herein, in addition to accessing, querying, recalling, or otherwise obtaining the digital data for the making or determining operation, operations may be performed related to storing, sorting, identifying, associating, or otherwise archiving the digital data to a memory, including, for example, sending and/or receiving a transmission of the digital data from a remote memory. Accordingly, any such operation(s) may involve elements including at least an operator (e.g., either human or computer) directing the operation, a transmitting computer, and/or a receiving computer, and should be understood to occur within the United States as long as at least one of these elements resides in the United States.

Figure 4:
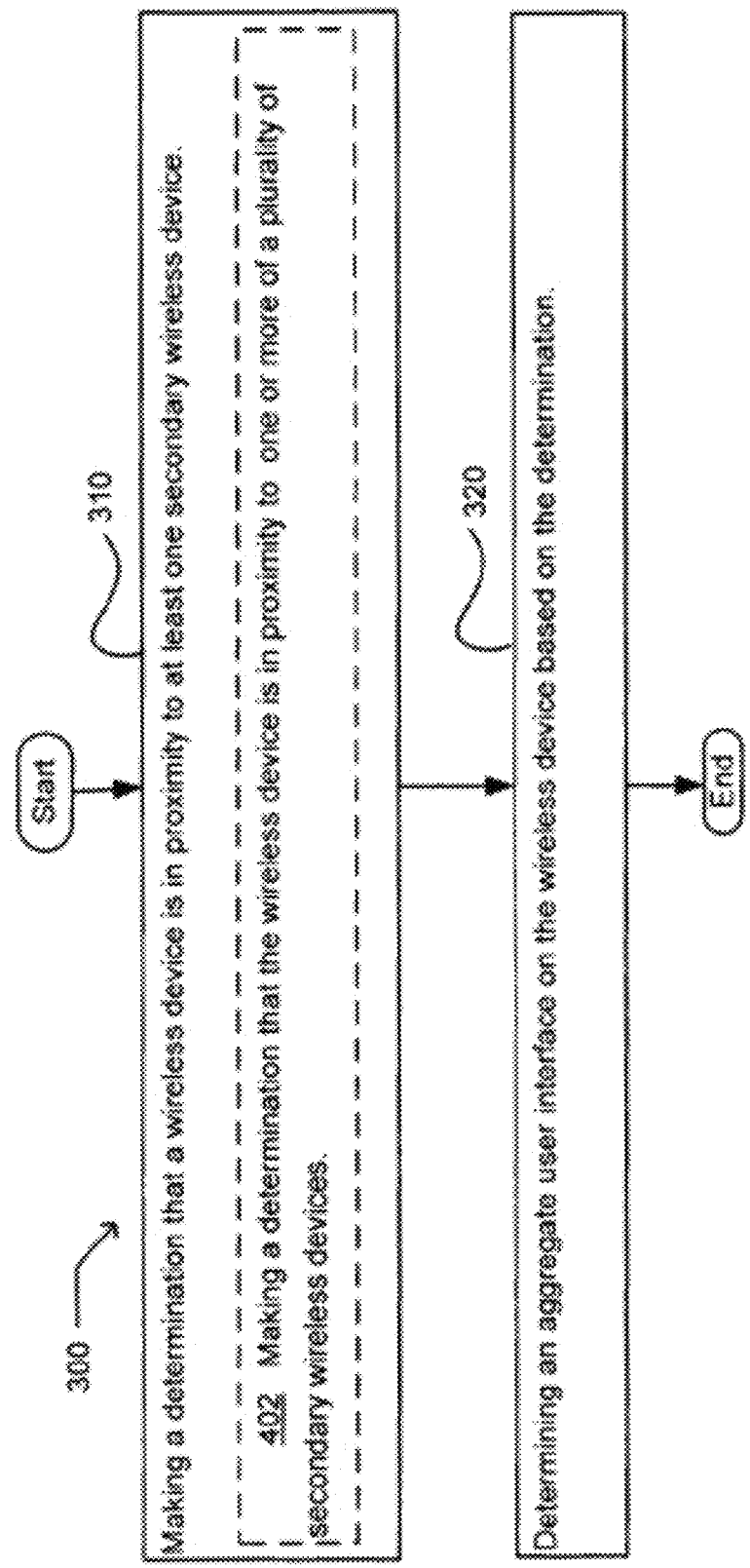
FIG. 4 illustrates an alternative embodiment of the example operational flow of FIG. 3.

FIG. 4 illustrates alternative embodiments of the example operational flow 300 of FIG. 3, FIG. 4 illustrates example embodiments where the making operation 310 may include at least one additional operation. Additional operations may include an operation 402.

At the operation 402 a determination is made that the wireless device is in proximity to one or more of a plurality of secondary wireless devices. For example, as shown in FIG. 1, controller 160 of wireless device 100 may make a determination that one or more secondary wireless devices 101 are in proximity to wireless device 100 by detecting a touching or contact between the two wireless devices. Alternatively, wireless device 100 may make a determination that it is in proximity 106 or near a secondary wireless device 101 by wirelessly detecting the secondary wireless device 101 and/or establishing a wireless link or connection with the secondary wireless device 101, for example. Other methods known to those skilled in the art may be used including a BLUETOOTH connection, an 802.11(a)-(g) type connection, a satellite connection, an RF connection, an IR connection, or any other connection.

Figure 5:
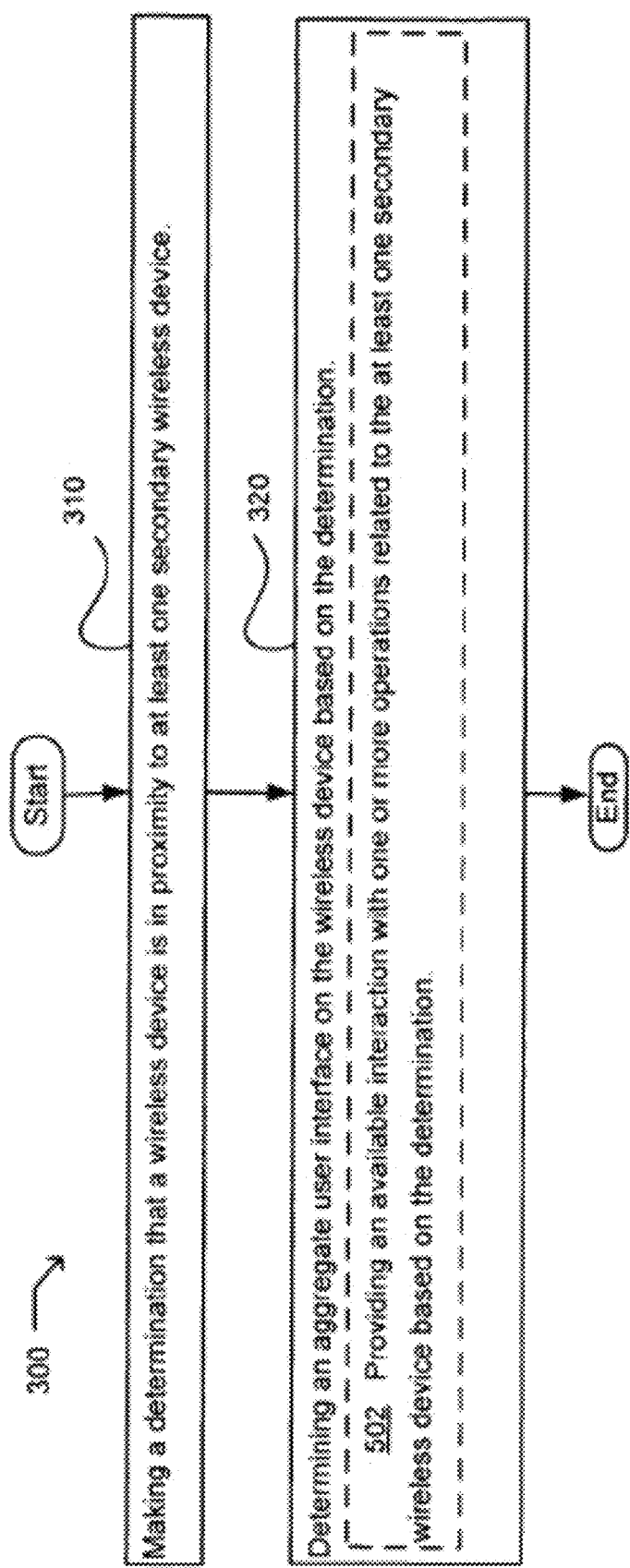
FIG. 5 illustrates an alternative embodiment of the example operational flow of FIG. 3.

FIG. 5 illustrates alternative embodiments of the example operational flow 300 of FIG. 3. FIG. 5 illustrates example embodiments where the determining operation 320 may include at least one additional operation. Additional operations may include an operation 502.

At the operation 502 an available interaction is provided with one or more operations related to the at least one secondary wireless device based on the determination. Interactions include, for example, menu choices 200-210 shown in FIG. 2. The available interactions may be used to represent operations 111, 121, and 131 of FIG. 1 that are available to be controlled by a user 104 via a wireless device 100. For example, a cable set-top box might offer the operations "Order Pay Per View", "Change Channel", "Record Show", and the like.

Figure 6:
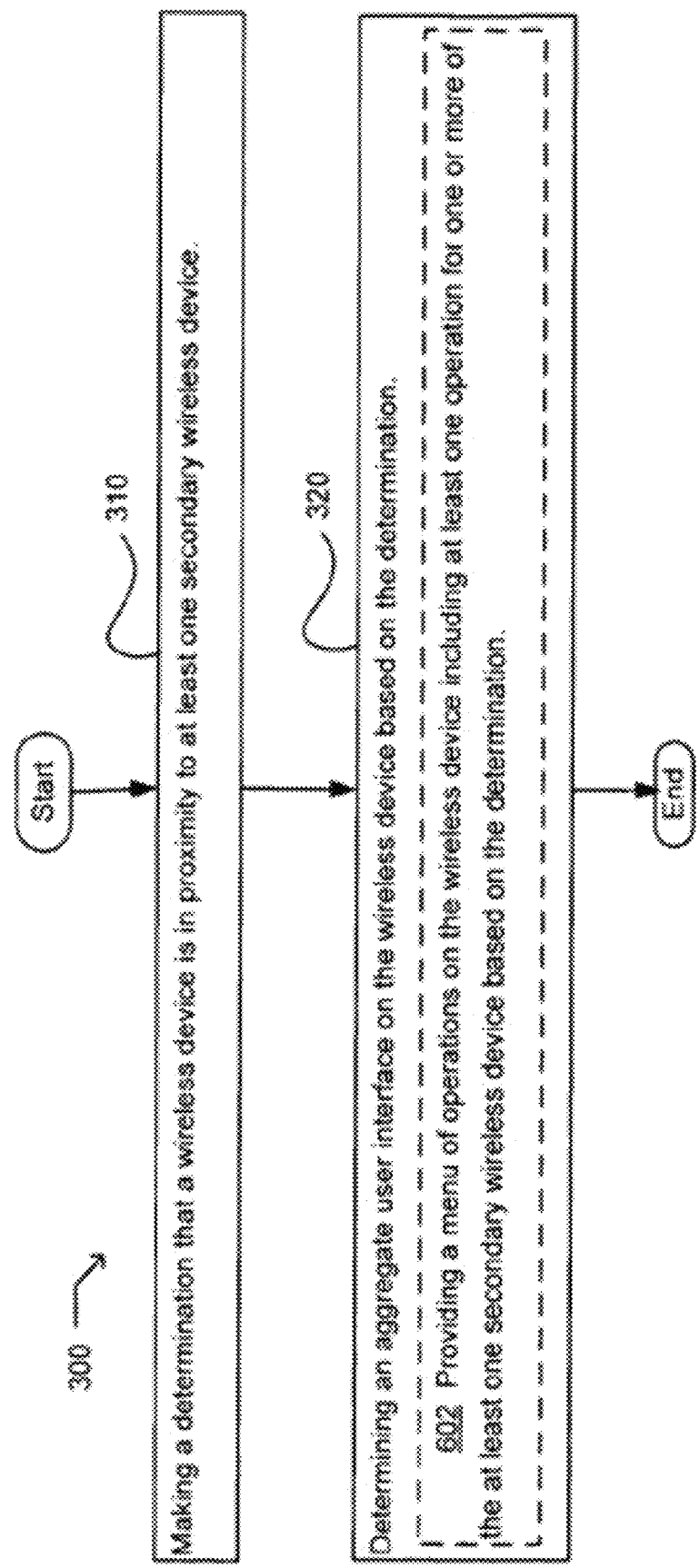
FIG. 6 illustrates an alternative embodiment of the example operational flow of FIG. 3.

FIG. 6 illustrates alternative embodiments of the example operational flow 300 of FIG. 3. FIG. 6 illustrates example embodiments where the determining operation 320 may include at least one additional operation. Additional operations may include an operation 602.

At the operation 602 a menu of operations is provided on the wireless device including at least one operation for one or more of the at least one secondary wireless device based on the determination. For example, menu choices 200-210 give a partial example of some of the menus that may be provided in the aggregate user interface 155. Operations 111, 121, 131 are specific to each of the secondary wireless devices 101. For instance, a CD player may have the operations "play", "stop", and "pause", while a printer may have the operations "print color", "print black and while", or "setup".

Figure 7:
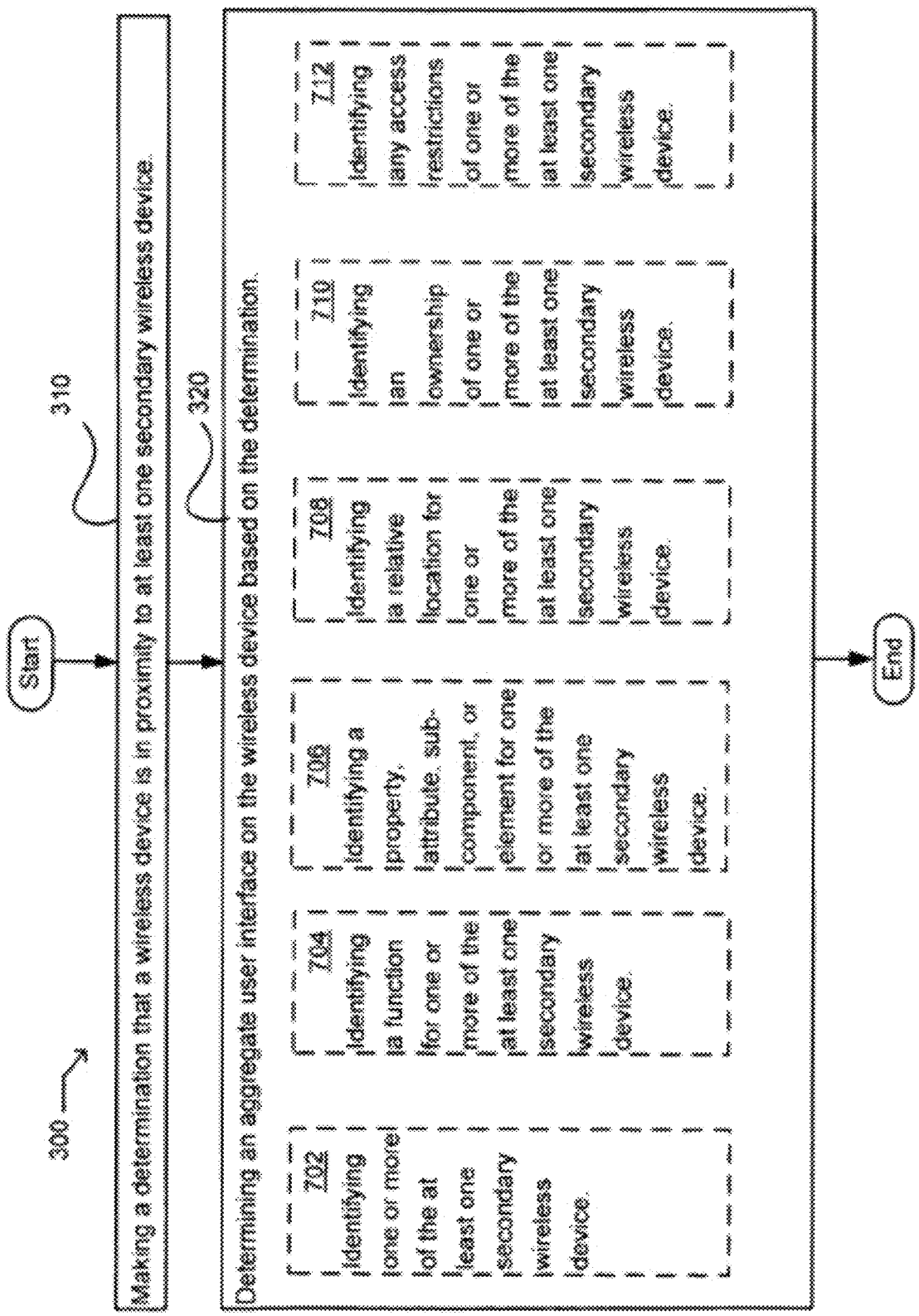
FIG. 7 illustrates an alternative embodiment of the example operational flow of FIG. 3.

FIG. 7 illustrates alternative embodiments of the example operational flow 300 of FIG. 3. FIG. 7 illustrates example embodiments where the determining operation 320 may include at least one additional operation. Additional operations may include in operation 702, operation 704, operation 706, operation 70S, operation 710, and/or operation 712.

At the operation 702 one or more of the at least one secondary wireless devices are identified. The identification process may occur, for example by the wireless device 100, by the secondary wireless devices 101, a combination of both, or alternatively using an external observer object for facilitating such an exchange. In some of the scenarios, the user's wireless device 100 identifies the secondary wireless devices 101 passively and is essentially a receiver of the identification information and uses its determination logic 154 and/or proximity information 158 to complete the identification process.

At the operation 704 a function for one or more of the at least one secondary wireless device is identified. The functions, for example, may represent operations 111, 121 and 131 that are available on the secondary wireless devices 101.

At the operation 706 a property, attribute, or sub-component for one or more of the at least one secondary wireless device is identified. The property, attribute, or sub-component for one or more of the at least one secondary wireless device 101 may be used, for example, to determine an aggregate user interface 155 on the wireless device 100.

At the operation 70S a relative location for one or more of the at least one secondary wireless devices is identified. The relative location may be used, for example, to determine an updated aggregate user interface 155 on the wireless device 100, which may give precedence, for example, to devices that are closer to the user, since those are the devices the user 104 most likely wants to use.

At the operation 710 the ownership for one or more of the at least one secondary wireless device is identified. The ownership may be used, for example, to determine an aggregate user interface 155 on the wireless device 100, which may comprise information related to the owners of the devices in proximity 106. Devices not owned by the user 104 may be inaccessible and hence, not as relevant when determining an aggregate user interface 155.

At the operation 712 any access restrictions for one or more of the at least one secondary wireless device is identified. The access restrictions may be used, for example, to determine an aggregate user interface 155 on the wireless device 100, which may comprise information related to which of the devices in the proximity 106 are devices that the user will be able to access.

Figure 8:
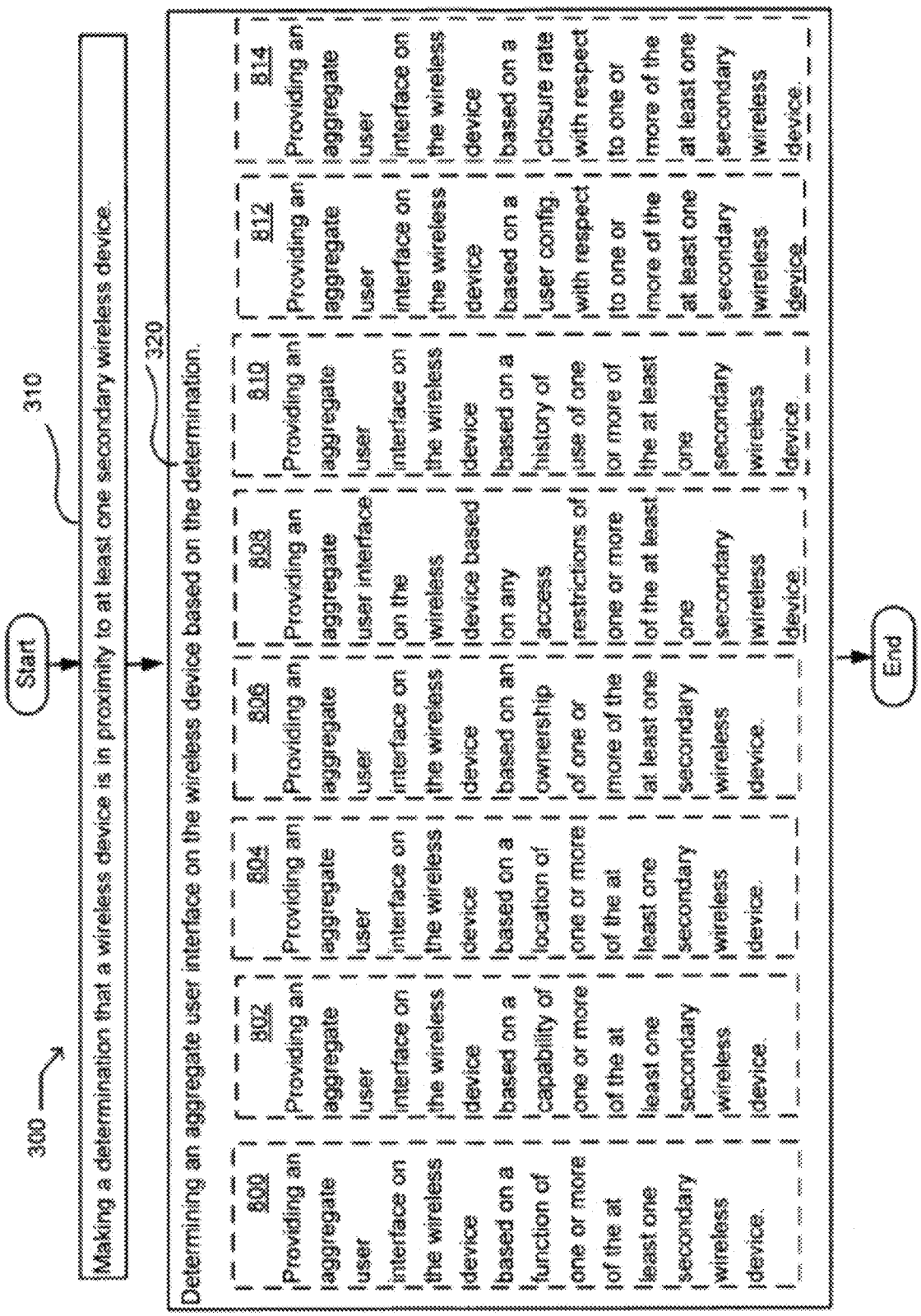
FIG. 8 illustrates an alternative embodiment of the example operational flow of FIG. 3.

FIG. 8 illustrates alternative embodiments of the example operational flow 500 of FIG. 3. FIG. 8 illustrates example embodiments where the determining operation 320 may include at least one additional operation. Additional operations may include an operation 800, operation 802, operation 804, operation 806, operation 808, operation 810, operation 812 and/or operation 814.

At the operation 800 an aggregate user interface is provided on the wireless device based on a function of one or more of the at least one secondary wireless devices. For example, using the wireless device 100, the secondary wireless devices 101, a combination of both, or alternatively using an external observer object, for facilitating such an exchange, the functions for all or some of the secondary wireless devices 101 are used to create in aggregate user interface 155 that may combine all of the available operations into one or more menus.

At the operation 802 an aggregate user interface provided on the wireless device based on a capability of one or more of the at least one secondary wireless device. For example, certain capacity devices may be treated differently when the aggregate user interface 155 is determined. At the operation 804 an aggregate user interface is provided on the wireless device based on a location of one or more of the at least one secondary wireless device. For example, certain locations of devices may be treated differently when the aggregate user interface 155 is determined (i.e., closer devices may be reordered to a higher position in the combined user interface). At the operation 806 an aggregate user interface is provided on the wireless device based on an ownership of one or more of the at least one secondary wireless device. For example, certain ownerships of devices may cause them to be treated differently when the aggregate user interface 155 is determined (i.e., devices the currently logged in user does not own may be removed or pushed down in the aggregate user interface 155).

At the operation 808 an aggregate user interface is provided on the wireless device based on an access restriction of one or more of the at least one secondary wireless device, Devices that are restricted from the current user 104 may be less relevant when determining an aggregate user interface 155. At the operation 810 an aggregate user interface 155 is provided on the wireless device 100 based on a history of use of one or more of the at least one secondary wireless devices 101. For example, if a device has not been used for a long enough period of time it may be dropped from the aggregate user interface 155 altogether. At the operation 812 an aggregate user interface is provided on the wireless device based on a user configuration with respect to one or more of the at least one secondary wireless device. For example, a user configuration may be used to customize the aggregate user interface 155. At the operation 814 an aggregate user interface is provided on the wireless device based on a closure rate of one or more of the at least one secondary wireless device. For example, objects with a closure rate indicating they are near proximity 106 may be pushed high in the aggregate user interface 155 when it is determined, because those are devices the user is likely intending to use in the near future.

Figure 9:
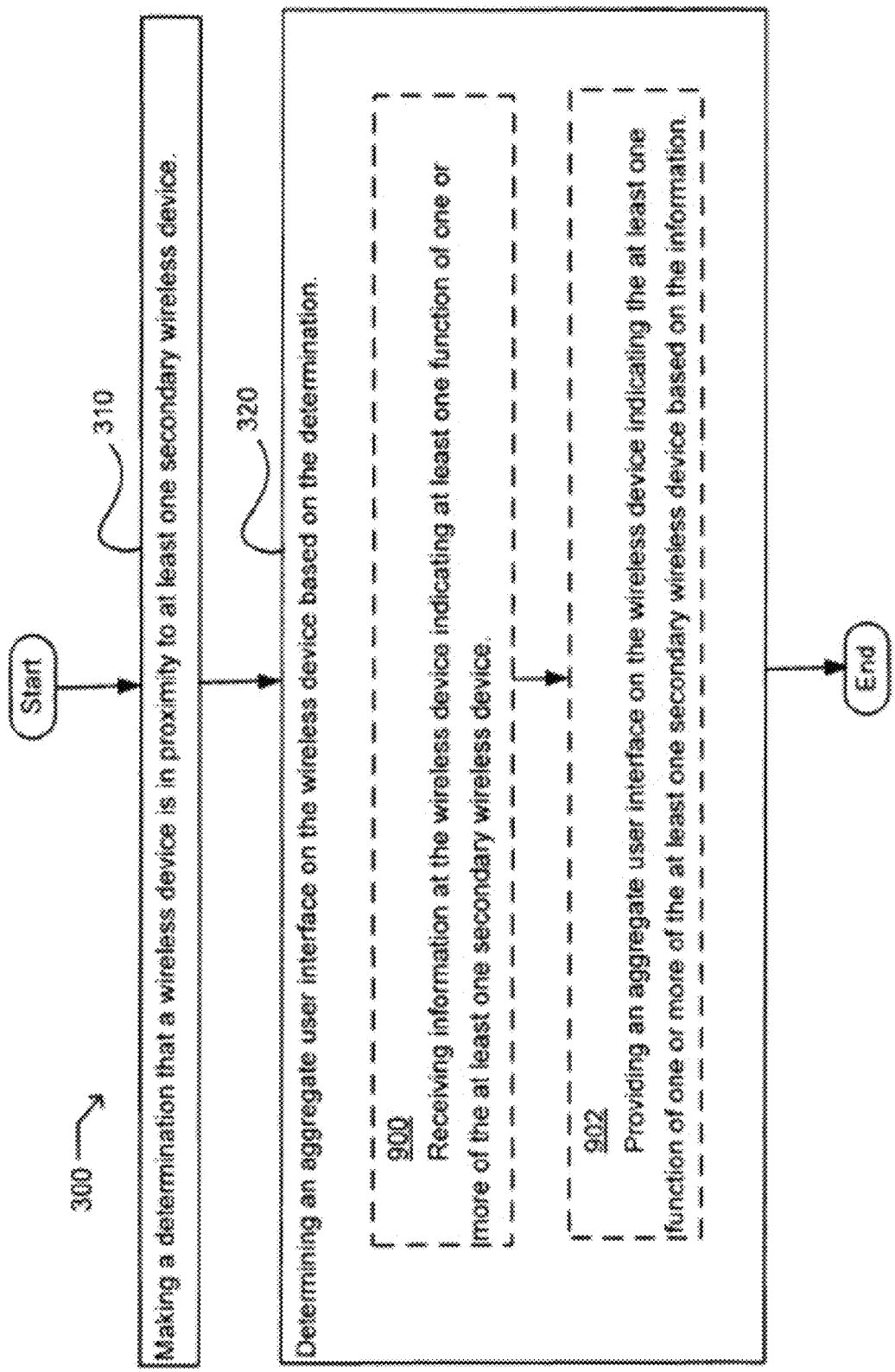
FIG. 9 illustrates an alternative embodiment of the example operational flow of FIG. 3.

FIG. 9 illustrates alternative embodiments of the example operational flow 300 of FIG. 3. FIG. 9 illustrates example embodiments where the determining operation 320 may include at least one additional operation. Additional operations may include an operation 900, and/or operation 902.

At the operation 900 information is received at the wireless device indicating at least one function of one or more of the at least one secondary wireless device. Functions may include, for example, the available interactions that the user may have with the secondary wireless devices 101 which are in proximity 106 to the wireless device 100.

At the operation 902 an aggregate user interface is provided on the wireless device indicating the at least one function of one or more of the at least one secondary wireless device based on the information. The wireless device 100 may, for example, use determination logic 154 in conjunction with proximity information 158 in order to present the functions in the aggregate user interface 155 in a more intuitive manner, for instance, closer devices can be displayed higher in the menu.

Figure 10:
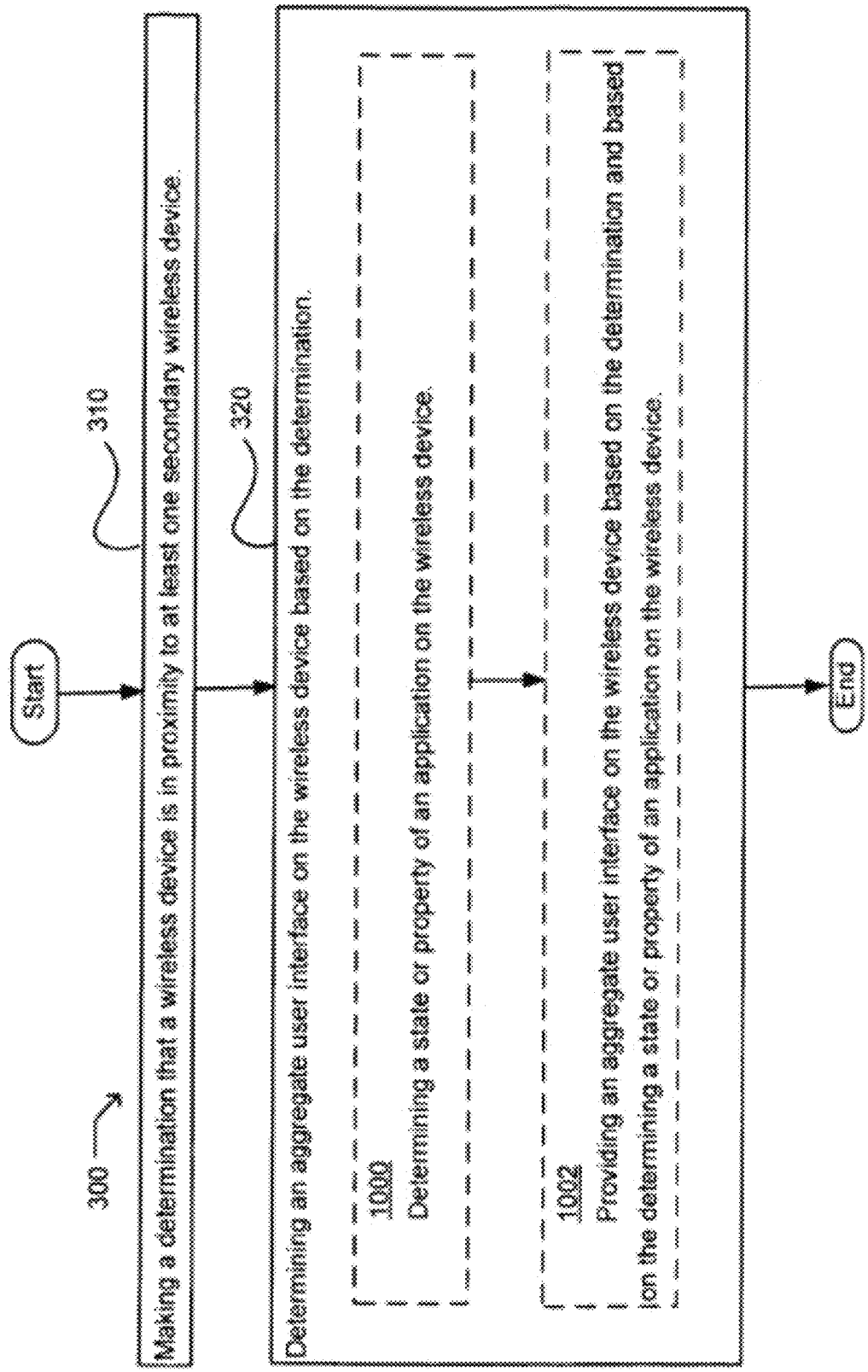
FIG. 10 illustrates an alternative embodiment of the example operational flow of FIG. 3.

FIG. 10 illustrates alternative embodiments of the example operational flow 300 of FIG. 3. FIG. 10 illustrates example embodiments where the determining operation 320 may include at least one additional operation. Additional operations may include an operation 1000 and/or operation 1002.

At the operation 1000 a state or property of an application on the wireless device is determined. The open applications may, for example, provide indicators to the system as to how default operations should take place when a wireless device 100 with such an open application is in proximity 106 to a secondary wireless device 101.

At the operation 1002 an aggregate user interface on the wireless device is provided based on the determination and based on the determining a state or property of an application on the wireless device. For example, the user 104 may have a web browser application executing on the wireless device 100 and the web browser is pointed to the "ANAHEIM ANGELS" baseball team website. If the user 104 takes the wireless device 100 toward proximity 106 and makes a connection with a TV with a record live television function, then the automatic invocation system 198 may automatically schedule the ANAHEIM ANGELS baseball game to be recorded, if such a game is found in the program guide or other data.

Figure 11:
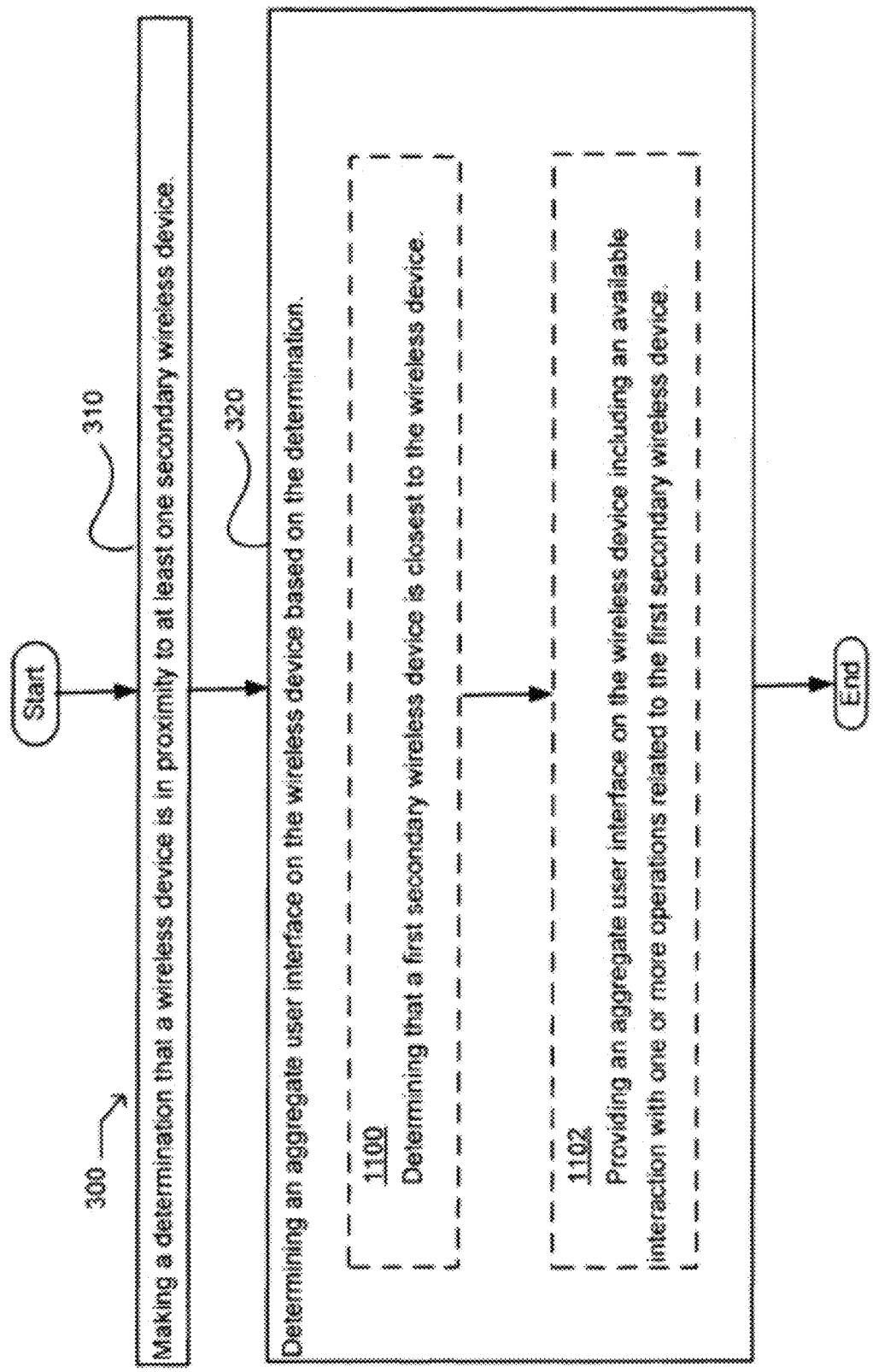
FIG. 11 illustrates an alternative embodiment of the example operational flow of FIG. 3.

FIG. 11 illustrates alternative embodiments of the example operational flow 300 of FIG. 3. FIG. 11 illustrates example embodiments where the determining operation 320 may include at least one additional operation. Additional operations may include an operation 1100 and/or operation 1102.

At the operation 1100 it is determined that a first secondary wireless device is closest to the wireless device. At the operation 1102 an aggregate user interface is provided on the wireless device including an available interaction with one or more operations related to the first secondary wireless device. For example, as the user 104 walks toward a CD player and the CD player becomes the closest secondary wireless device 101, an aggregate user interface 155 may be provided on the wireless device 100 giving the user the options, for instance, "Play" and "Eject" most prominently.

Figure 12:
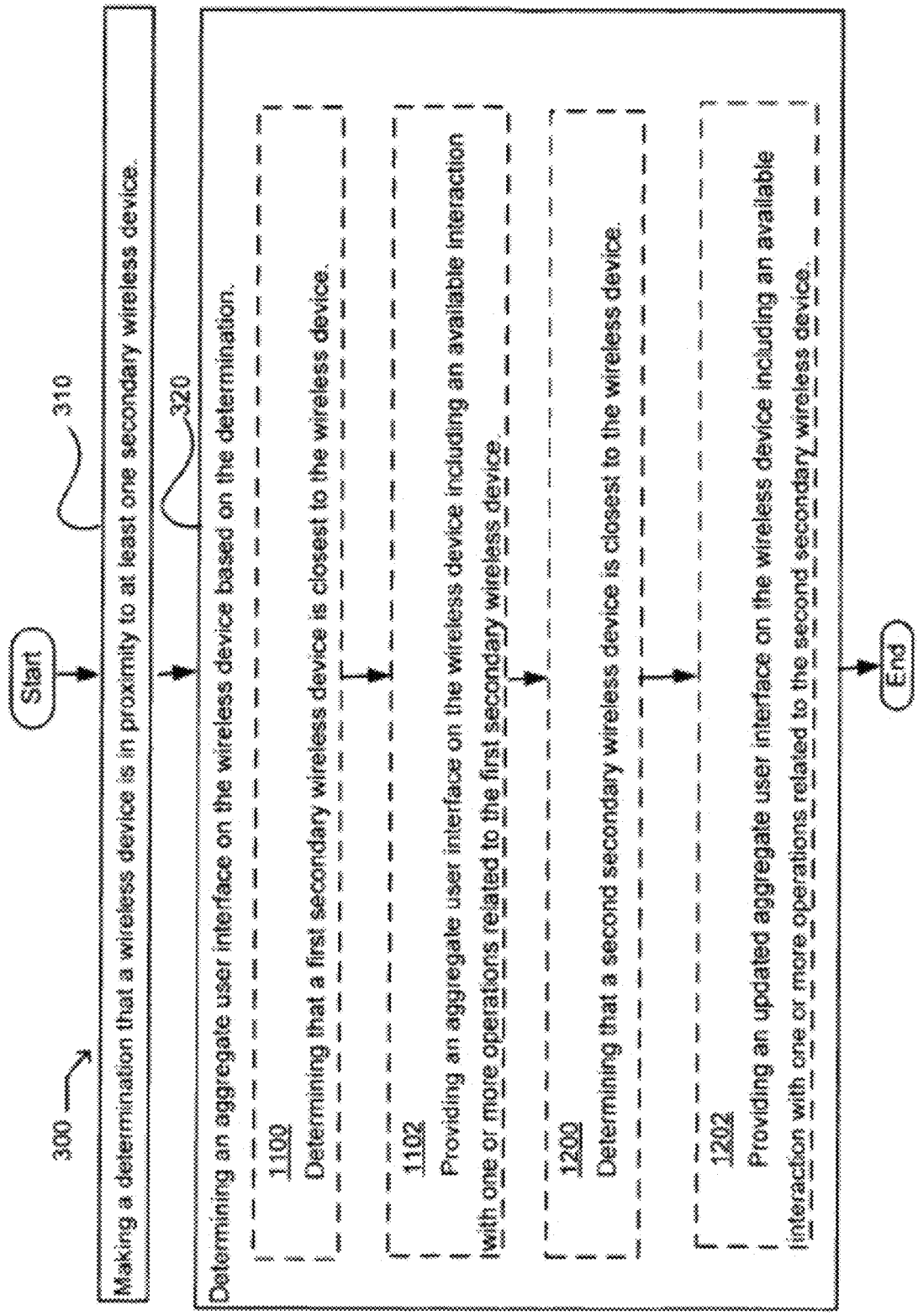
FIG. 12 illustrates an alternative embodiment of the example operational flow of FIG. 3.

FIG. 12 illustrates alternative embodiments of the example operational flow 300 of FIG. 3. FIG. 12 illustrates example embodiments where the determining operation 320 may include at least one additional operation. Additional operations may include an operation 1200 and operation 1202.

At the operation 1200 it is determined that a second secondary wireless device is closest to a wireless device. At the operation 1202 an aggregate user interface is provided on the wireless device including an available interaction with one or more operations related to the second secondary wireless device.

For example, as previously described, the user 104 walks toward a CD player and the CD player becomes the closest secondary wireless device 101, an aggregate user interface 155 may be provided on the wireless device 100 giving the user the options, for instance, "play" and "eject" most prominently. As the user 104 moves away from the CD player, the television may become the closest device, so the aggregate user interface 155 is updated when the new information as determined. A new menu may then be provided on wireless device 100 that includes, for instance, indicating available interaction with one or more operations related to the television, such as "TV ON", "RECORD", and "TV GUIDE" for example.

Figure 13:
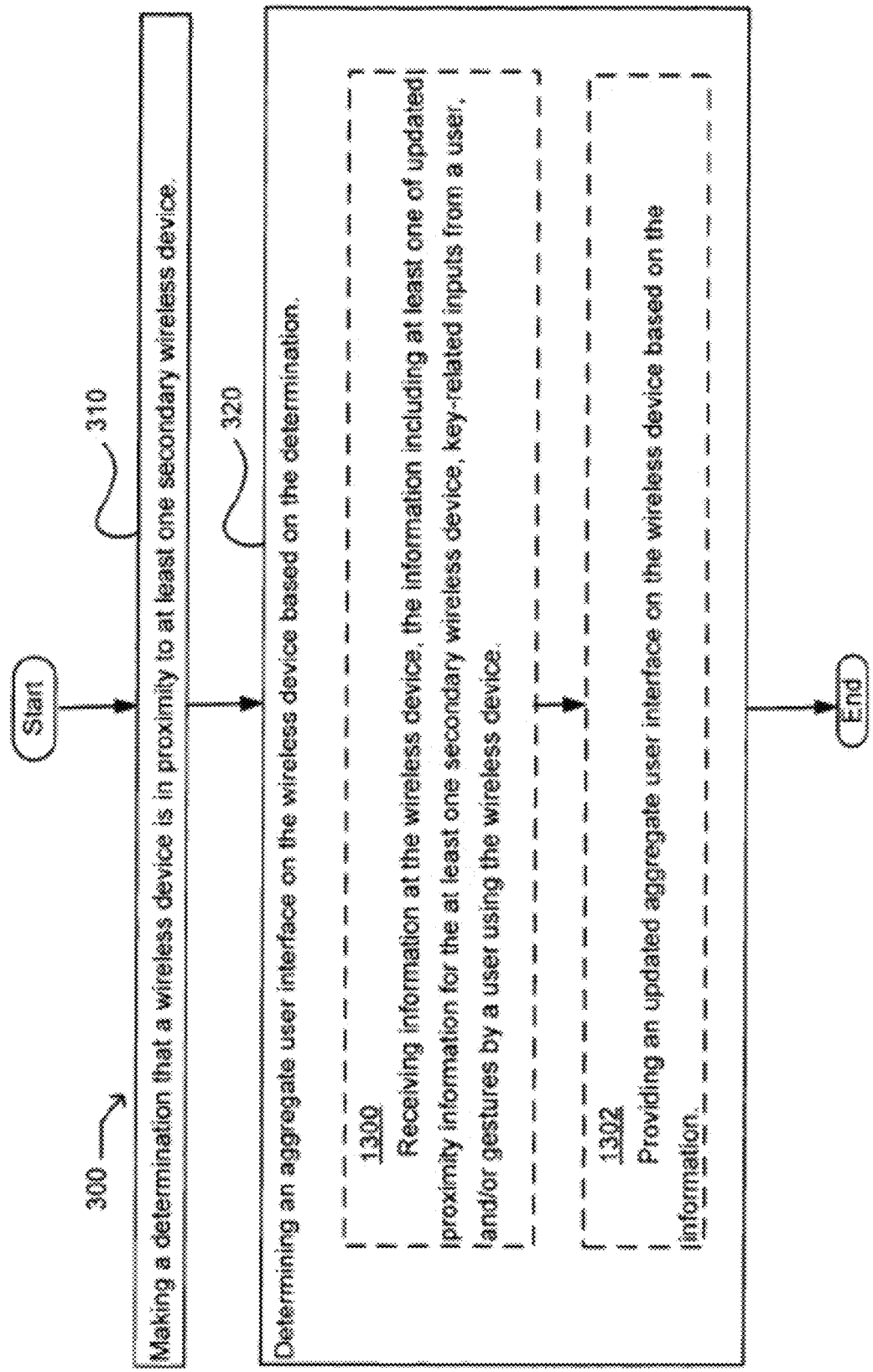
FIG. 13 illustrates an alternative embodiment of the example operational flow of FIG. 3.

FIG. 13 illustrates alternative embodiments of the example operational flow 300 of FIG. 3. FIG. 13 illustrates example embodiments where the determining operation 320 may include at least one additional operation. Additional operations may include an operation 1300 and/or operation 1302.

At the operation 1300 information is received at the wireless device, the information including at least one of updated proximity information for the at least one secondary wireless device, key-related inputs from a user, and/or gestures by a user using the wireless device. At the operation 1302 an updated aggregate user interface is provided on the wireless device based on the information.

Figure 14:
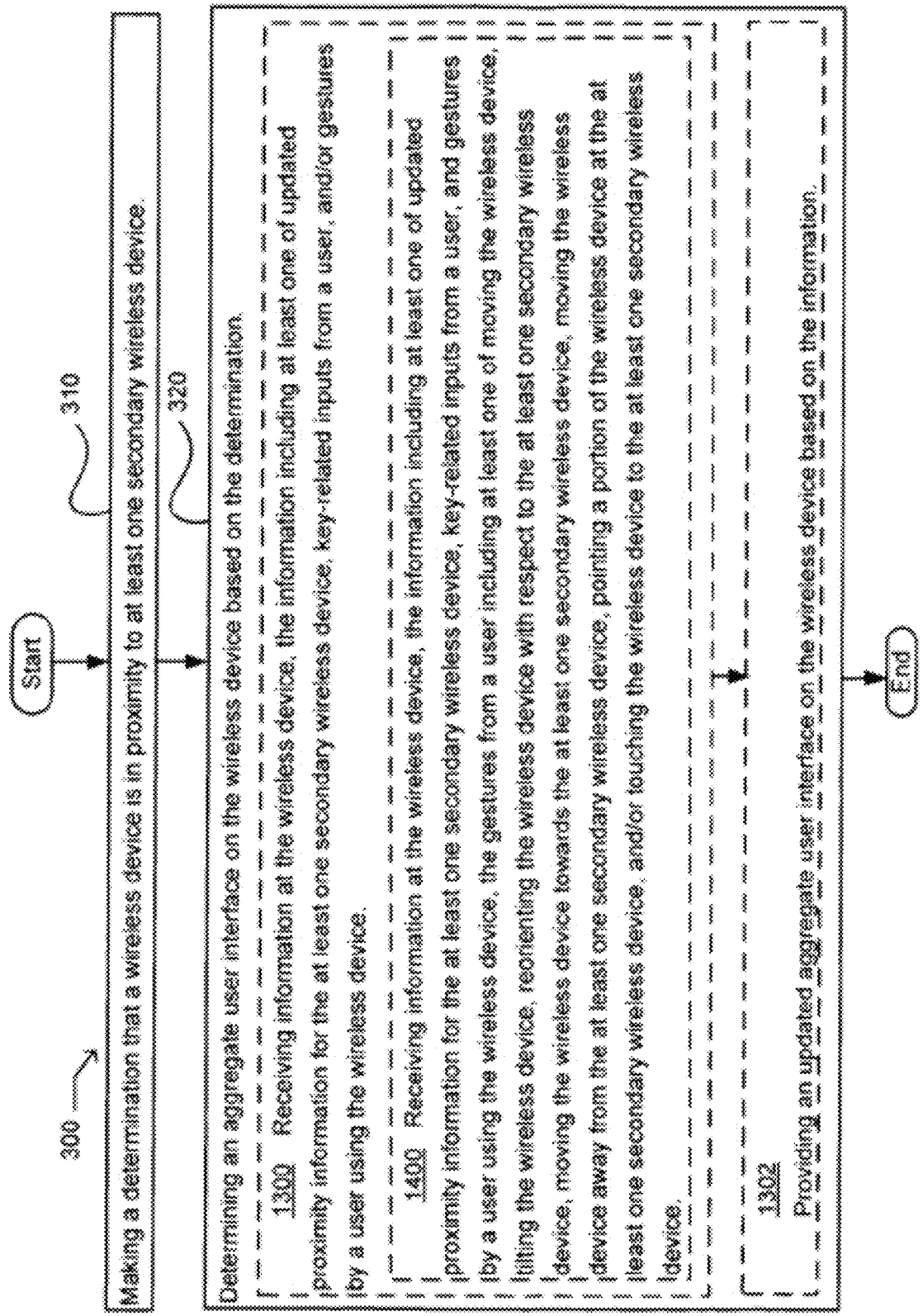
FIG. 14 illustrates an alternative embodiment of the example operational flow of FIG. 3.

FIG. 14 illustrates alternative embodiments of the example operational flow 300 of FIG. 3. FIG. 14 illustrates example embodiments where the receiving operation 1300 may include at least one additional operation. Additional operations may include an operation 1400.

At the operation 1400 information is received at the wireless device, the information including at least one of updated proximity information for the at least one secondary wireless device, key-related inputs from a user, and gestures by a user using the wireless device, the gestures from a user including at least one of moving the wireless device, tilting the wireless device, reorienting the wireless device with respect to the at least one secondary wireless device, moving the wireless device towards the at least one secondary wireless device, moving the wireless device away from the at least one secondary wireless device, pointing a portion of the wireless device at the at least one secondary wireless device, and/or touching the wireless device to the at least one secondary wireless device.

Figure 15:
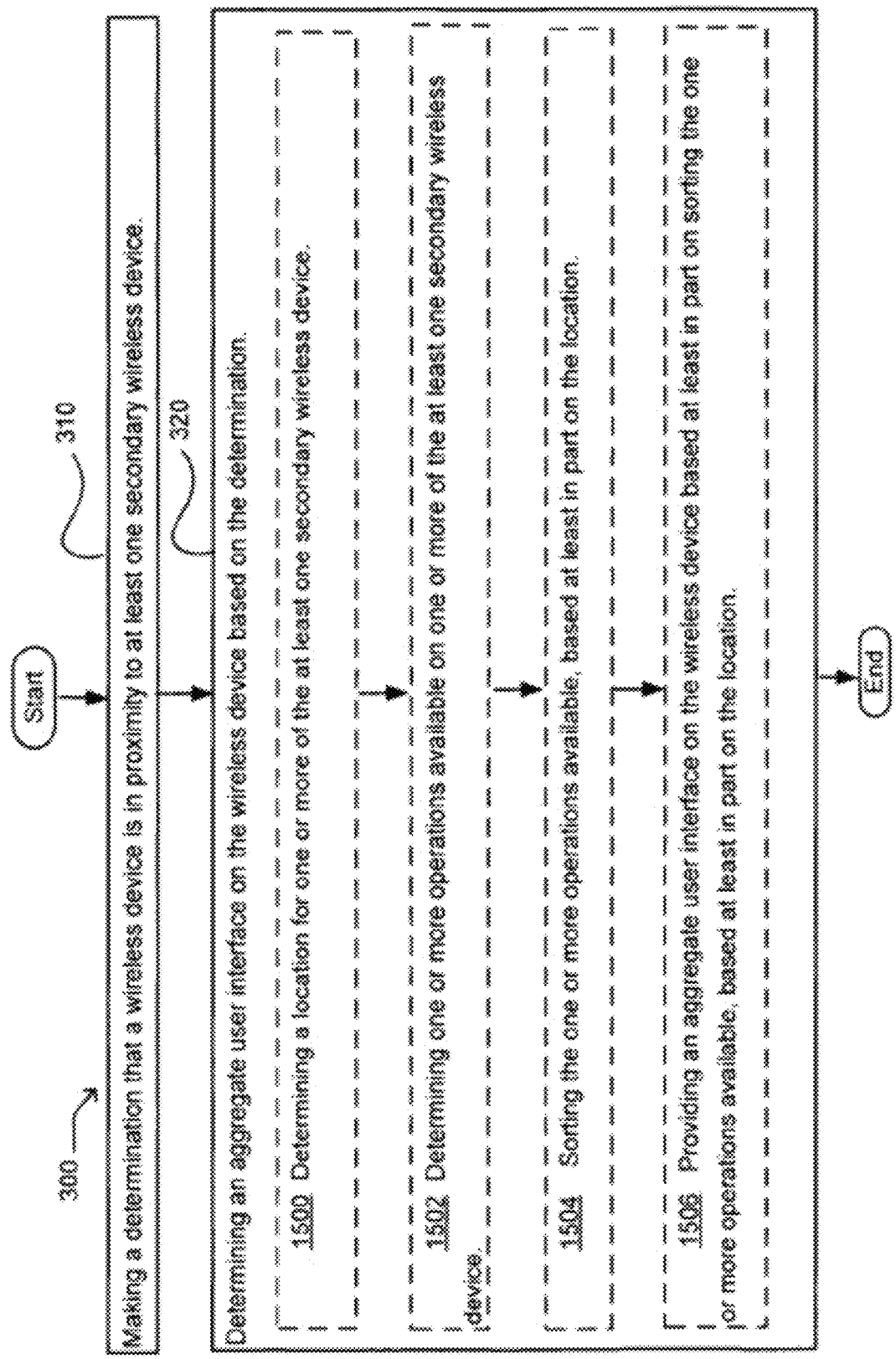
FIG. 15 illustrates an alternative embodiment of the example operational flow of FIG. 3.

FIG. 13 illustrates alternative embodiments of the example operational flow 300 of FIG. 3. FIG. 15 illustrates example embodiments where the determining operation 320 may include at least one additional operation, Additional operations may include an operation 1500, operation 1502, operation 1504, and/or operation 1506.

At the operation 1500 a location of one or more of the at least one secondary wireless device is determined. At operation 1502 one or more operations available on one or more of the at least one secondary wireless device are determined. At operation 1504 the one or more operations available are sorted, based at least in part on the location. At operation 1506, an aggregate user interface is provided on the wireless device based at least in part on sorting the one or more operations available, based at least in part on the location.

Figure 16:
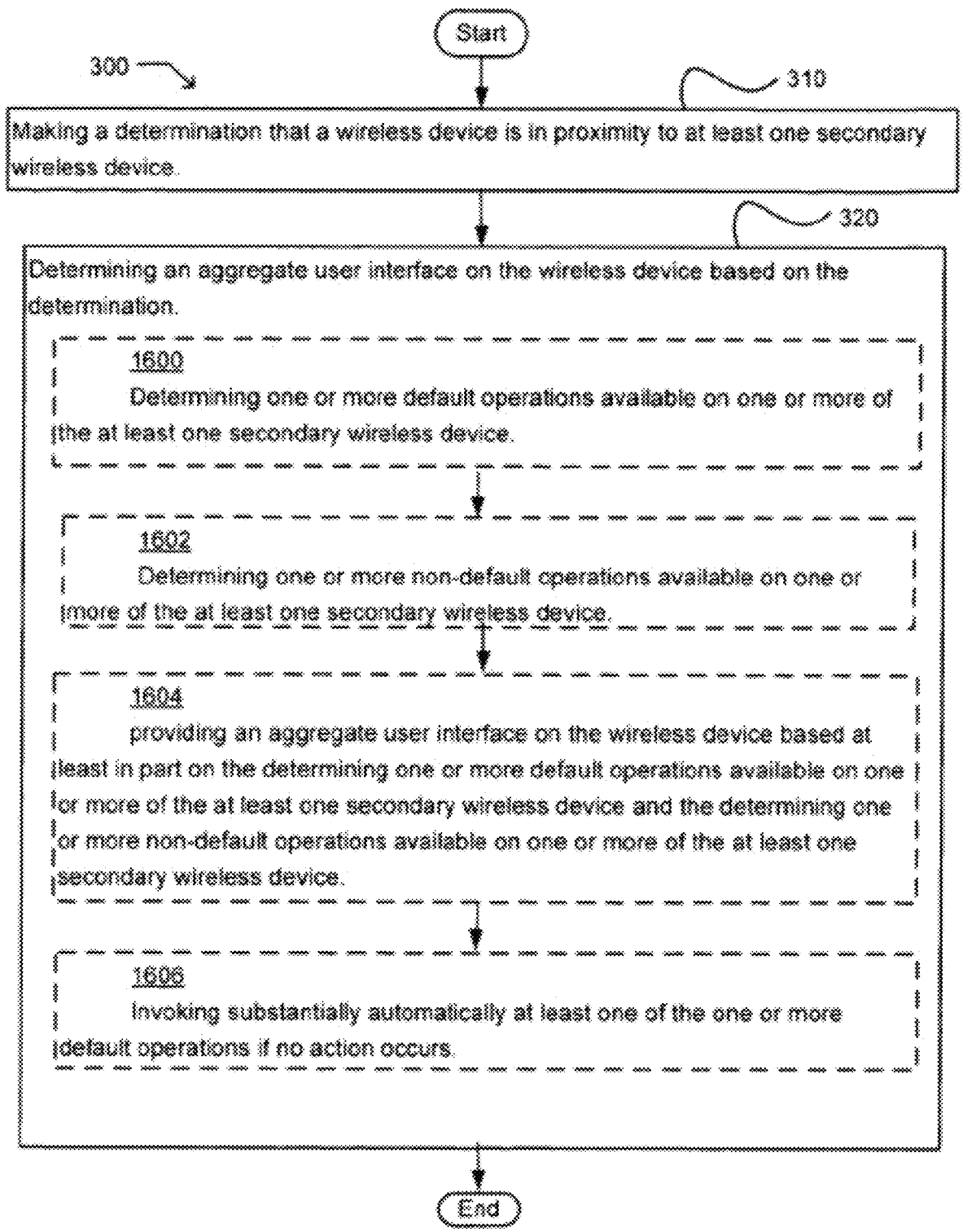
FIG. 16 illustrates an alternative embodiment of the example operational flow of FIG. 3.

FIG. 16 illustrates alternative embodiments of the example operational flow 300 of FIG. 3. FIG. 16 illustrates example embodiments where the determining operation 320 may include at least one additional operation. Additional operations may include an operation 1600, operation 1602, operation 1604, and/or operation 1606.

At the operation 1600 one or more default operations available on one or more of the at least one secondary wireless device are determined. At operation 1602 one or more non-default operations available on one or more of the at least one secondary wireless device are determined. At operation 1604 an aggregate user interface is provided on the wireless device based at least in part on the determining one or more default operations available on one or more of the at least one secondary wireless device and determining one or more non-default operations available on one or more of the at least one secondary wireless device. At operation 1606, at least one of the one or more default operations are invoked substantially automatically if no action occurs.

Figure 17:
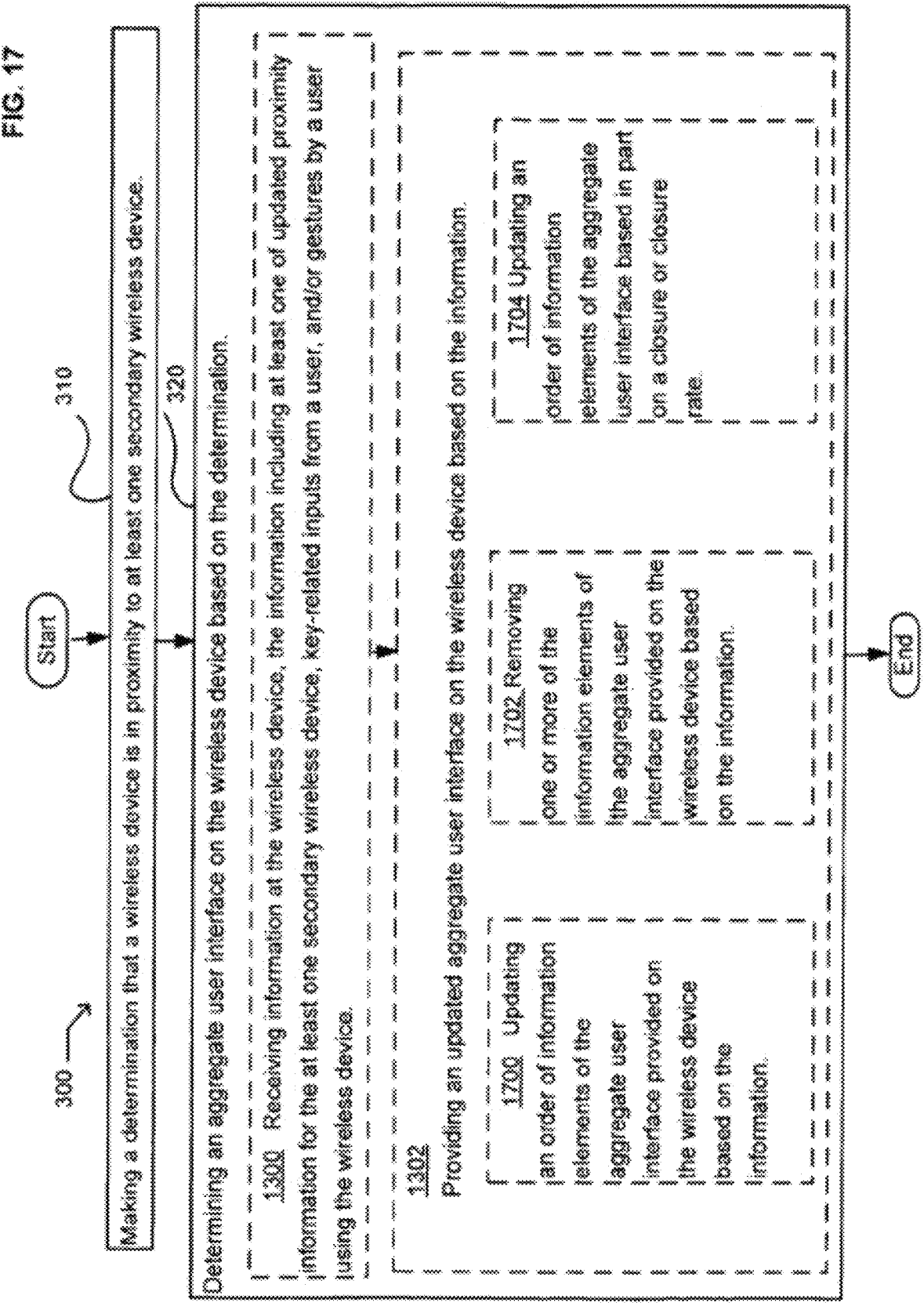
FIG. 17 illustrates an alternative embodiment of the example operational flow of FIG. 3.

FIG. 17 illustrates alternative embodiment of the example operational flow 300 of FIGS. 3 and 13. FIG. 17 illustrates example embodiments where the providing operation 1302 may include at least one additional operation. Additional operations may include an operation 1700, operation 1702, and/or operation 1704.

At the operation 1700 an order of information elements of the aggregate user interface provided on the wireless device is updated based on the information. For example, an order of operations in a menu may be adjusted to provide operations for a closest device at the top, and operations for devices farthest away near the bottom of the menu. At operation 1702 one or more of the information elements of the aggregate user interface provided on the wireless device are removed based on the information. For example, based on a user input or based on updated proximity information for a device, operations for a secondary wireless device may be removed from a menu. At operation 1704 an order of information elements of the aggregate user interface is updated based in part cm a closure or closure rate. For example, a listing or menu of available devices or wireless devices in proximity may be updated to list a secondary wireless device at the top of the menu that has a rate of closure (e.g., a rate of decreasing distance or increasing signal strength) that may be greater than other secondary wireless devices in proximity to the wireless device. This may, for example, indicate that the user/wireless device is approaching a specific secondary wireless device (more quickly than other devices), and the operations associated with this specific secondary wireless device may be listed at a top of the menu, highlighted, etc.

Figure 18:
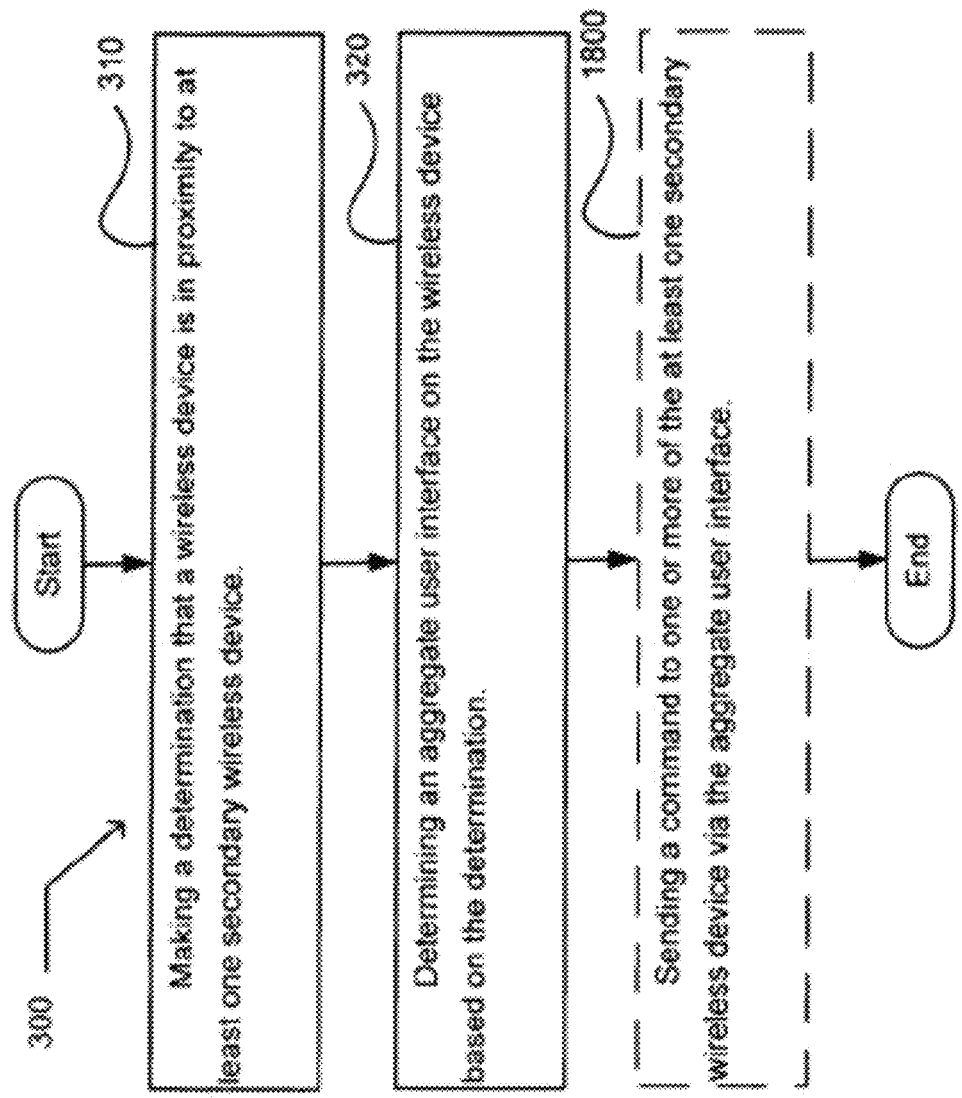
FIG. 18 illustrates an alternative embodiment of the example operational flow of FIG. 3.

FIG. 18 illustrates an alternative embodiment of the example operational flow 300 of FIG. 3. FIG. 18 illustrates an example embodiment where the example operational flow 300 may include at least one additional operation Additional operations may include an operation 1800. At sending operation 1800, a command is sent to one or more of the at least one secondary wireless device via the aggregate user interface. For example, the command may be sent in response to the aggregate user interface 155 that has been provided to the user 104.

Figure 19:
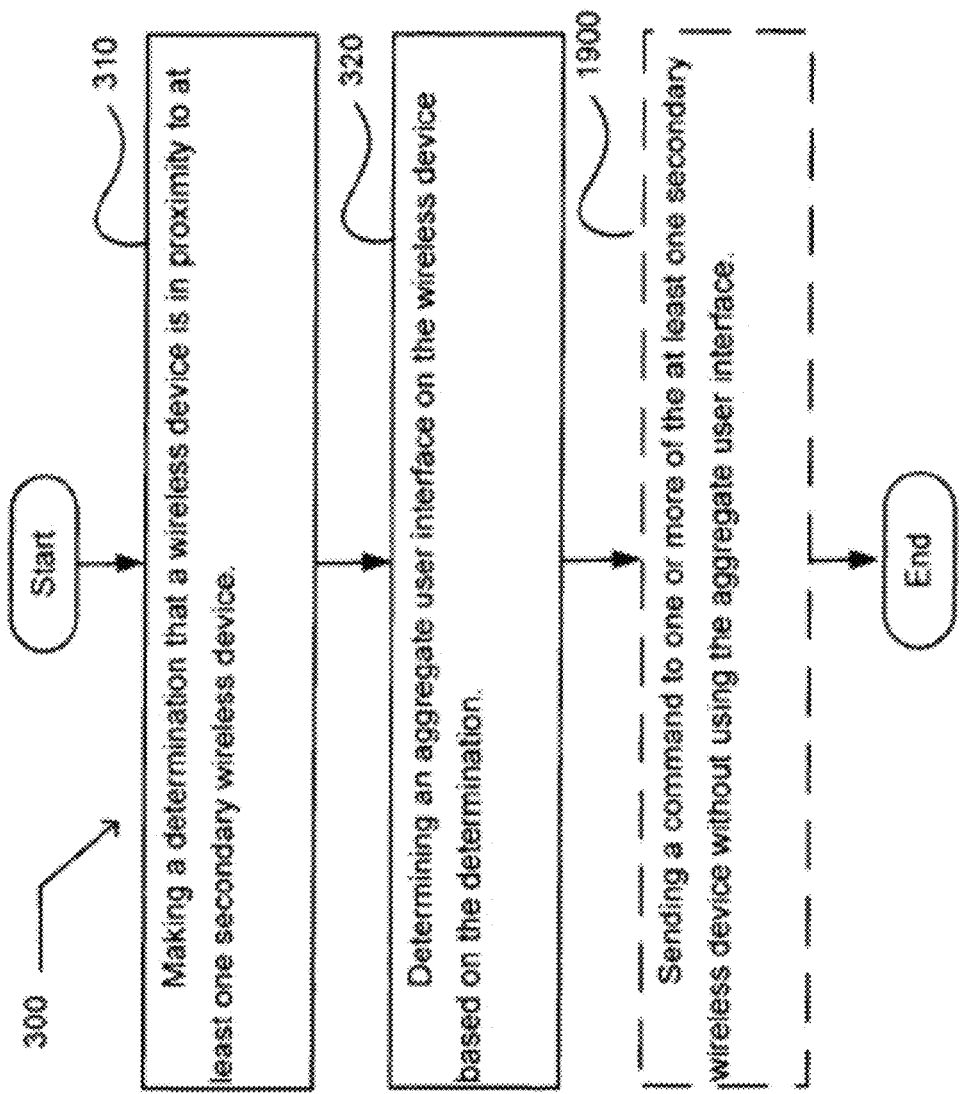
FIG. 19 illustrates an alternative embodiment of the example operational flow of FIG. 3.

FIG. 19 illustrates an alternative embodiment of the example operational flow 300 of FIG. 3. FIG. 19 illustrates an example embodiment where the example operational flow 300 may include at least one additional operation. Additional operations may include an operation 1900. At sending operation 1900, a command is sent to one or more of the at least one secondary wireless devices without using the aggregate user interface. For example, the command may be sent in response to a default operation, a minimal interaction like a gesture, a tilting of the wireless device 100, a re-orientation of the wireless device 100, any event that activates automatic invocation system 198, and the like.

Figure 20:
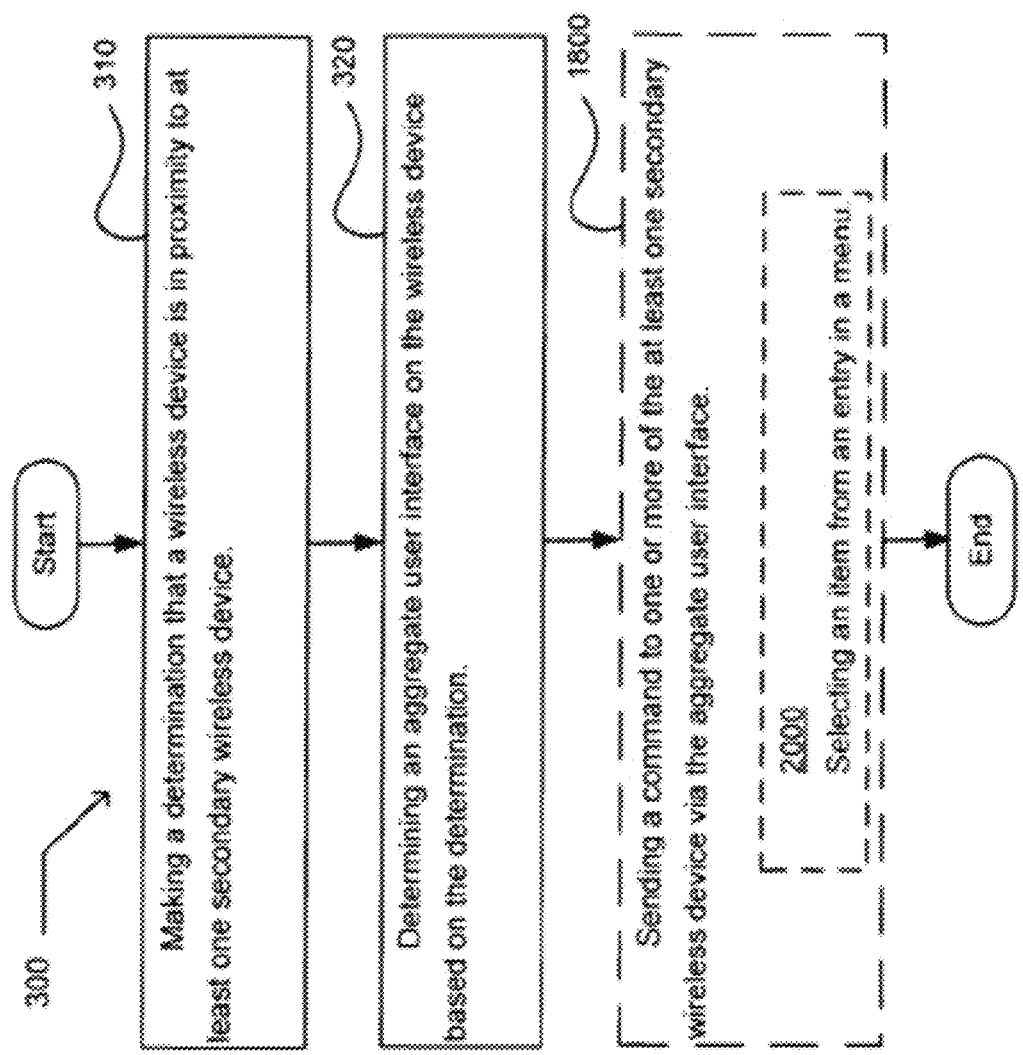
FIG. 20 illustrates an alternative embodiment of the example operational flow of FIG. 3.

FIG. 20 illustrates an alternative embodiment of the example operational flow 300 of FIG. 18. FIG. 20 illustrates an example embodiment where the sending operation 1800 may include at least one additional operation. Additional operations may include an operation 2000.

At selecting operation 2000, an item is selected from an entry in a menu. Therefore, the user may use the aggregate user interface 155 when a menu 156 is provided, for example. Selecting an entry in the menu 156 may comprise, for instance, sending a command to invoke one or more operations on one or more of the secondary wireless devices 101.

Figure 21:
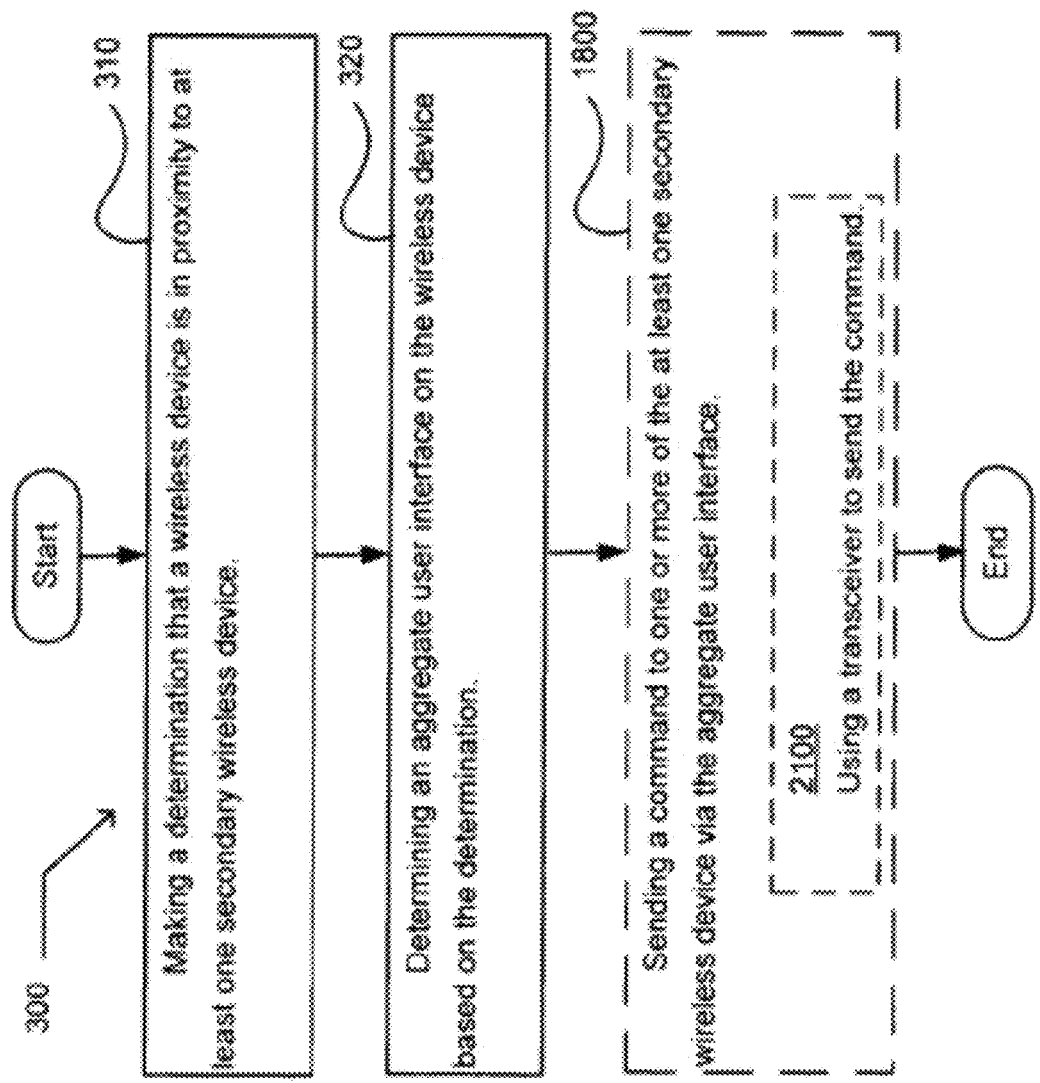
FIG. 21 illustrates an alternative embodiment of the example operational flow of FIG. 3.

FIG. 21 illustrates an alternative embodiment of the example operational flow 300 of FIG. 18. FIG. 21 illustrates an example embodiment where the sending operation 1800 may include at least one additional operation Additional operations may include an operation 2100.

At the operation 2100 a transceiver is used to send the command. For example, as shown in FIG. 1, wireless device 100 may make a determination that secondary wireless devices 101 are in proximity 106 to wireless device 100 by detecting a touching net contact between the two wireless devices. Alternatively, wireless device 100 may make a determination that it is in proximity 106 at near a secondary wireless device 101 by wirelessly detecting the secondary wireless device 101 and/or establishing a wireless link or connection with the secondary wireless device 101, for example. A transceiver 157 may be used in the wireless device 100 and/or the secondary wireless devices 101 to handle the connection. The command which is transmitted using the transceiver 157 may be, for instance, to invoke one or more operations on the secondary wireless device 101.

Figure 22:
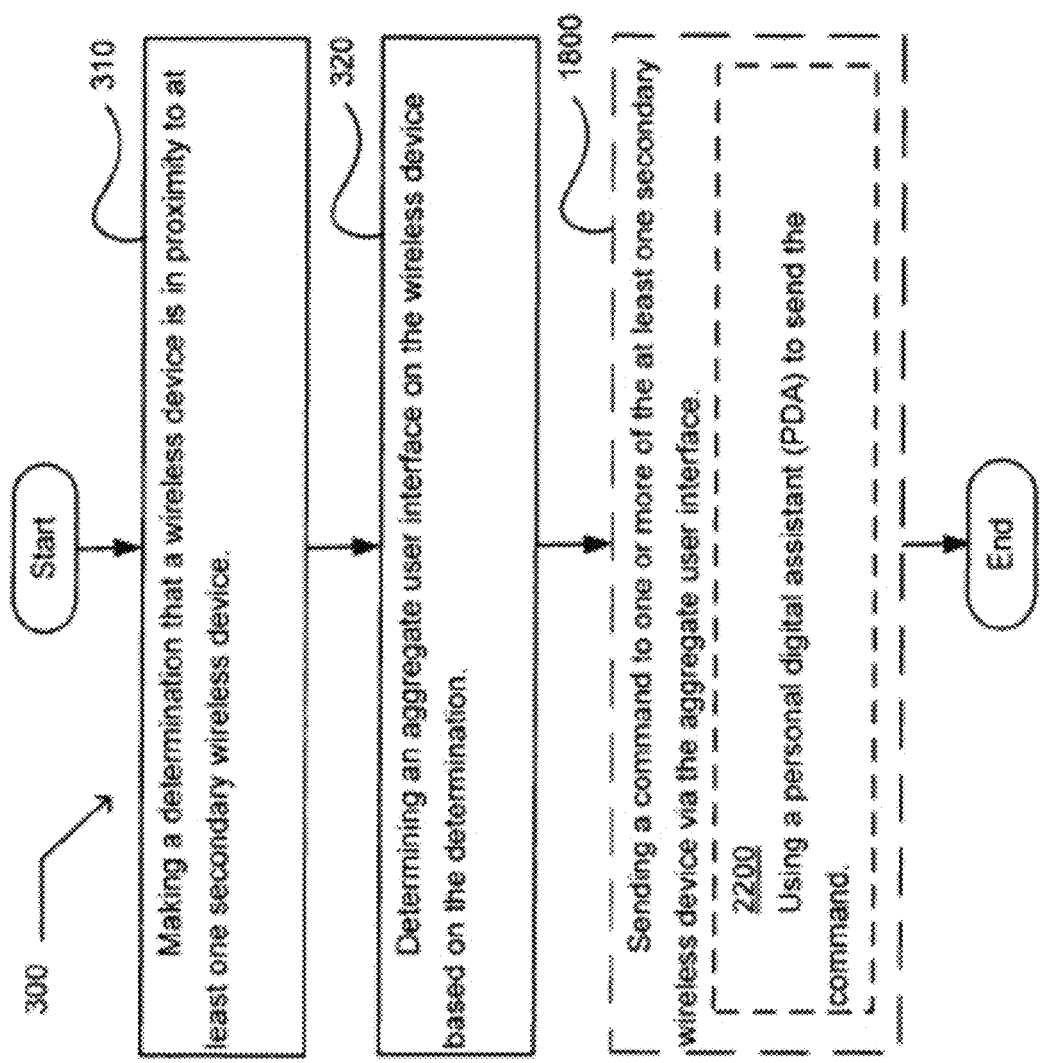
FIG. 22 illustrates an alternative embodiment of the example operational flow of FIG. 3.

FIG. 22 illustrates an alternative embodiment of the example operational flow 300 of FIG. 18. FIG. 22 illustrates an example embodiment where the vending operation 1800 may include at least one additional operation. Additional operations may include an operation 2200.

At the operation 2200 a personal digital assistant (PDA) is used to send the command. For example, the PDA may be not only a controller 160 for the wireless device 100, but it may also be in a state that is used by the system when determining what aggregate user interface 155 should be provided, (i.e., if the user has an open browser application, the user's URL may be used to determine what state the secondary wireless device 101 should enter when it is turned on).

Figure 23:
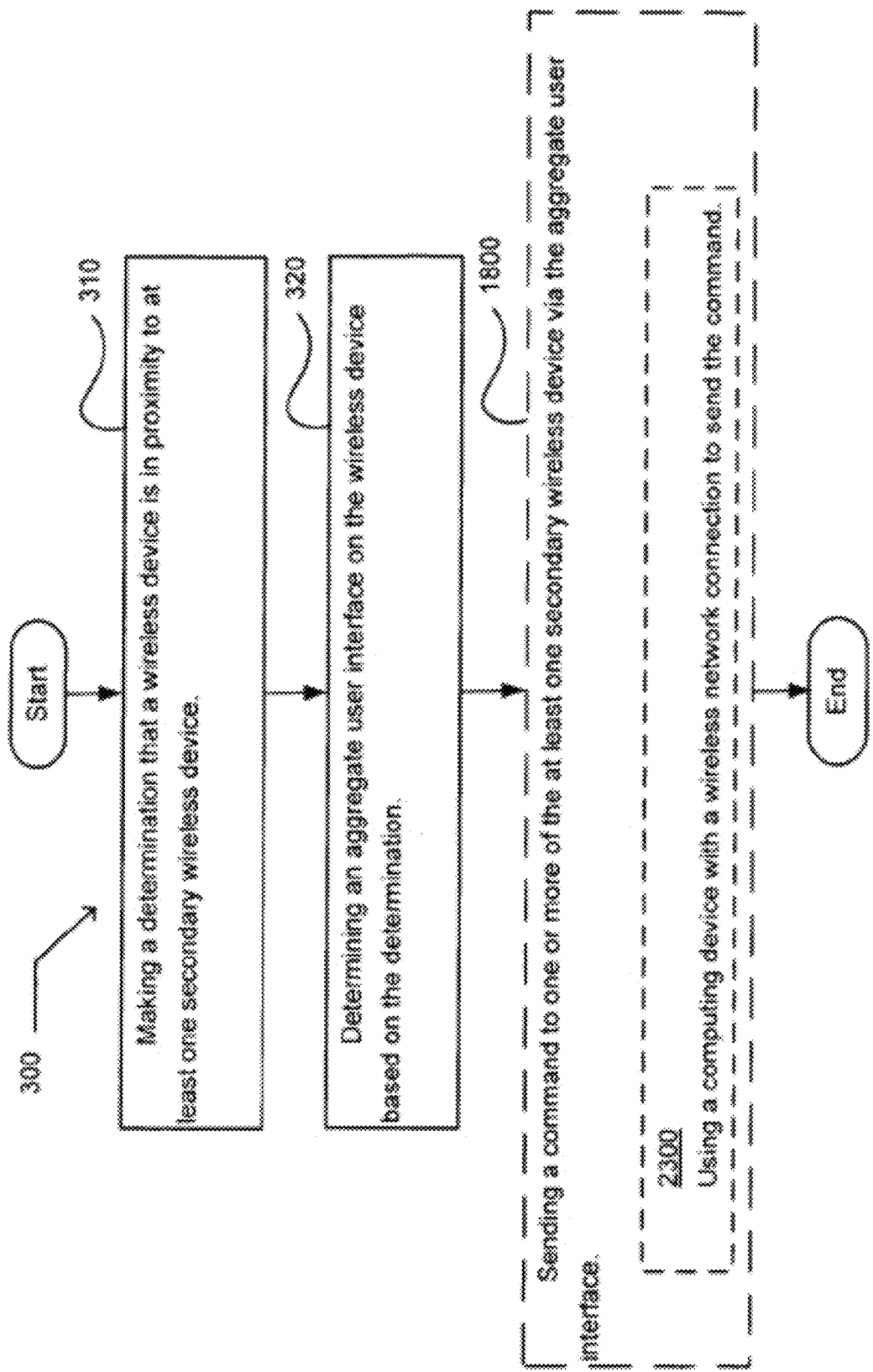
FIG. 23 illustrates an alternative embodiment of the example operational flow of FIG. 3.

FIG. 23 illustrates an alternative embodiment of the example operational flow 300 of FIG. 18. FIG. 23 illustrates an example embodiment where the sending operation 1800 may include at least one additional operation. Additional operations may include an operation 2300.

At the operation 2300 a computing device with a wireless network connection is used to send the command. For example, the computing device may be not only a controller 160 for the wireless device 100, but it may also be in a state that is used by the system when determining what aggregate user interface 155 should be provided, (e.g., if the user has in open "contact" application, the user's contact may be e-mailed an image automatically, if the user 104 connects to a secondary wireless device 101 that has that image displayed).

Figure 24:
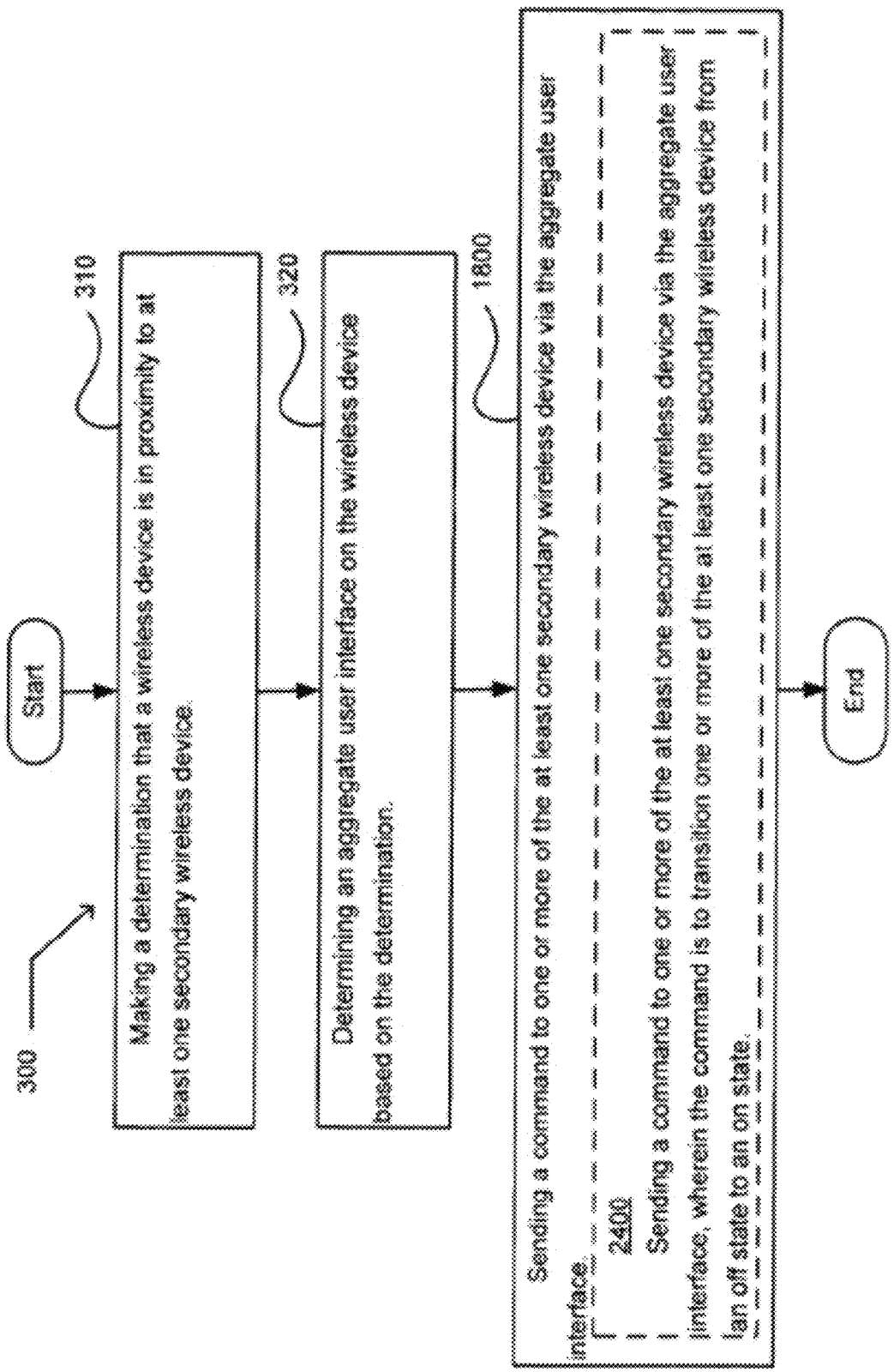
FIG. 24 illustrates an alternative embodiment of the example operational flow of FIG. 3.

FIG. 24 illustrates an alternative embodiment of the example operational flow 300 of FIG. 18. FIG. 24 illustrates in example embodiment where the sending operation 1800 may include at least one additional operation. Additional operations may include an operation 2400.

At the sending operation 2400, a command is sent to one or more of the at least one secondary wireless device via the aggregate user interface, wherein the command is to transition one or more of the at least one secondary wireless device from an off state to an on state. For example, the wireless device 100 may be used to activate (or turn on) a secondary wireless device 101 that is currently turned off, when the user 104 wants to access the device.

Figure 25:
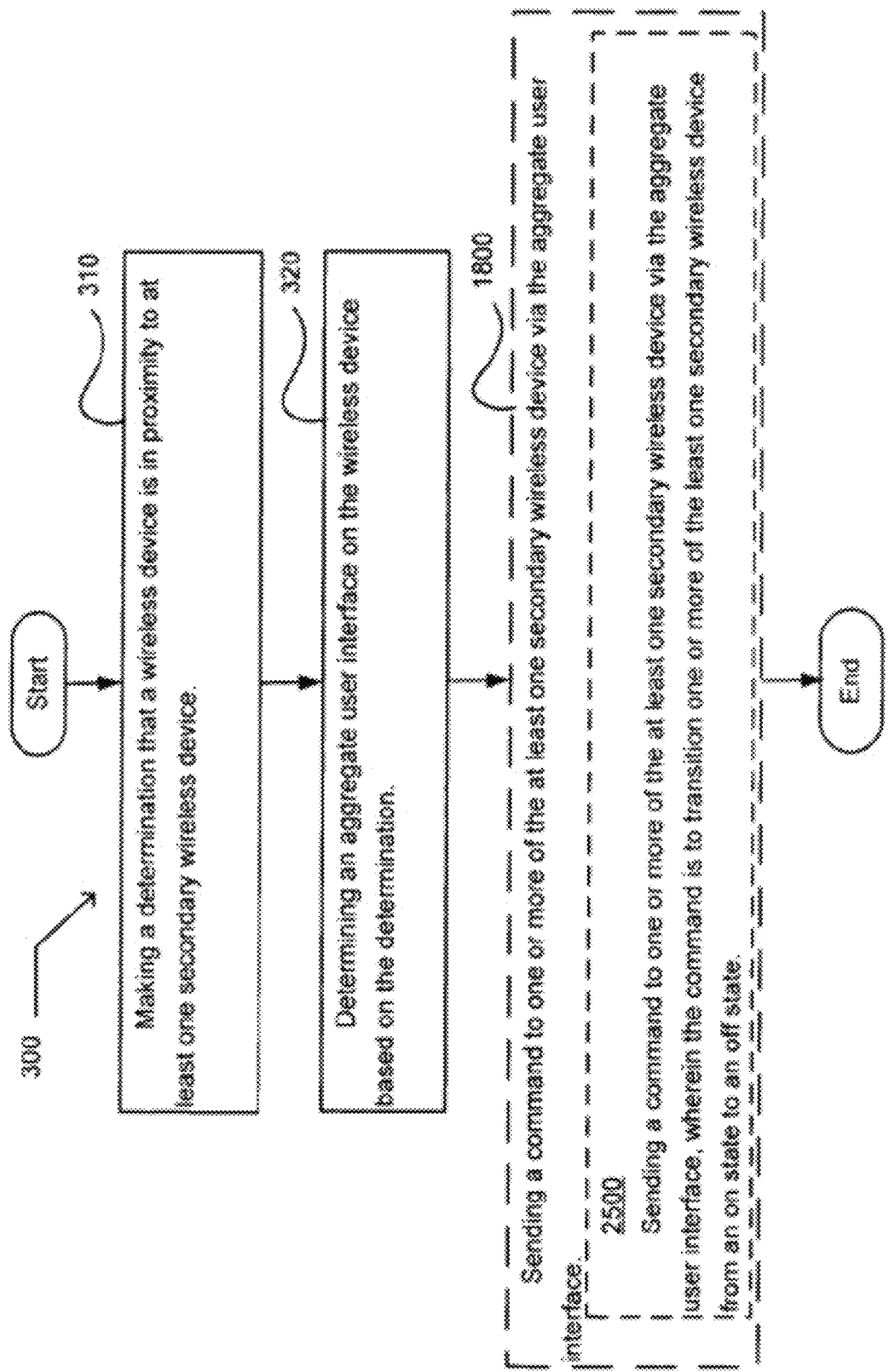
FIG. 25 illustrates an alternative embodiment of the example operational flow of FIG. 3.

FIG. 25 illustrates an alternative embodiment of the example operational flow 300 of FIG. 18. FIG. 25 illustrates an example embodiment where the sending operation 1800 may include at least one additional operation. Additional operations may include an operation 2500.

At the sending operation 2500, a command is sent to one or more of the at least one secondary wireless device via the aggregate user interface, wherein the command is to transition one or more of the least one secondary wireless device from an on state to an off state. For example, the wireless device 100 may be used to de-activate (e.g., turn off) a secondary wireless device 101 that is currently turned on, when the user 104 no longer wants to access the device.

Figure 26:
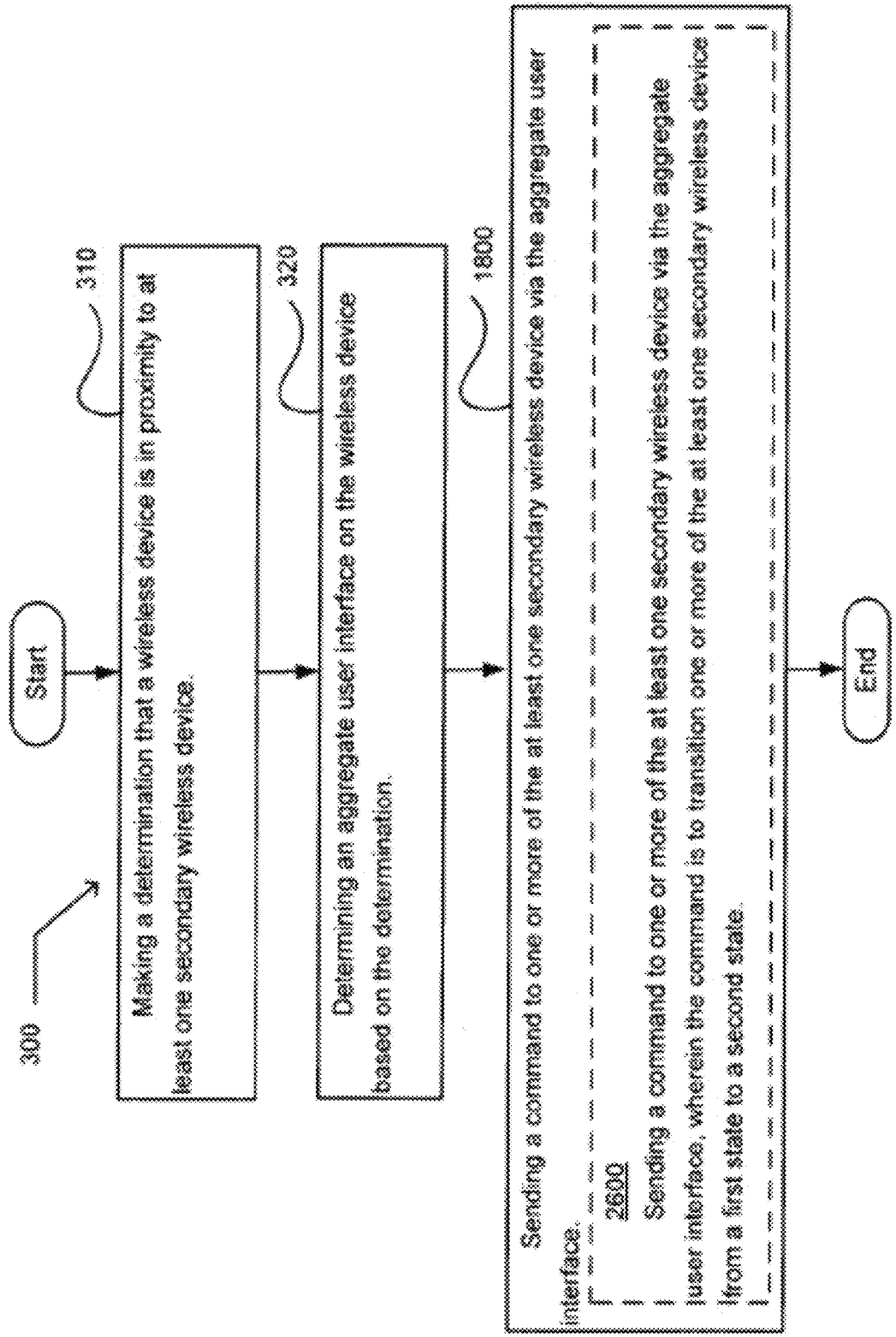
FIG. 26 illustrates an alternative embodiment of the example operational How of FIG. 3.

FIG. 26 illustrates an alternative embodiment of the example operational flow 300 of FIG. 18. FIG. 26 illustrates an example embodiment where the sending operation 1800 may include at least one additional operation. Additional operations may include an operation 2600.

At the sending operation 2600, a command is sent to one or more of the at least one secondary wireless device via the aggregate user interface, wherein the command is to transition one or more of the at least one secondary wireless device from a first state to a second state. For example, the wireless device 100 may be used to change the state of a secondary wireless device 101 that is currently turned on, when the user 104 wants to interact with the device in a different manner than he is currently interacting with the device.

Figure 27:
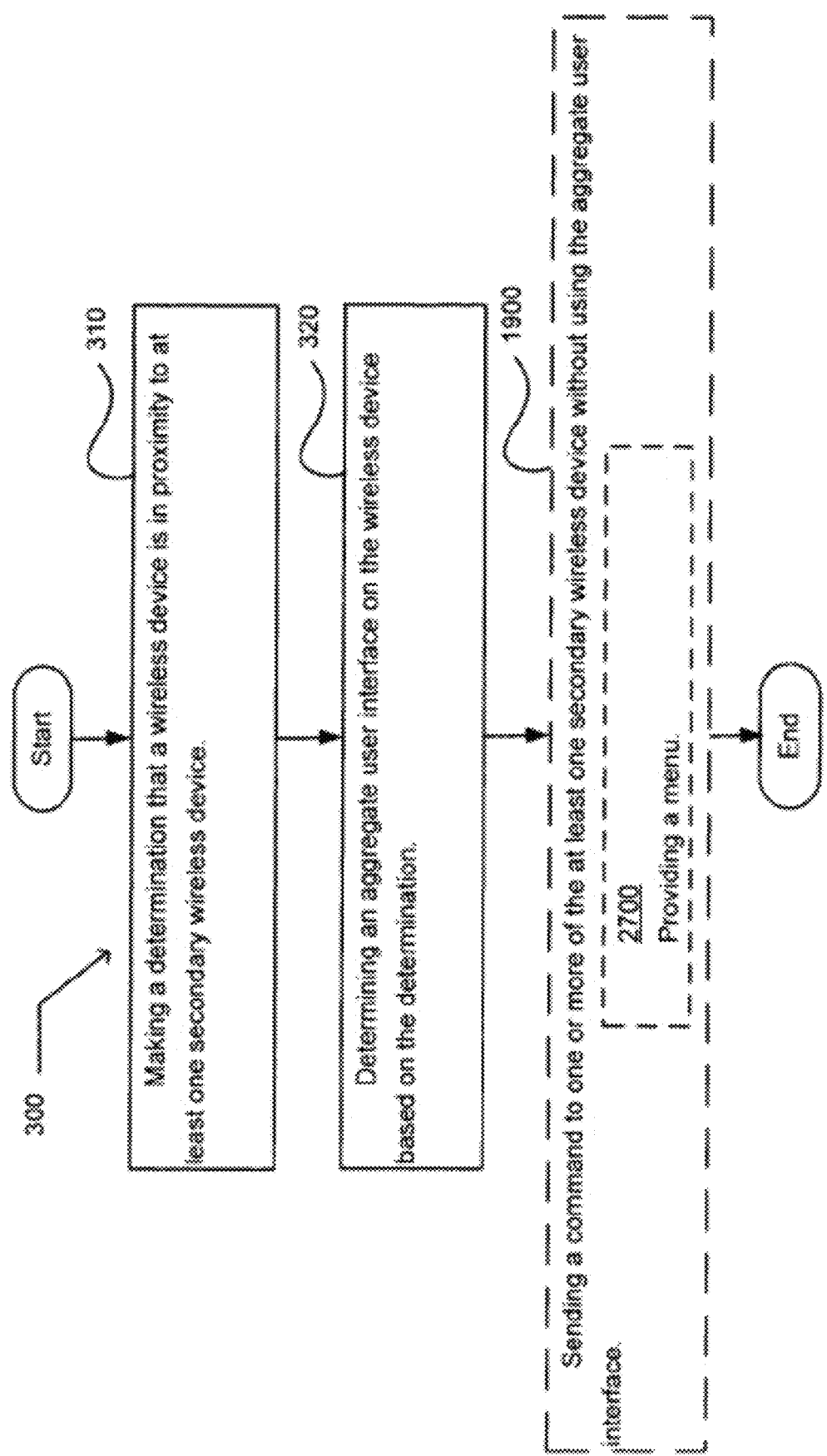
FIG. 27 illustrates an alternative embodiment of the example operational flow of FIG. 3.

FIG. 27 illustrates an alternative embodiment of the example operational flow 300 of FIG. 19. FIG. 27 illustrates an example embodiment where the sending operation 1900 may include at least one additional operation. Additional operations may include an operation 2700.

At the providing operation 2700, a menu is provided. For example, a default operation may be invoked automatically (i.e., turn on a device), then the device may provide the associated menu to the user's wireless device 100.

Figure 28:
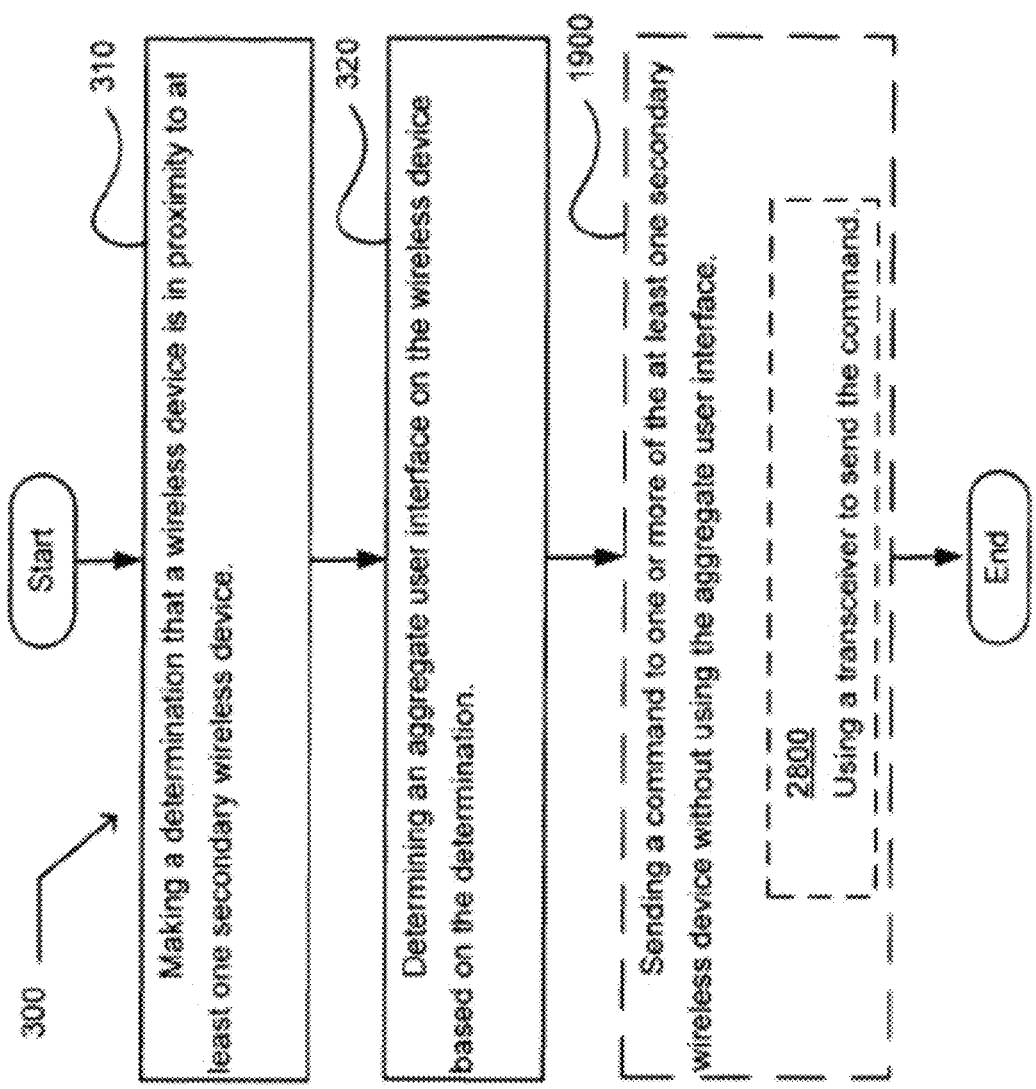
FIG. 28 illustrates an alternative embodiment of the example operational flow of FIG. 3.

FIG. 28 illustrates an alternative embodiment of the example operational flow 300 of FIG. 19. FIG. 28 illustrates an example embodiment where the sending operation 1900 may include at least one additional operation, Additional operations may include an operation 2800.

At the operation 2800 a transceiver is used to send the command. For example, as shown in FIG. 1, transceiver 157 may be used in a wireless device 100 to handle a wireless connection to a plurality of secondary wireless devices 101. The command which is transmitted using the transceiver 157 may be, for instance, to invoke one or more operations on the secondary wireless device 101 either automatically by default, or as non-default actions 199 that the user 104 chooses to invoke.

Figure 29:
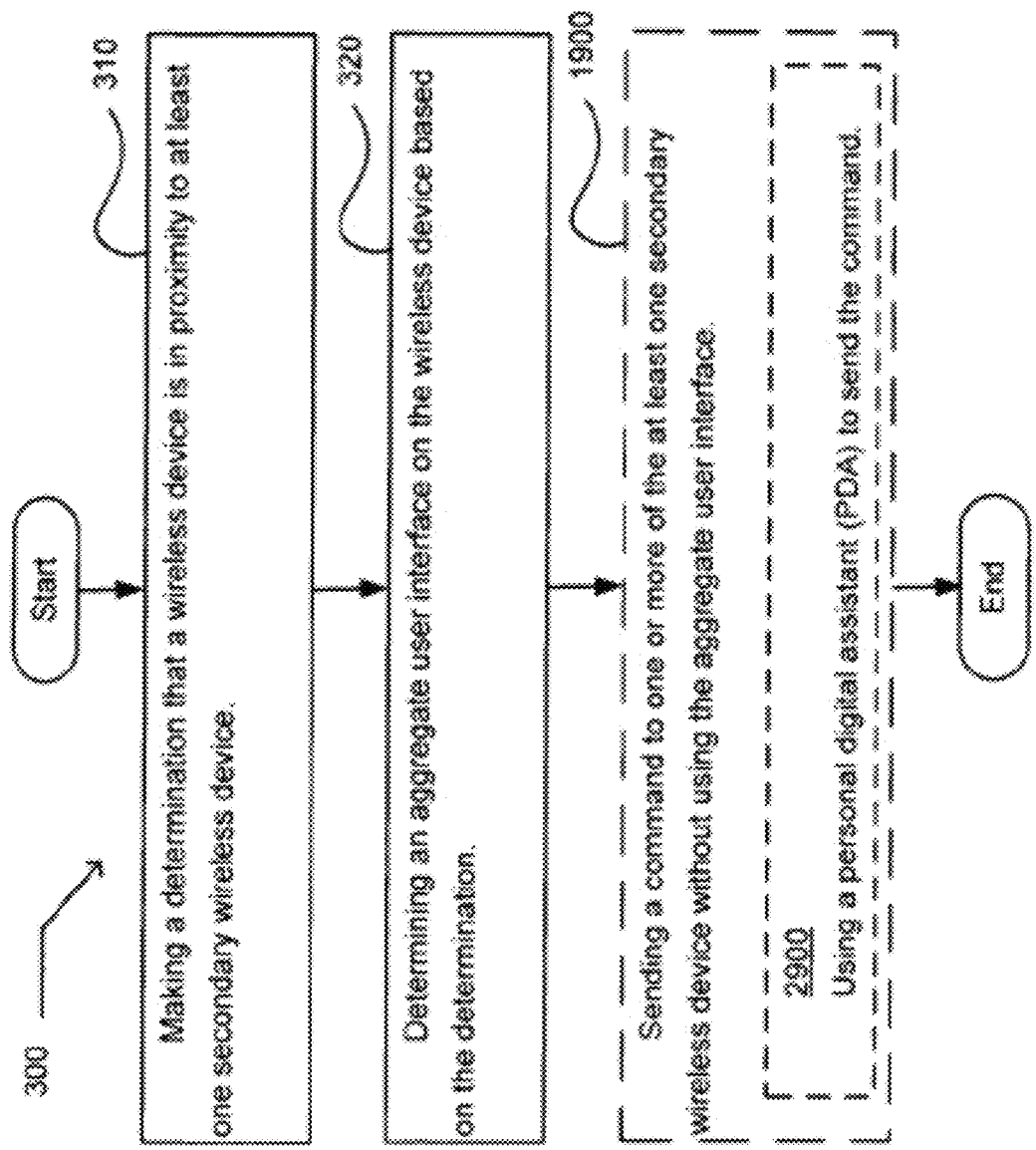
FIG. 29 illustrates an alternative embodiment of the example operational flow of FIG. 3.

FIG. 29 illustrates an alternative embodiment of the example operational flow 300 of FIG. 19. FIG. 29 illustrates an example embodiment where the sending operation 1900 may include at least one additional operation. Additional operations may include an operation 2900.

At the operation 2900, a personal digital assistant (PDA) is used to send the command. The PDA may be configured, for instance, to respond to gesturing, re-orienting, opening and closing, or otherwise repositioning the PDA in a physical manner to determine that the command should be sent, as opposed to such a command being explicitly selected from a menu 156 by the user 104.

Figure 30:
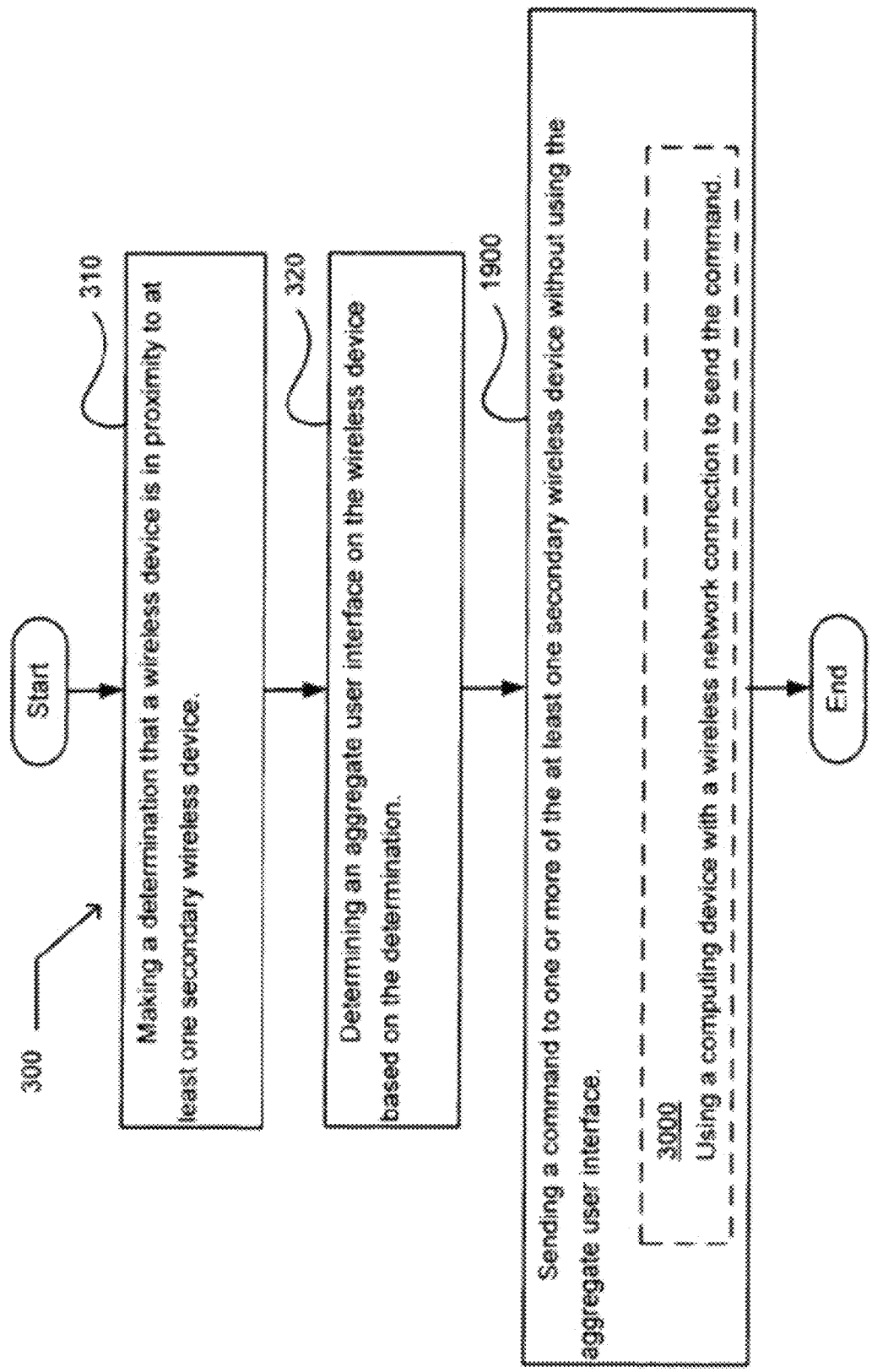
FIG. 30 illustrates an alternative embodiment of the example operational flow of FIG. 3.

FIG. 30 illustrates an alternative embodiment of the example operational flow 300 of FIG. 19. FIG. 30 illustrates an example embodiment where the sending operation 1900 may include at least one additional operation, Additional operations may include an operation 3000.

At the operation 3000, a computing device with a wireless network connection is used to send the command. For example, a handheld computing device, such as a cell phone or PDA may send a command (e.g., a "record song" command) via a wireless link or wireless network connection to an audio recording device.

Figure 31:
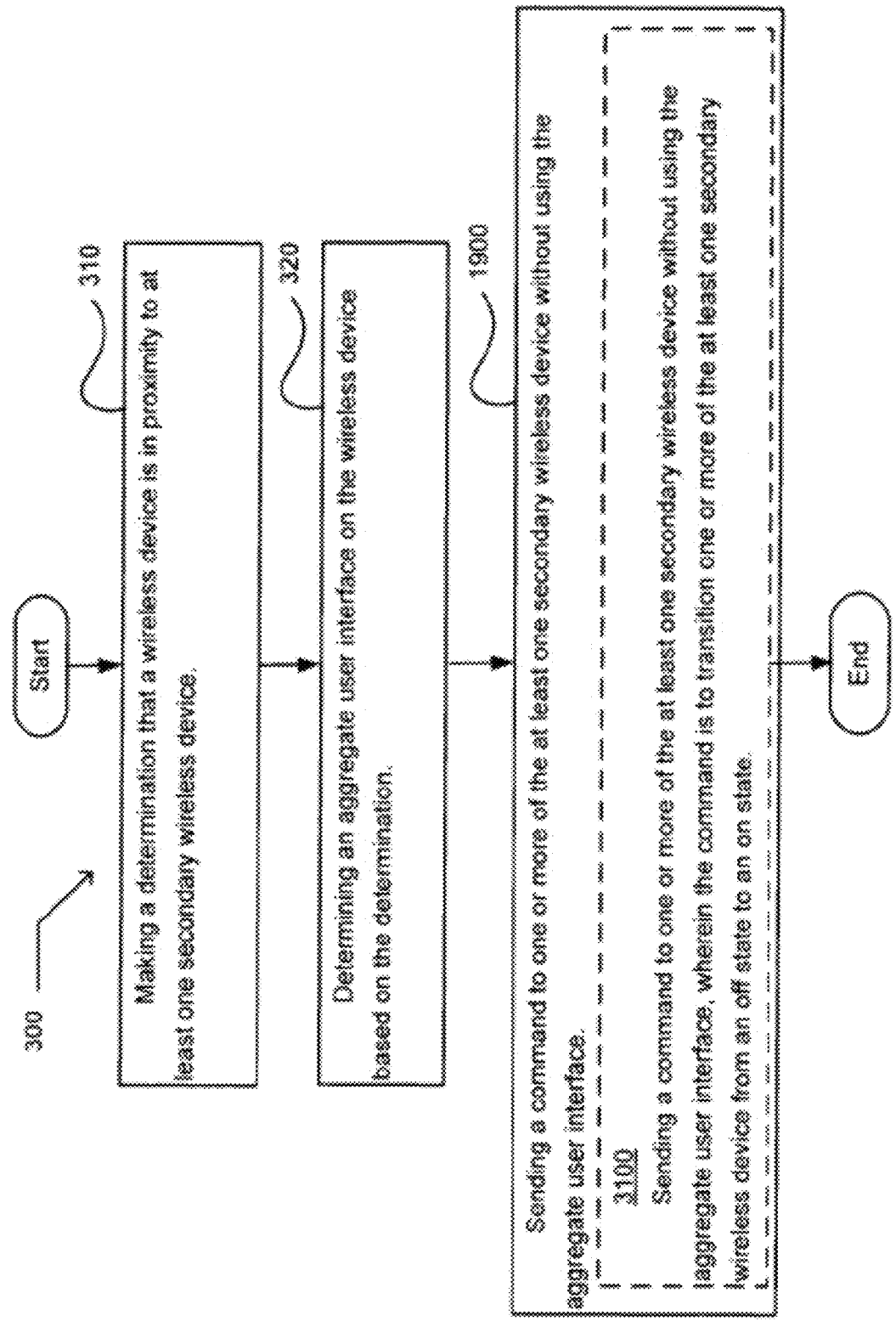
FIG. 31 illustrates an alternative embodiment of the example operational flow of FIG. 3.

FIG. 31 illustrates an alternative embodiment of the example operational flow 300 of FIG. 19. FIG. 31 illustrates an example embodiment where the sending operation 1900 may include at least one additional operation. Additional operations may include an operation 3100.

At sending operation 3100, a command is sent to one or more of the at least one secondary wireless device without using the aggregate user interface, wherein the command is to transition one or more of the at least one secondary wireless device from an off state to an on state. For example, the wireless device 100 may be used to activate a secondary wireless device 101 that is currently turned off, when the user 104 wants to access the device. The aggregate user interface 153 may be bypassed in instances where the wireless device 100 is instructed by the user 104 to perform such an action by default, the environment or use habits indicate that this is the default state, or by some other technique.

Figure 32:
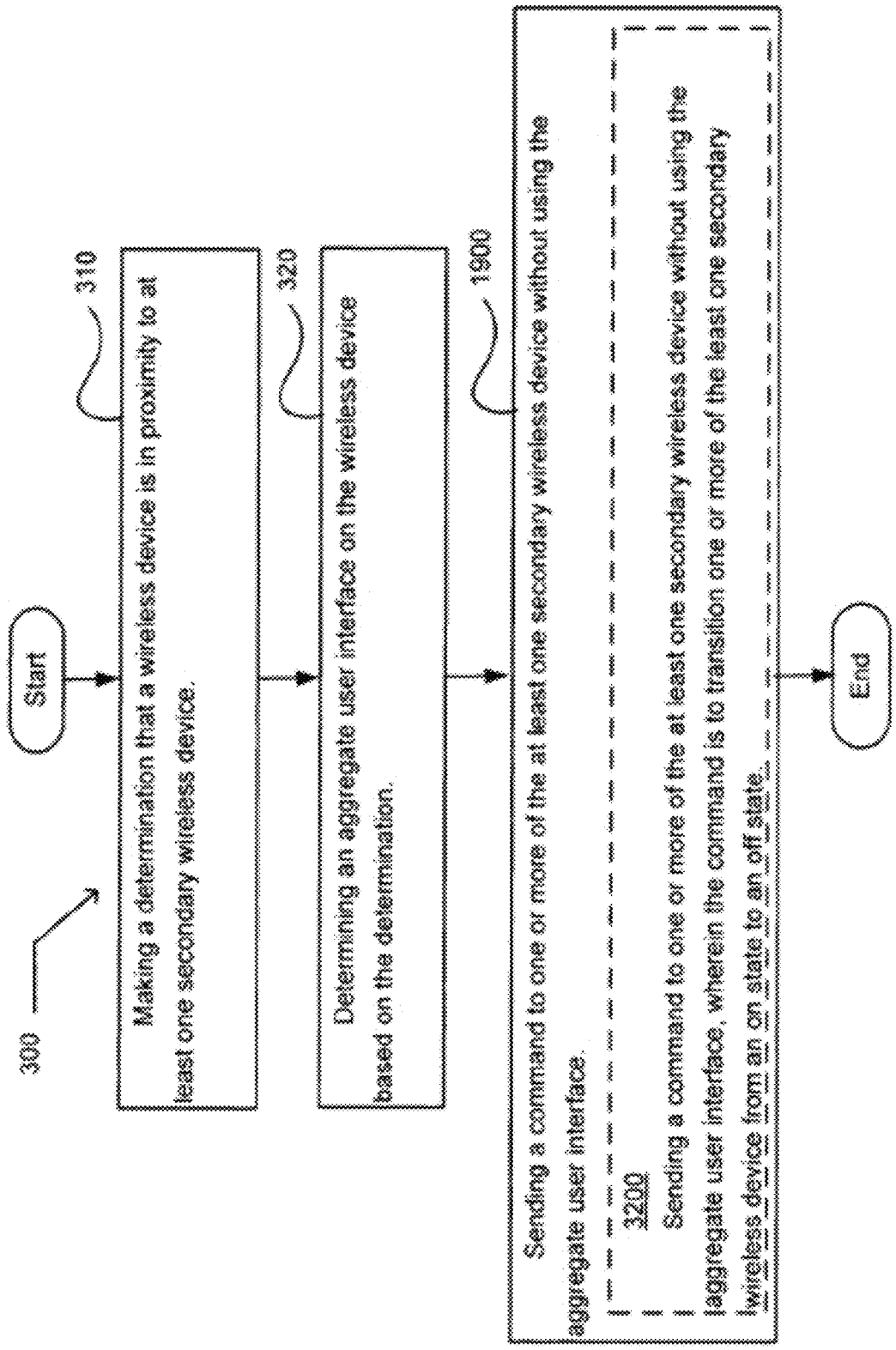
FIG. 32 illustrates an alternative embodiment of the example operational flow of FIG. 3.

FIG. 32 illustrates an alternative embodiment of the example operational flow 300 of FIG. 19. FIG. 32 illustrates an example embodiment where the sending operation 1900 may include at least one additional operation, Additional operations may include an operation 3200.

At sending operation 3200, a command is sent to one or more of the at least one secondary wireless device without using the aggregate user interface, wherein the command is to transition one or more of the at least one secondary wireless device from an on state to an off state. For example, the wireless device 100 may be used to de-activate a secondary wireless device 101 that is currently turned on, when the user no longer wants to access the device.

Figure 33:
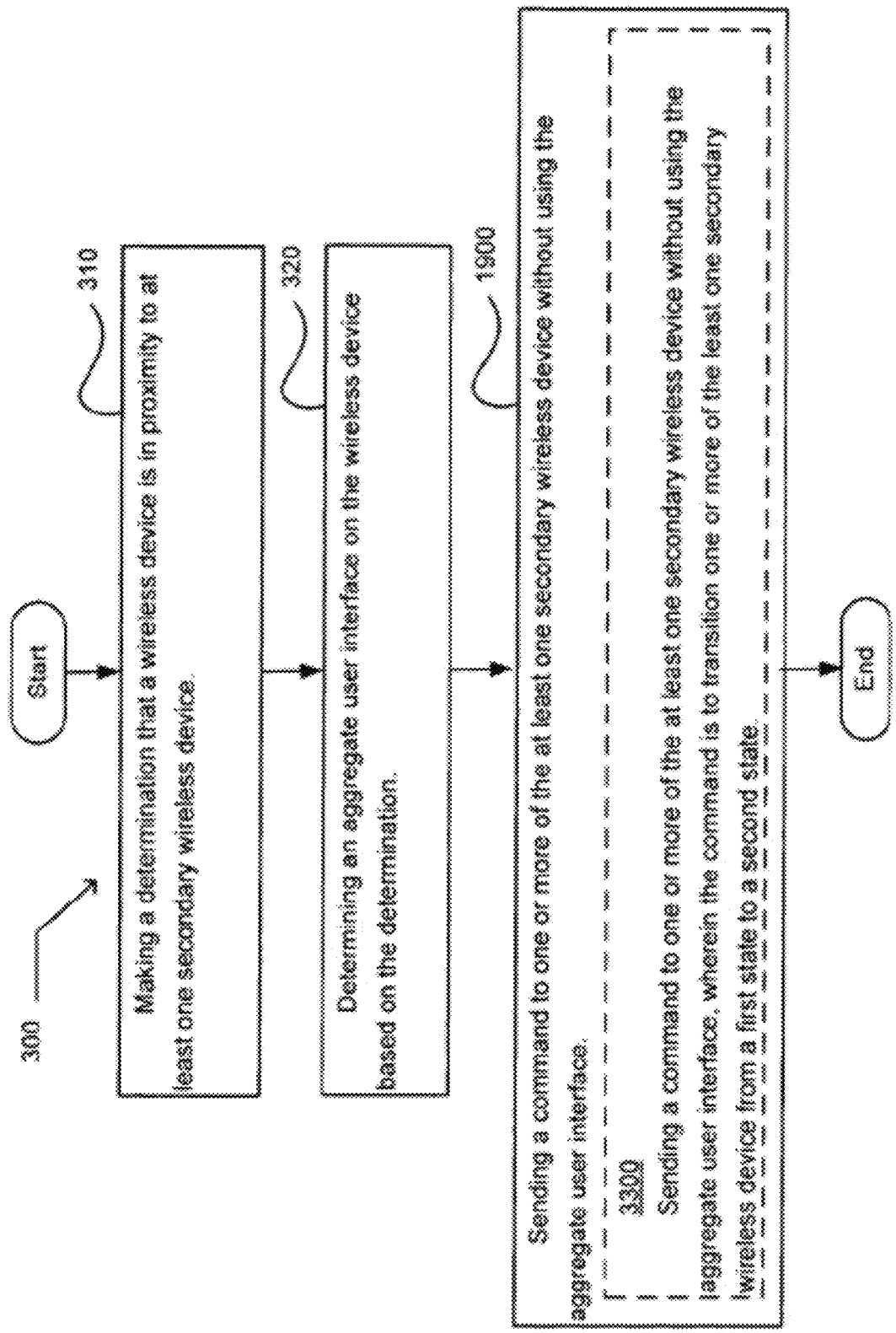
FIG. 33 illustrates an alternative embodiment of the example operational flow of FIG. 3.

FIG. 33 illustrates an alternative embodiment of the example operational flow 300 of FIG. 19. FIG. 33 illustrates an example embodiment where the sending operation 1900 may include at least one additional operation. Additional operations may include an operation 3300.

At sending operation 3300, a command is sent to one or more of the at least one secondary wireless device without using the aggregate user interface, wherein the command is to transition one at more of the at least one secondary wireless device from a first state to a second state. For example, the wireless device 100 may be used to change the state of a secondary wireless device 101 that is currently turned on, when the user 104 wants to interact with the device in a different manner than he is currently interacting with the device.

Figure 34:
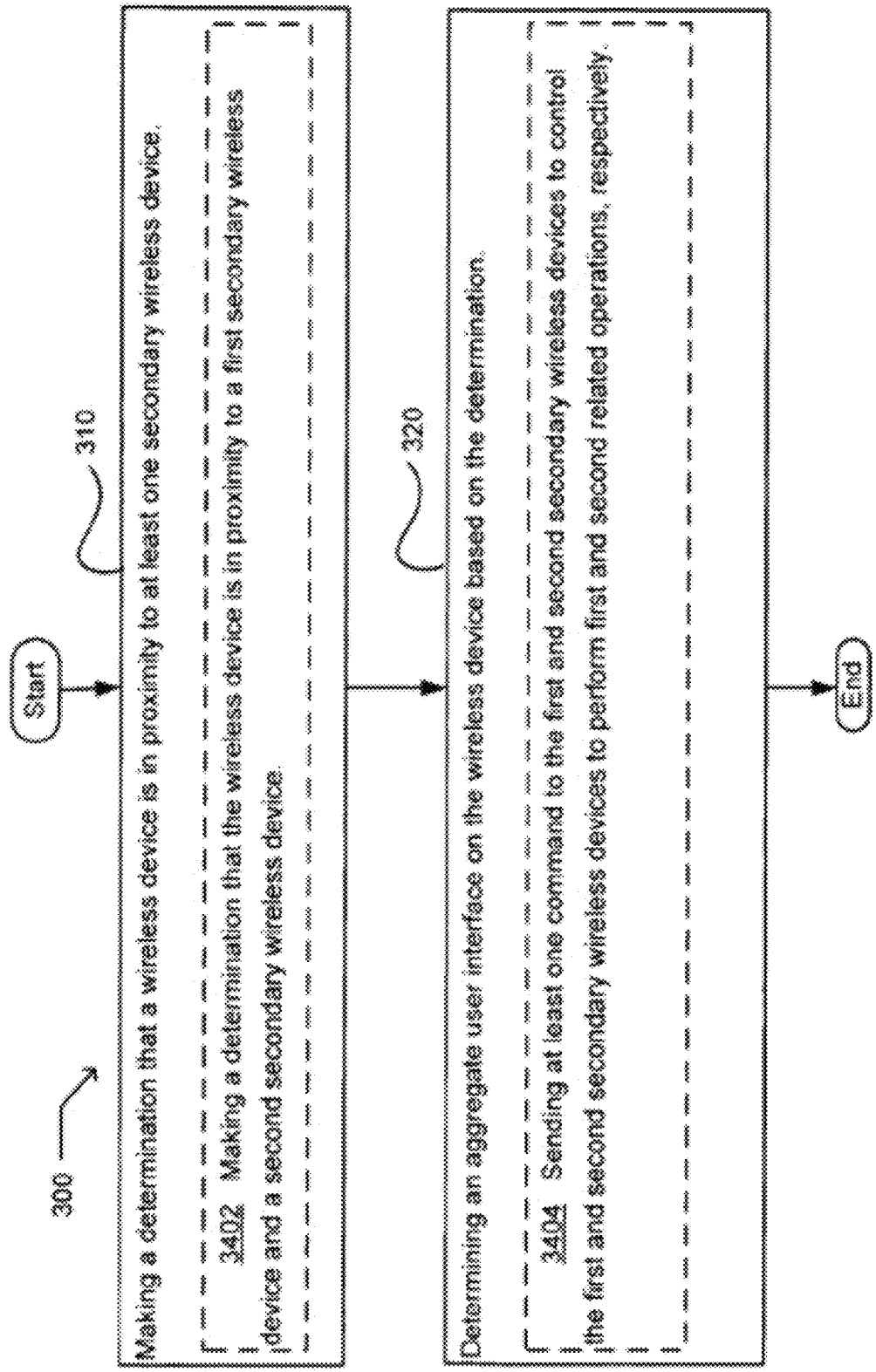
FIG. 34 illustrates an alternative embodiment of the example operational flow of FIG. 3.

FIG. 34 illustrates alternative embodiments of the example operational flow of FIG. 3. FIG. 34 illustrates example embodiments where the making operation 310 may include at least one additional operation, and/or when the determining operation 320 may include at least one additional operation. Additional operations may include operations 3402 and 3404.

At making operation 3402, a determination is made that the wireless device is in proximity to a first secondary wireless device and a second secondary wireless device. For example, wireless device 100 may make a determination that it is in proximity to a television and to a DVD recorder.

At sending operation 3404, at least one command is sent to the first and second secondary wireless devices to control the first and second secondary wireless devices to perform first and second related operations, respectively. For example, a "record TV program" command may be sent to the television and the DVD recorder to control the television to tune to a television program and to control the DVD recorder to begin recording the program. The "record TV program" may be one command or multiple commands. In an example embodiment, the operation of the television tuning to a specific TV program and the DVD recorder recording the program may be considered to be related operations, e.g., since these operations may be used or performed together to accomplish a requested task or function. Alternatively, wireless device 100 may send a first command ("record TV program") to the television, and where the television may separately communicate with a DVD recorder (which may or may not be in proximity to the wireless devise 100) to arrange for the TV program to be recorded.

Figure 35:
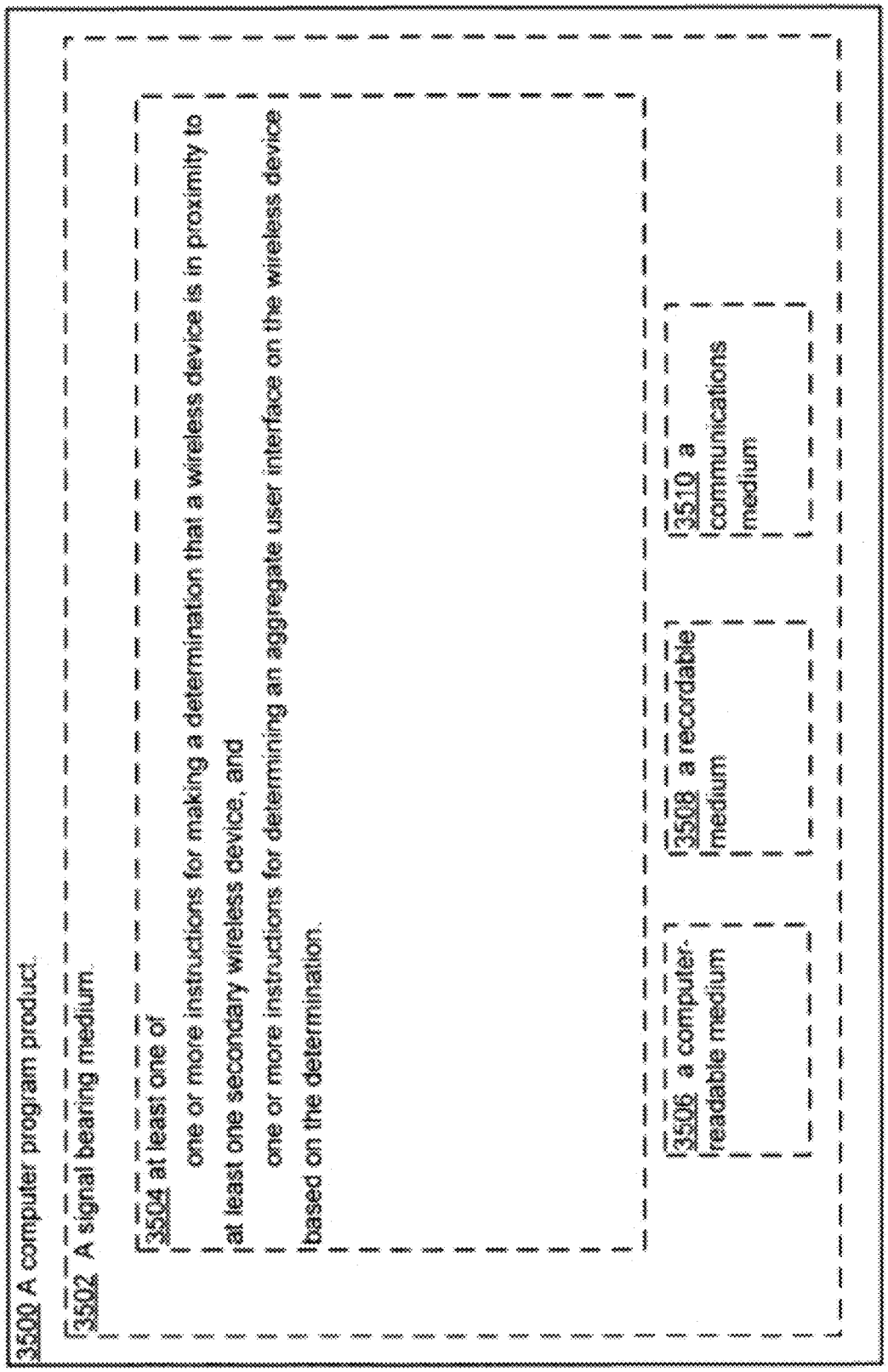
FIG. 35 illustrates a partial view of an example computer program product that includes a computer program for executing a computer process on a computing device.

FIG. 35 illustrates a partial view of an example computer program product 3500 that includes a computer program 3504 for executing a computer process on a computing device. An embodiment of the example computer program product 3500 is provided using a signal bearing medium 3502, and may include at least one of one or more instructions for making a determination that a wireless device is in proximity to at least one secondary wireless device, the signal bearing medium also bearing one or more instructions for determining an aggregate user interface on the wireless device based on the determination. The one or more instructions may be, for example, computer executable and/or logic-implemented instructions. In one implementation, the signal-bearing medium 3502 may include a computer-readable medium 3506. In one implementation, the signal bearing medium 3502 may include a recordable medium 3508. In one implementation, the signal bearing medium 3502 may include a communications medium 3510.

Figure 36:
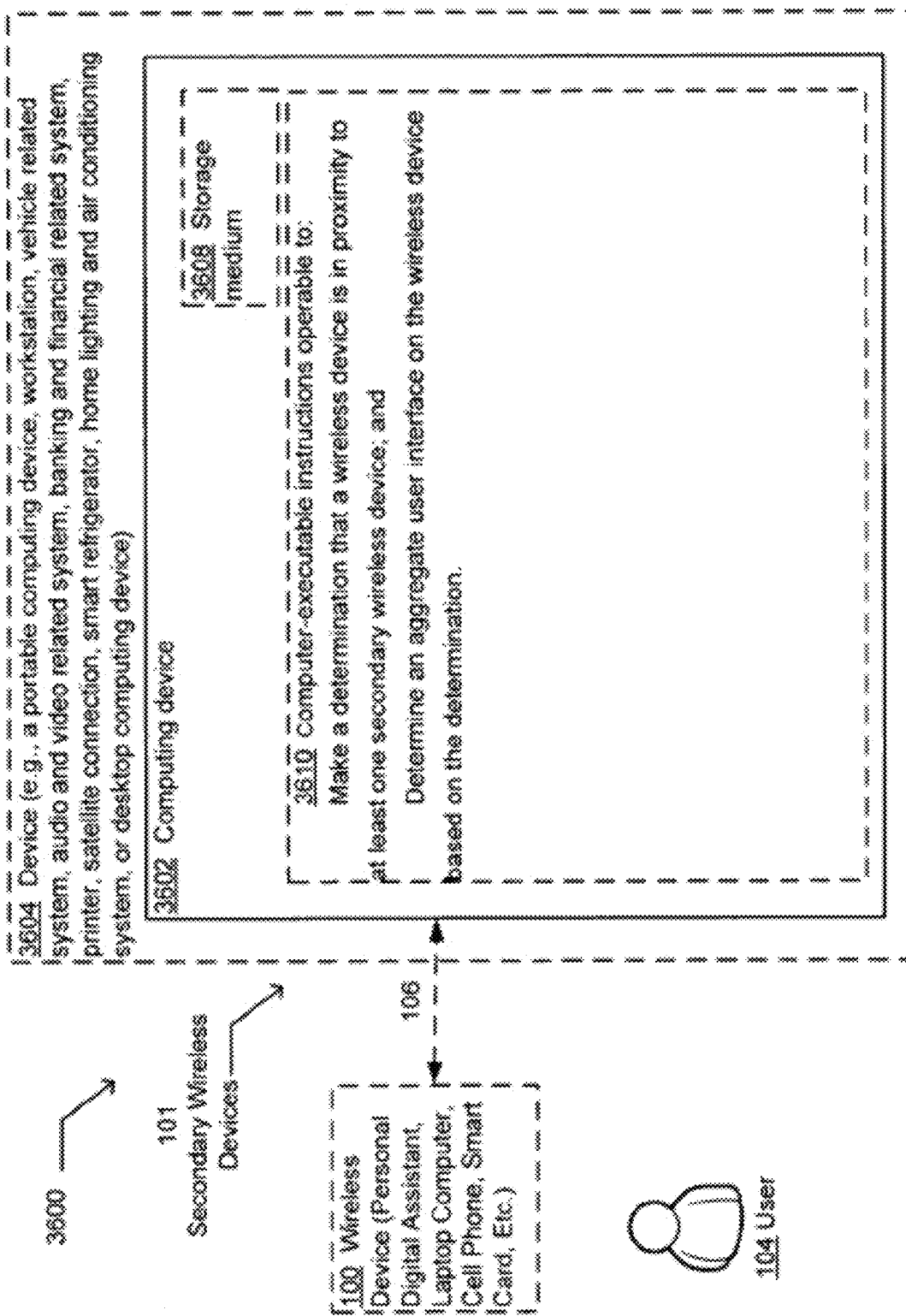
FIG. 36 illustrates an example system in which embodiments may be implemented.

FIG. 36 illustrates an example system 3600 in which embodiments may be implemented. The system 3600 includes a computing system environment at wireless device 100 and secondary wireless devices 101. The system 3600 also illustrates the user 104 using the wireless device 100, which is optionally shown as being in communication with the secondary wireless devices 101 by way of a proximity based connection 106. The proximity 106 may represent a local, wide area, or peer to peer network, and may represent a bus that is internal to a computing device (e.g., in example embodiments in which the computing device 3602 is contained in whole or in part within the device 3604). A storage medium 3608 may be any computer storage media.

The wireless device 100 and secondary wireless devices 101 use computer-executable instructions 3610 that when executed on the wireless device 100 and/or the secondary wireless devices 101 cause the computing devices to make a determination that a wireless device is in proximity to at least one secondary wireless device, and determine an aggregate user interface on the wireless device based on the determination.

In FIG. 36, then, the system 3600 includes at least one computing device (e.g., 3602 and/or 3604). The computer-executable instructions 3610 may be executed on one or more of the at least one computing device. For example the computing device 3602 may implement the computer-executable instructions 3610 and output a result to (and/or receive data from) the computing device 3604. Since the computing device 3602 may be wholly or partially contained within the computing device 3604, the computing device 3604 also may be said to execute some or all of the computer-executable instructions 3610, in order to be caused to perform or implement, for example, various ones of the techniques described herein, or other techniques.

The wireless device 100 may include, for example, one or more of a personal digital assistant (PDA), a laptop computer, a tablet personal computer, a networked computer, a computing system comprised of a cluster of processors, a workstation computer, a cellular phone, a smartcard, a remote control, and/or a desktop computer. In another example embodiment, the wireless device 100 may be operable to communicate with the secondary wireless devices 101 to communicate with a database (e.g., implemented using the storage medium 3608) to access the at least one dataset and/or to access the second dataset.

Those having skill in the art will recognize that the state of the art has progressed to the point where there is little distinction left between hardware and software implementations of aspects of systems; the use of hardware or software is generally (but not always, in that in certain contests the choice between hardware and software can become significant) a design choice representing cost vs efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

The foregoing detailed description has set forth various embodiments of the devices and/or processes via the use of block diagrams, flowcharts, and/or examples, insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, a RAM, a Hash memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry". Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment) Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practice to integrate such described devices and/or processes into data processing systems. That is, as least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for leasing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality, in a conceptual sense, any arrangement of components to achieve the same functionality is effectively "associated" such that the desired functionality is achieved, Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled." to each other to achieve the desired functionality, Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A. B. and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include hut but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B.

The invention claimed is:

1. A method comprising:
   making a determination that a wireless device is in proximity to one or more secondary wireless devices;
   determining an aggregate user interface on the wireless device based on the determination, wherein making the determination that the wireless device is in proximity to the at least one secondary wireless device comprises determining that the wireless device and the one or more secondary wireless devices are within a threshold distance;
   wherein determining the aggregate user interface on the wireless device based on the determination comprises receiving information at the wireless device indicating at least one function of" the one or more secondary wireless devices and providing the aggregate user interface on the wireless device indicating the at least one function of the one or more secondary wireless devices based on the information;
   presenting the aggregate user interface identifying the one or more secondary wireless devices;
   receiving a first input selecting an identified secondary wireless device of the one or more secondary wireless devices; and
   responsive to the first input, presenting, on the wireless device, a second user interface including one or more selectable menu options each associated with an operation performable by the identified secondary wireless device.

2. The method of claim 1, wherein determining that the wireless device is in proximity to the one or more secondary wireless devices includes: determining that at least one of the wireless device or the one or more secondary wireless devices are connected to a wireless network.

3. The method of claim 2, wherein determining that at least one of the wireless device or the one or more secondary wireless devices are connected to the wireless network includes: determining that the wireless device and the one or more secondary wireless devices are connected to a common wireless network.

4. The method of claim 1, wherein determining that the wireless device is in proximity to the one or more secondary wireless devices includes: determining a physical contact between the wireless device and the at one or more secondary wireless devices.

5. The method of claim 1, wherein determining that the wireless device is in proximity to the one or more secondary wireless devices includes: determining at least one signal transmitted directly between the wireless device and the one or more secondary wireless devices.

6. The method of claim 1 wherein determining an aggregate user interface on the wireless device based on the determination comprises:
   providing an available interaction with one or more operations related to other secondary wireless devices based on the determination.

7. The method of claim 6, wherein providing an available interaction with the one or more operations related to the other secondary wireless devices based on the determination further comprises providing a menu of operations on the wireless device including at least one operation for the other secondary wireless devices based on the determination.

8. The method of claim 1, further comprising receiving a second input selecting at least one of the one or more selectable menu options associated with an operation performable by a second one of the one or more secondary wireless devices.

9. The method of claim 8, further comprising, responsive to the second input, controlling the second secondary wireless device to perform the operation performable by the second secondary wireless device.

10. A system comprising:
a computing device comprising at least one memory device coupled to at least one processing device, the at least one memory storing instructions that, when executed by the at least one processing device, cause the system to:
make a determination that a wireless device is in proximity to one or more secondary wireless devices;
determine an aggregate user interface on the wireless device based on the determination, wherein making the determination that the wireless device is in proximity to the one or more secondary wireless devices comprises determining that the wireless device and the one or more secondary wireless devices are within a threshold distance;
wherein determining the aggregate user interface on the wireless device based on the determination comprises receiving information at the wireless device indicating at least one function of the one or more secondary wireless devices and providing the aggregate user interface on the wireless device indicating the at least one function of the one or more secondary wireless devices based on the information;
present the aggregate user interface identifying the one or more secondary wireless devices;
receive a first input selecting an identified secondary wireless device of the one or more secondary wireless devices; and
responsive to the first input, present, on the wireless device, a second user interface including one or more selectable menu options each associated with an operation performable by the identified secondary wireless device.

11. The system of claim 10, wherein the executed instructions cause the system to determine that the wireless device is in proximity to the one or more secondary wireless devices based on determining that at least one of the wireless device or the one more secondary wireless devices are connected to a wireless network.

12. The system of claim 11, wherein the executed instructions cause the system to determine that at least one of the wireless device or the one or more secondary wireless devices are connected to the wireless network based on determining that the wireless device and the one or more secondary wireless devices are connected to a common wireless network.

13. The system of claim 10, wherein the executed instructions cause the system to determine the aggregate user interface on the wireless device based on the determination by providing an available interaction with one or more operations related to other secondary wireless devices based on the determination.

14. The system of claim 13, wherein the executed instructions cause the system to provide an available interaction with the one or more operations related to the other secondary wireless devices by providing a menu of operations on the wireless device, the menu of operations including at least one operation for one or more of the other secondary wireless devices based on the determination.

15. The system of claim 10, wherein the executed instructions further cause the system to:
receive a second input selecting at least one of the one or more selectable menu options associated with an operation performable by the identified second wireless device.

16. The system of claim 15, wherein the executed instructions further cause the system to:
responsive to the second input, control the identified second wireless device to perform the operation.

17. A non-transitory computer-readable medium storing instructions that, when executed by one or more processors, cause the one or more processors to:
make a determination that a wireless device is in proximity to one or more secondary wireless devices;
determine an aggregate user interface on the wireless device based on the determination, and wherein making the determination that the wireless device and the one or more secondary wireless devices comprises determining that the wireless device and the one or more secondary wireless devices are within a threshold distance;
wherein determining the aggregate user interface on the wireless device based on the determination comprises receiving information at the wireless device indicating at least one function of the one or more secondary wireless devices and providing the aggregate user interface on the wireless device indicating the at least one function of the one or more secondary wireless devices based on the information;
present the aggregate user interface identifying the one or more secondary wireless devices;
receive a first input selecting an identified secondary wireless device of the one or more secondary wireless devices; and
responsive to the first input, present, on the wireless device, a second user interface including one or more selectable menu options each associated with an operation performable by the identified secondary wireless device.

18. The device of claim 17, wherein the executed instructions cause the one or more processors to determine that at least one of the wireless device or the one or more secondary wireless devices are connected to a wireless network.

19. The device of claim 17, wherein the aggregate user interface presents an available interaction with one or more operations related to other secondary wireless devices based on the determination.

20. The device of claim 19, wherein the available interaction with the one or more operations is provided with a menu of operations on the wireless device, including at least one operation for one or more of the other secondary wireless devices based on the determination.

* * * * *